Feb. 21, 1928. 1,660,125
O. A. HANFORD
METHOD AND APPARATUS FOR FORMING GLASSWARE
Filed Dec. 6, 1922 49 Sheets-Sheet 1

Orin A Hanford INVENTOR.

BY
Edwin P. Carter ATTORNEY.

Feb. 21, 1928. 1,660,125
O. A. HANFORD
METHOD AND APPARATUS FOR FORMING GLASSWARE
Filed Dec. 6, 1922 49 Sheets-Sheet 4
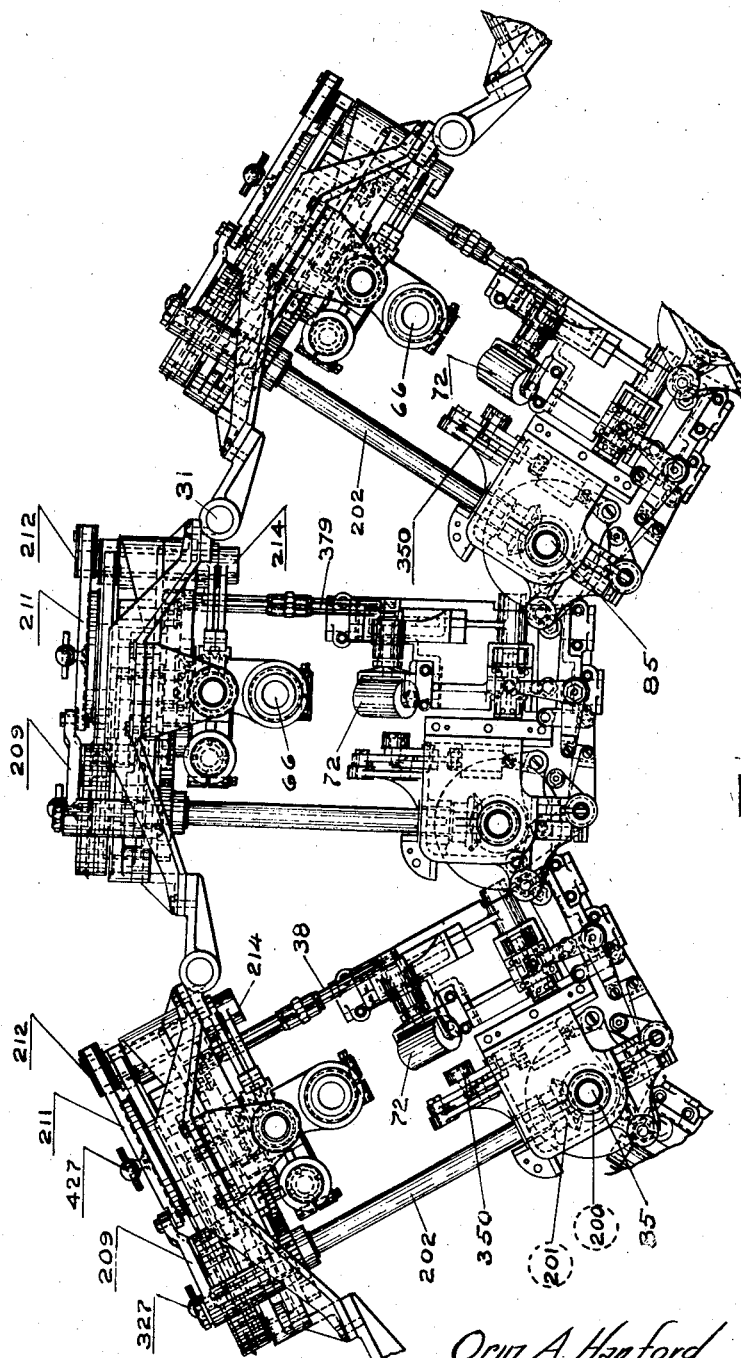

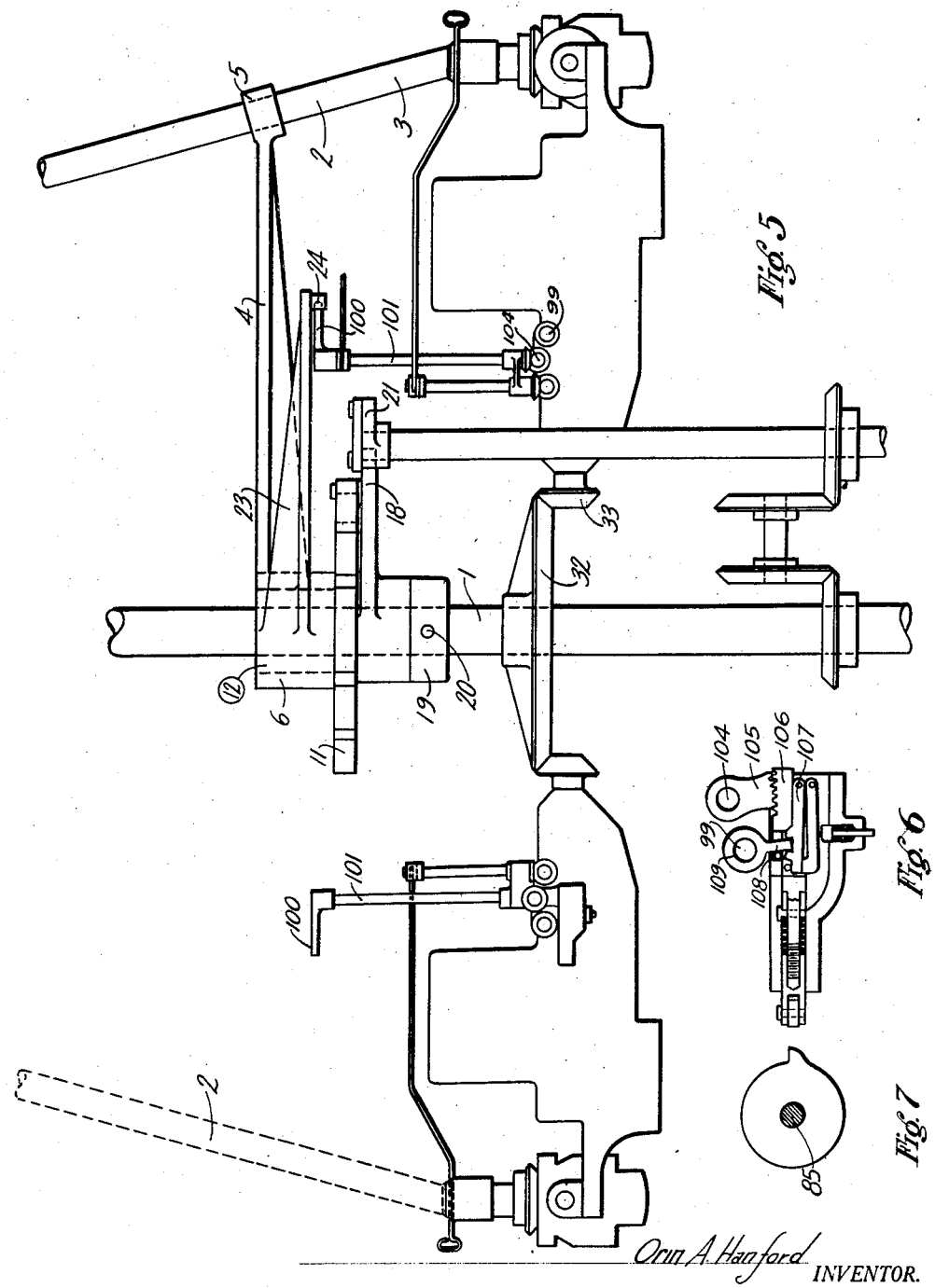

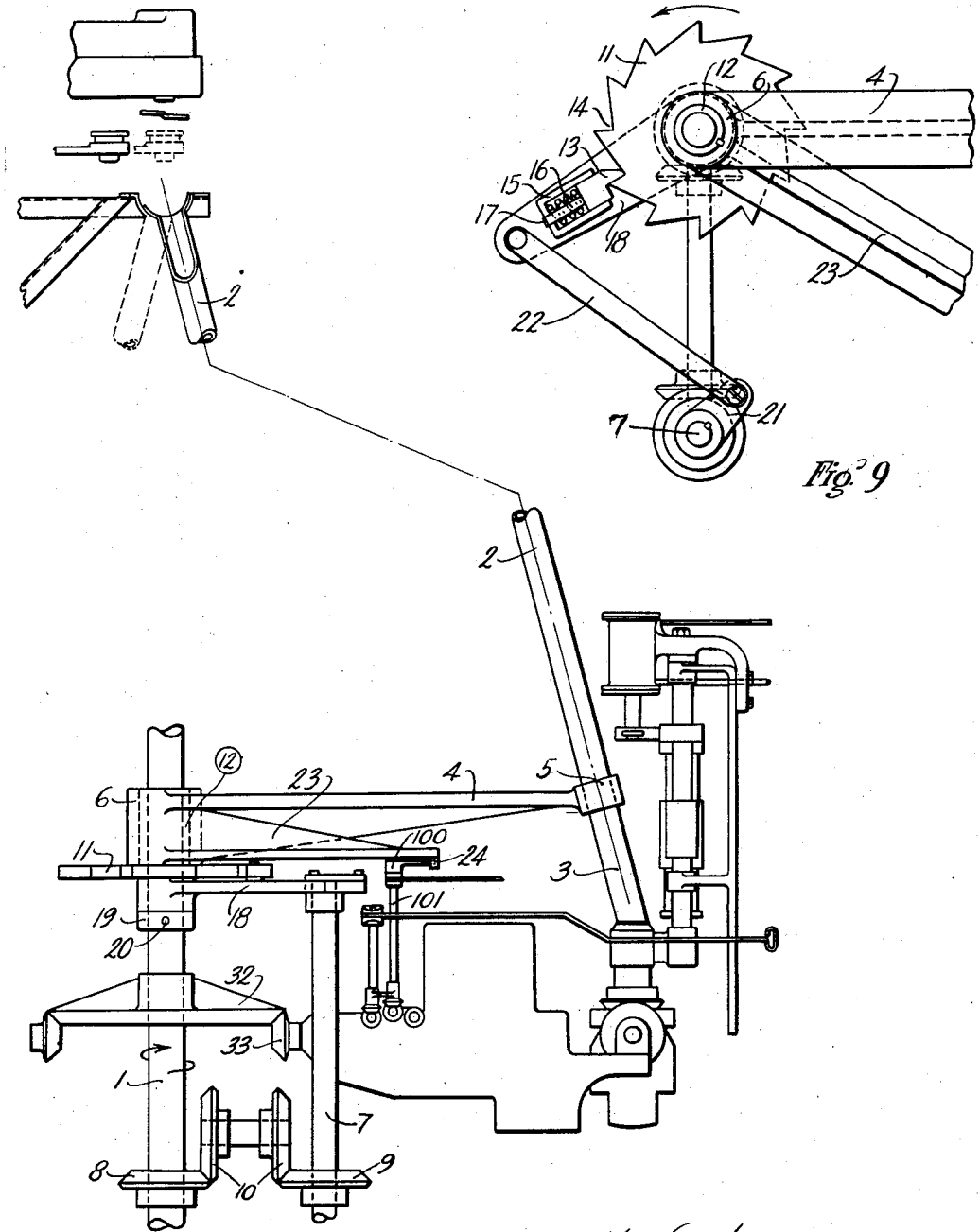

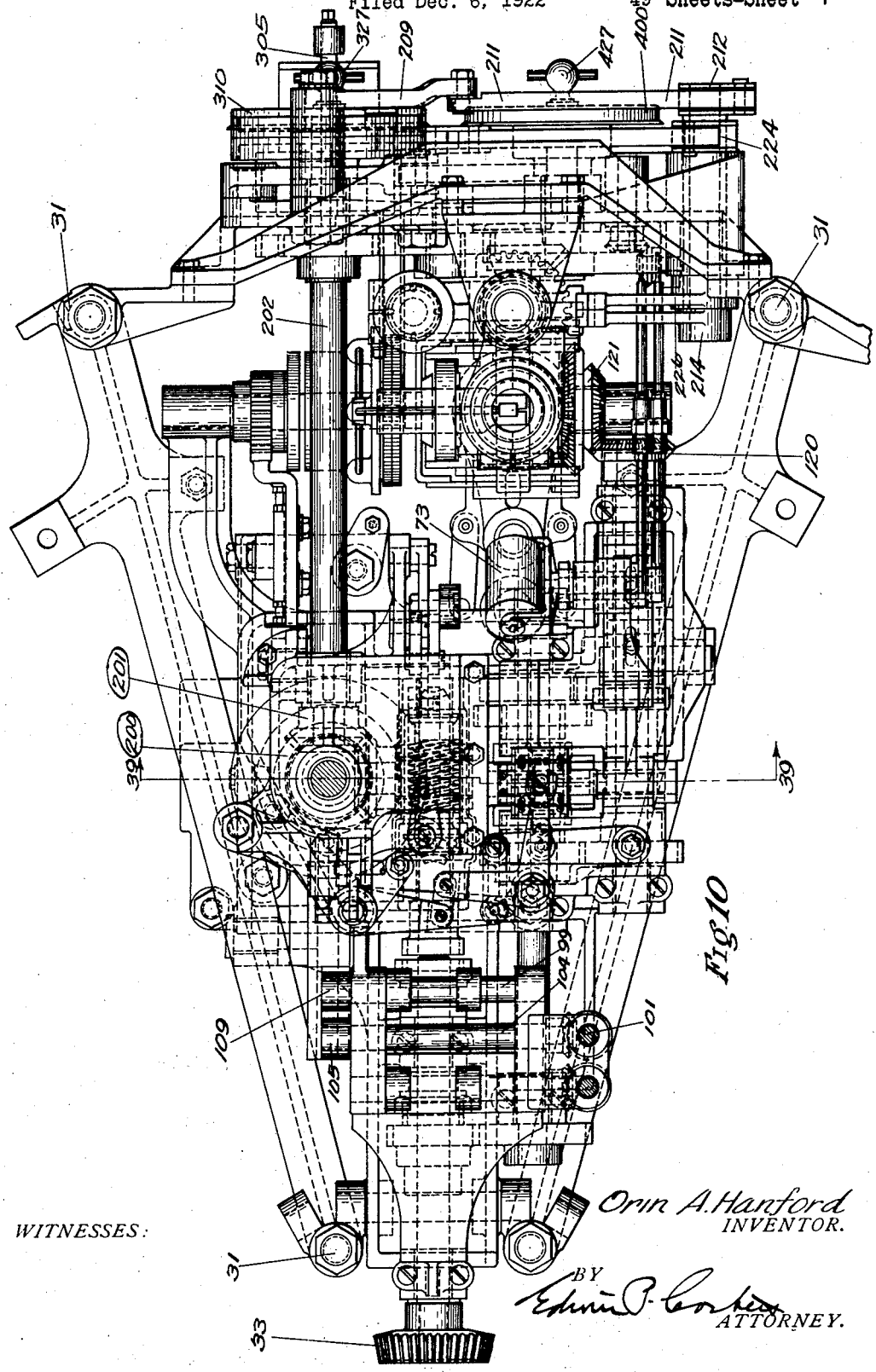

Orin A. Hanford INVENTOR.

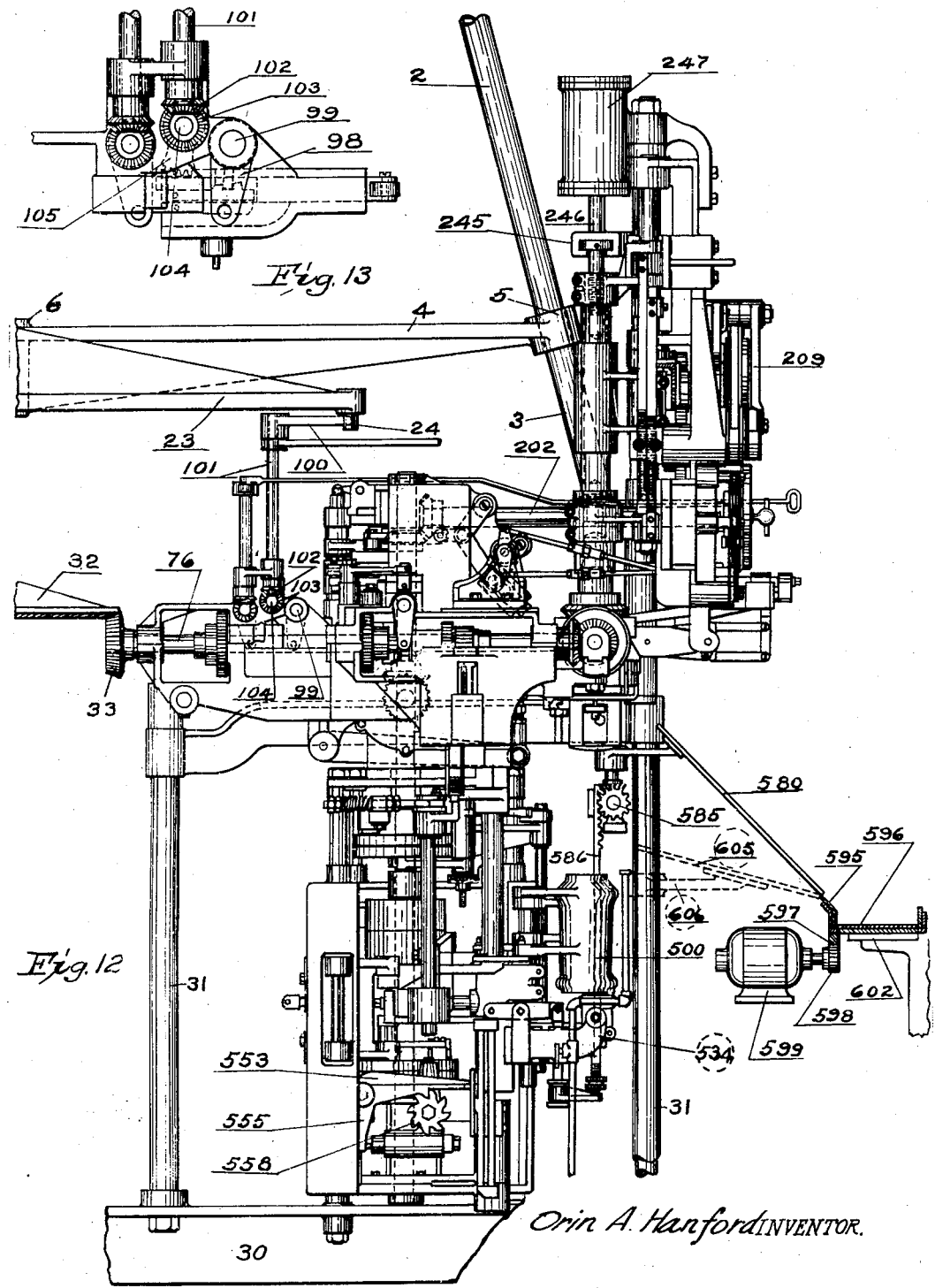

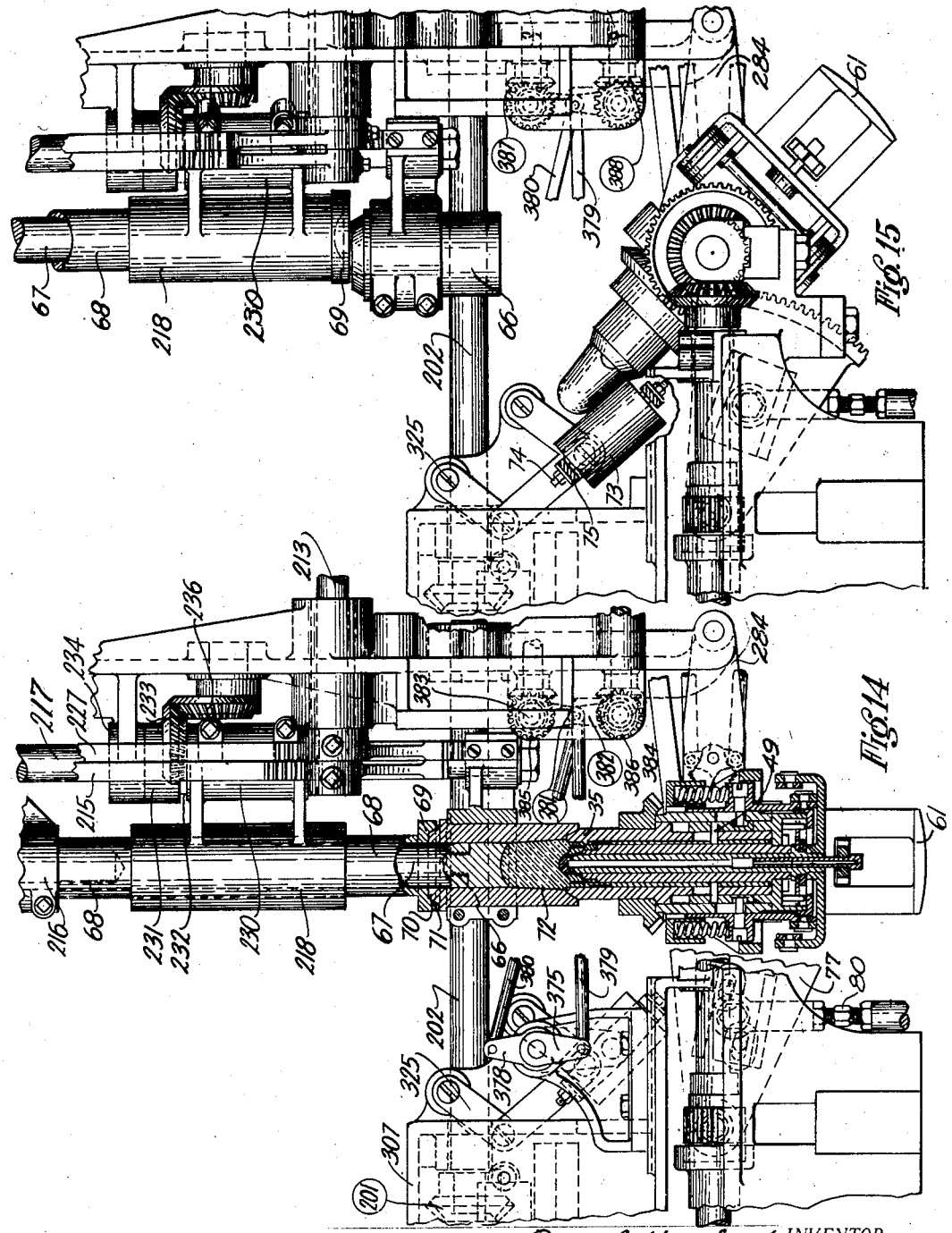

Feb. 21, 1928.
O. A. HANFORD
1,660,125
METHOD AND APPARATUS FOR FORMING GLASSWARE
Filed Dec. 6, 1922    49 Sheets-Sheet 11
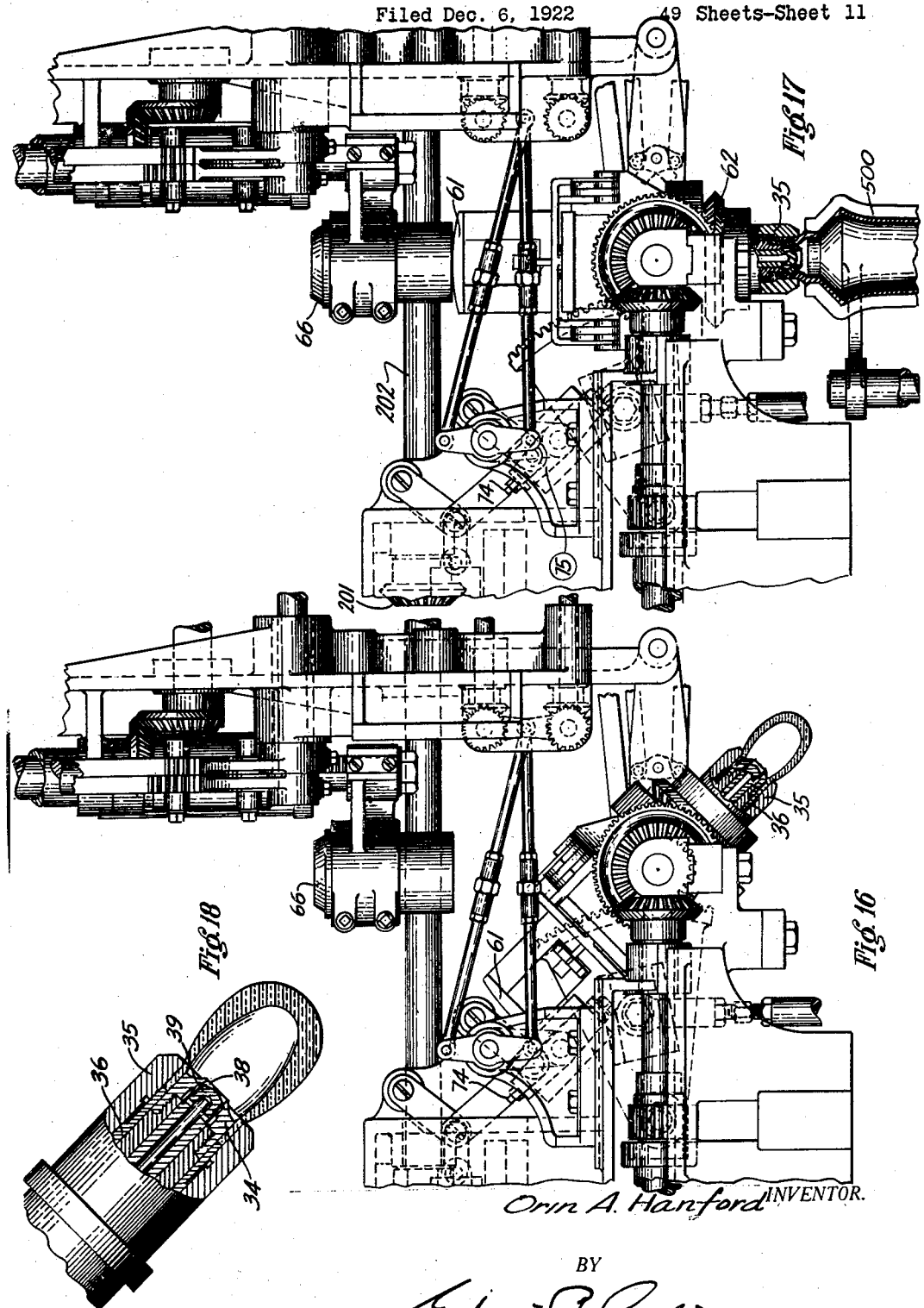

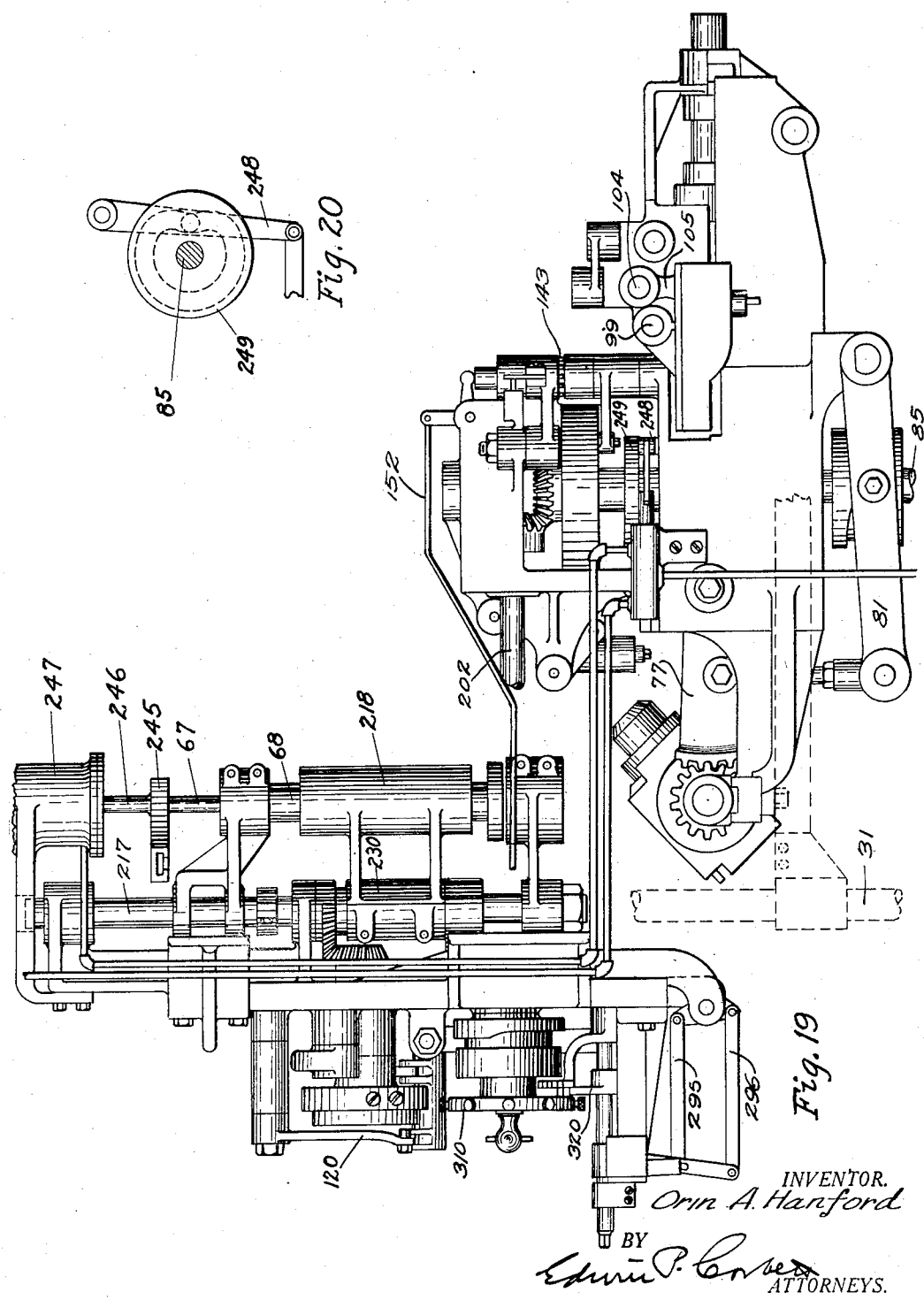

Orin A. Hanford INVENTOR.

BY

ATTORNEY.

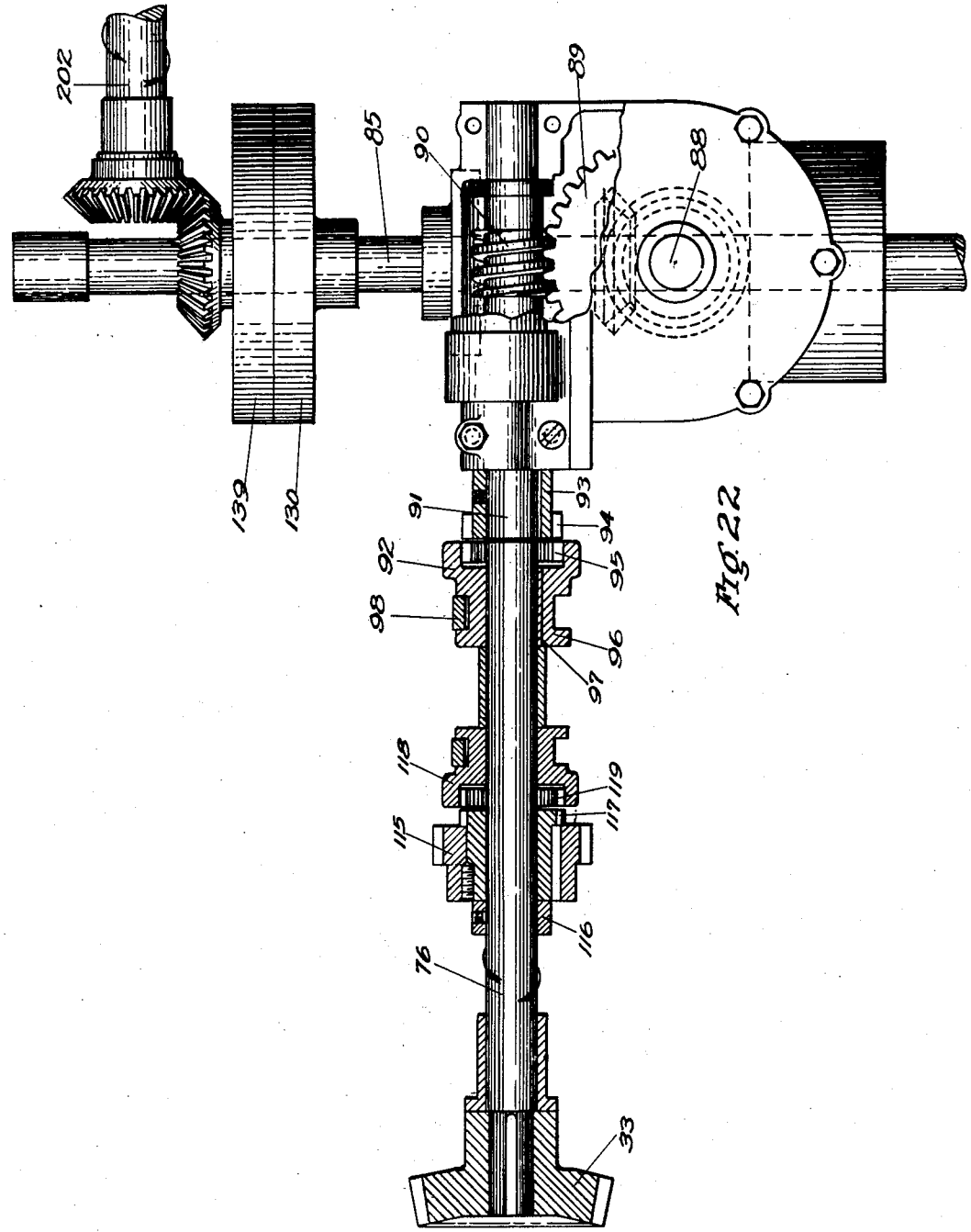

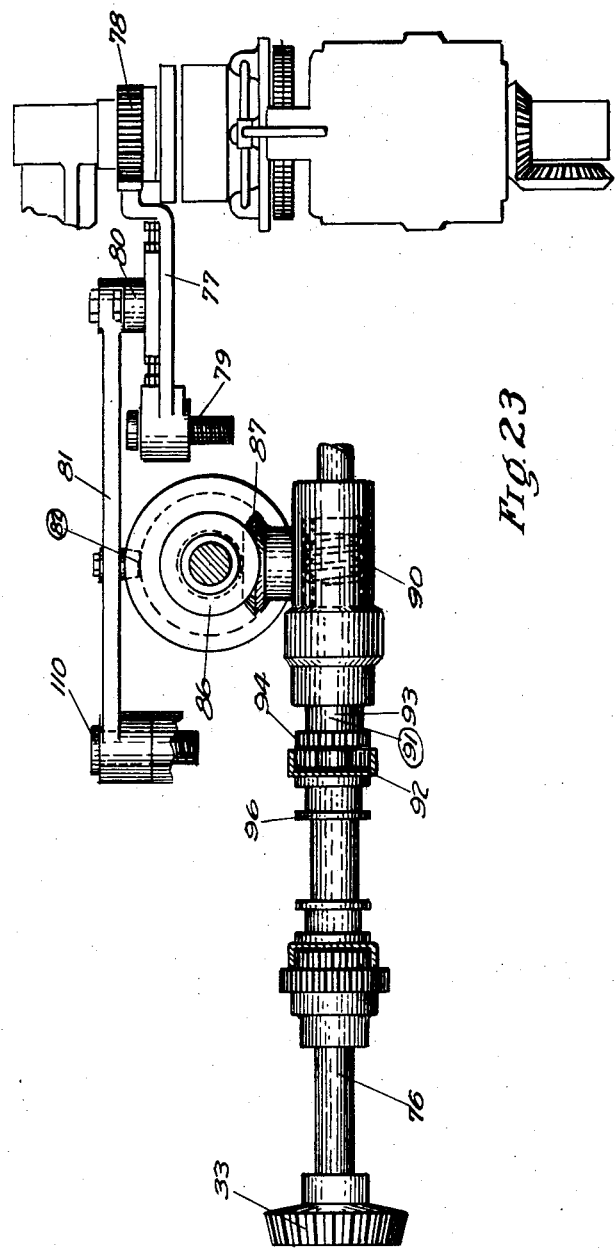

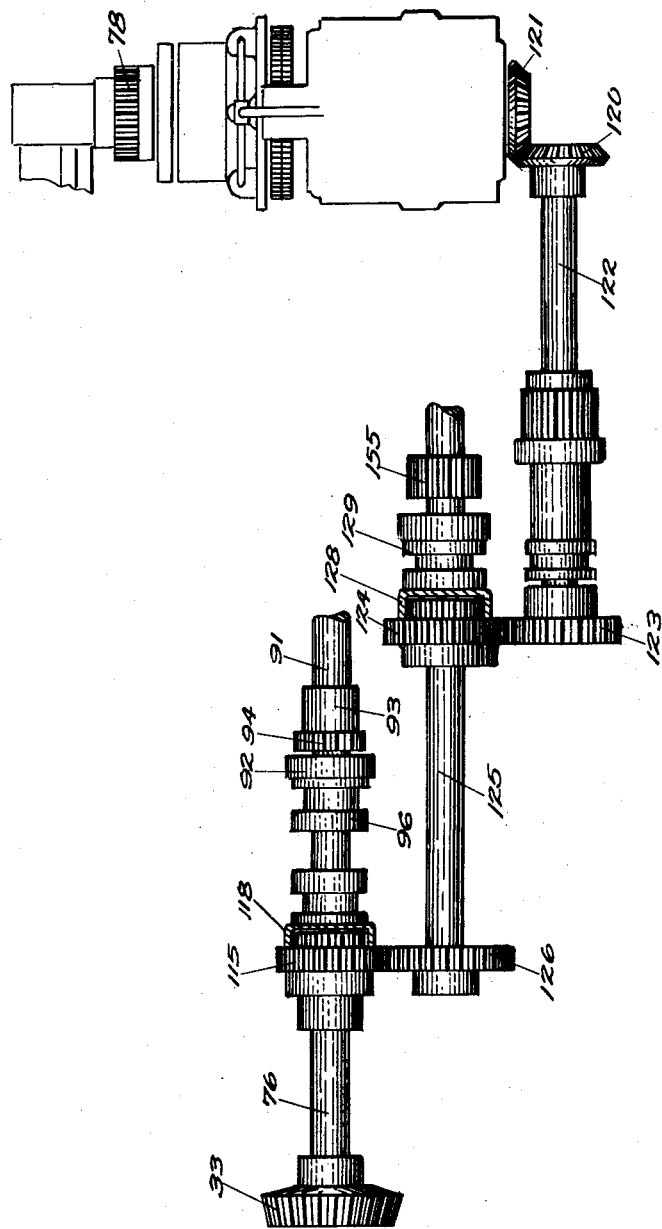

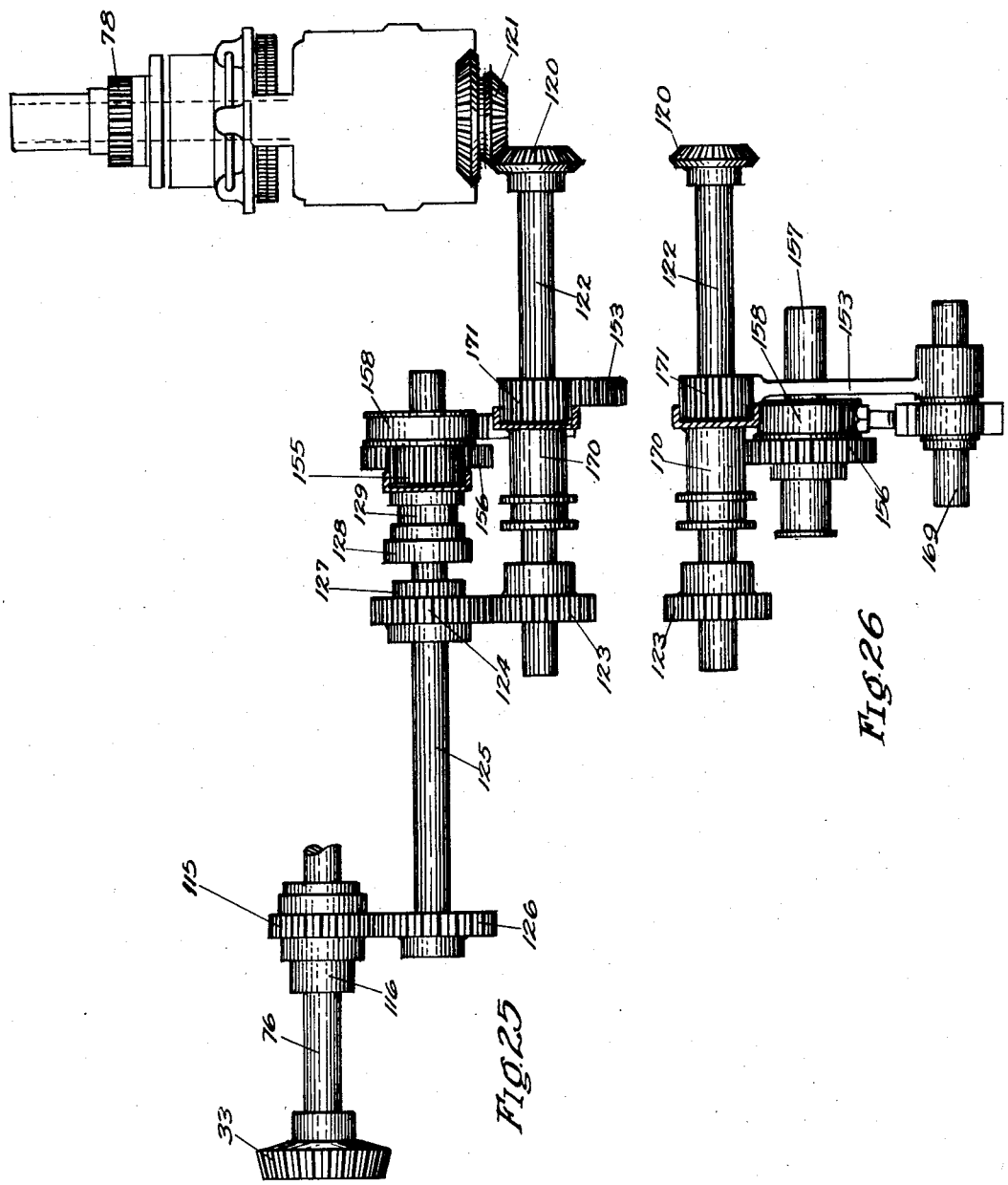

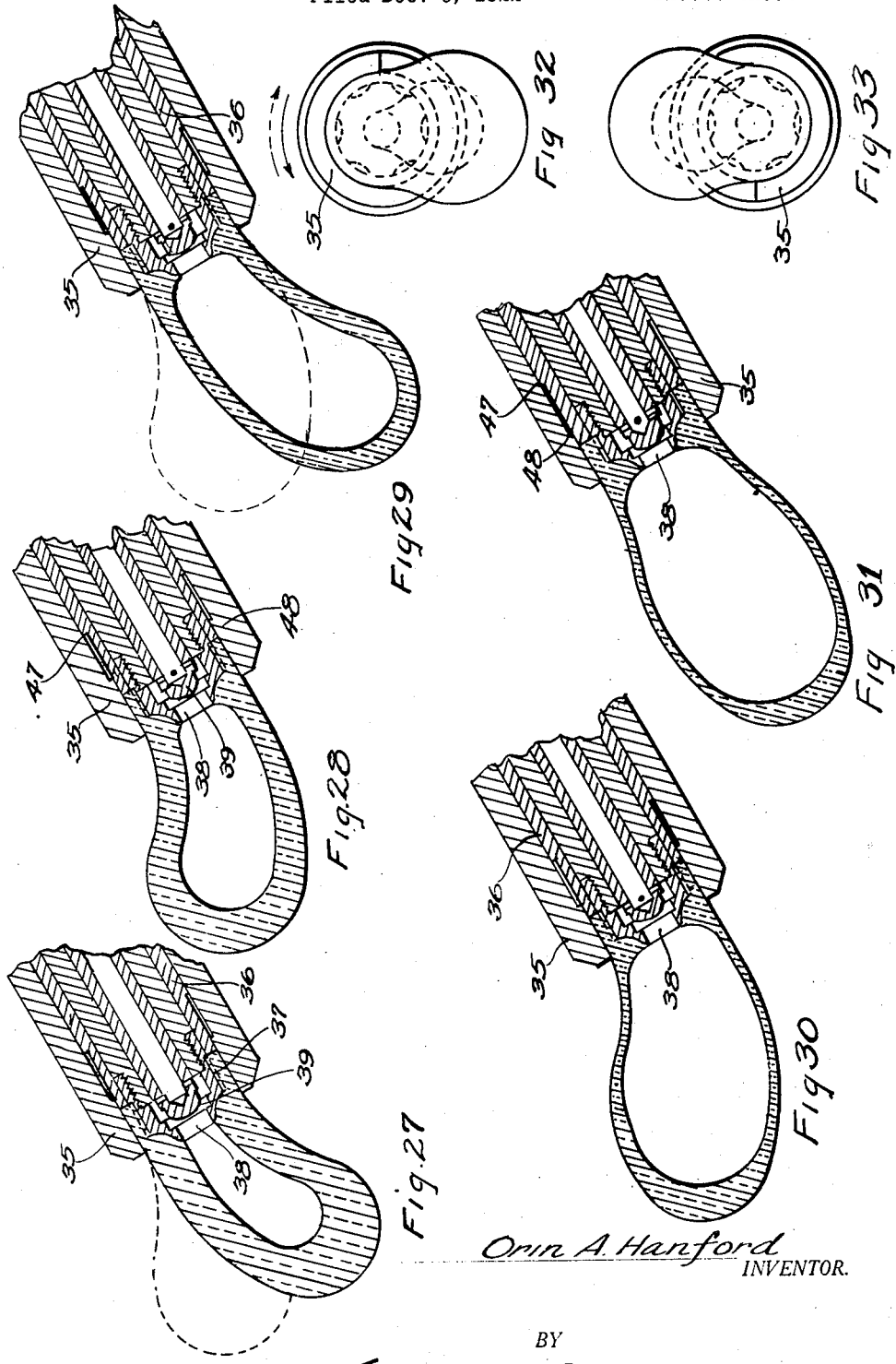

Feb. 21, 1928.

O. A. HANFORD 1,660,125

METHOD AND APPARATUS FOR FORMING GLASSWARE

Filed Dec. 6, 1922    49 Sheets-Sheet 19

Orin A. Hanford INVENTOR.

BY

ATTORNEY.

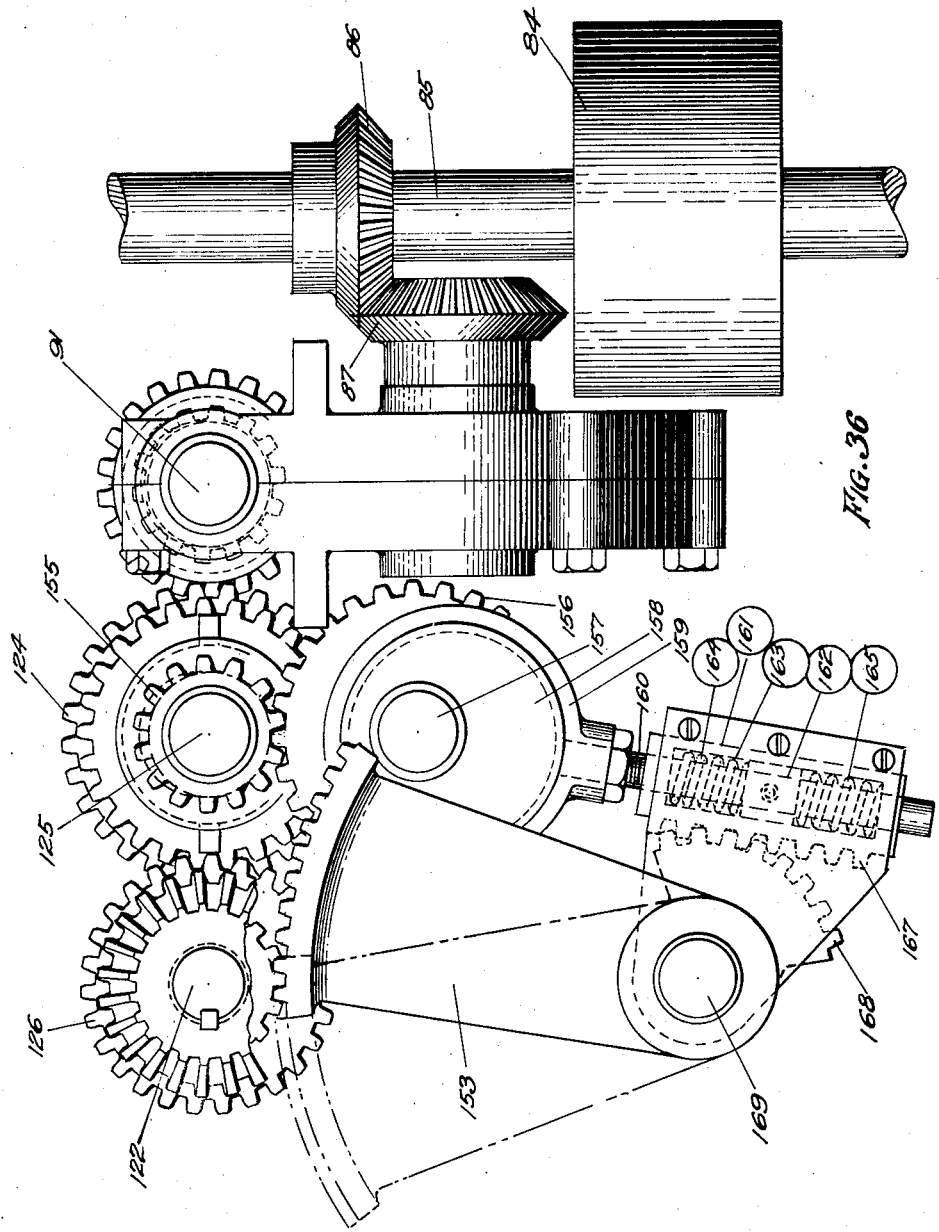

Feb. 21, 1928.
O. A. HANFORD
1,660,125
METHOD AND APPARATUS FOR FORMING GLASSWARE
Filed Dec. 6, 1922   49 Sheets-Sheet 21
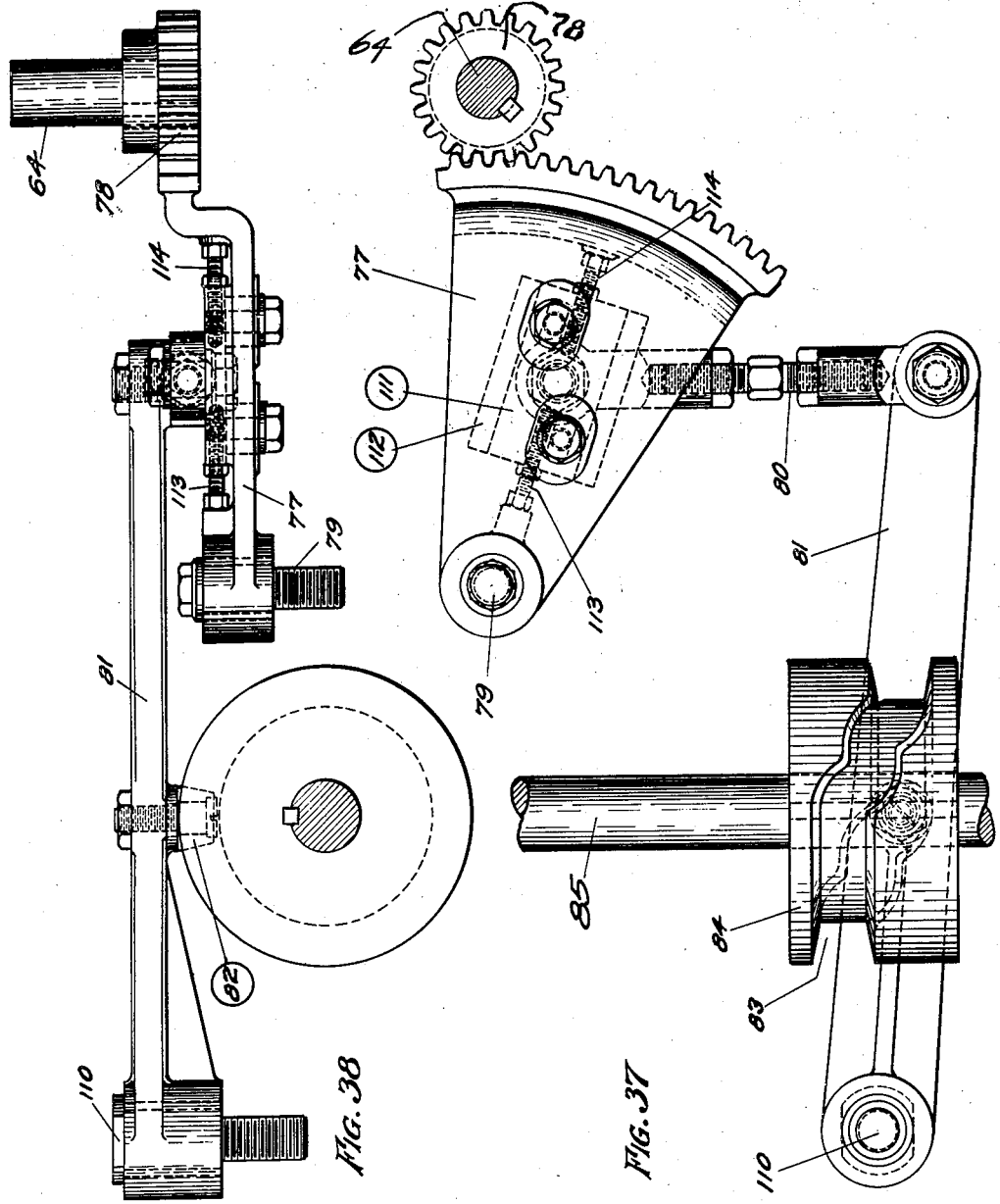
Orin A. Hanford INVENTOR.
BY
Edwin P. Carter ATTORNEY.

Feb. 21, 1928.

O. A. HANFORD 1,660,125

METHOD AND APPARATUS FOR FORMING GLASSWARE

Filed Dec. 6, 1922   49 Sheets-Sheet 22

Orin A. Hanford INVENTOR.

BY

ATTORNEY.

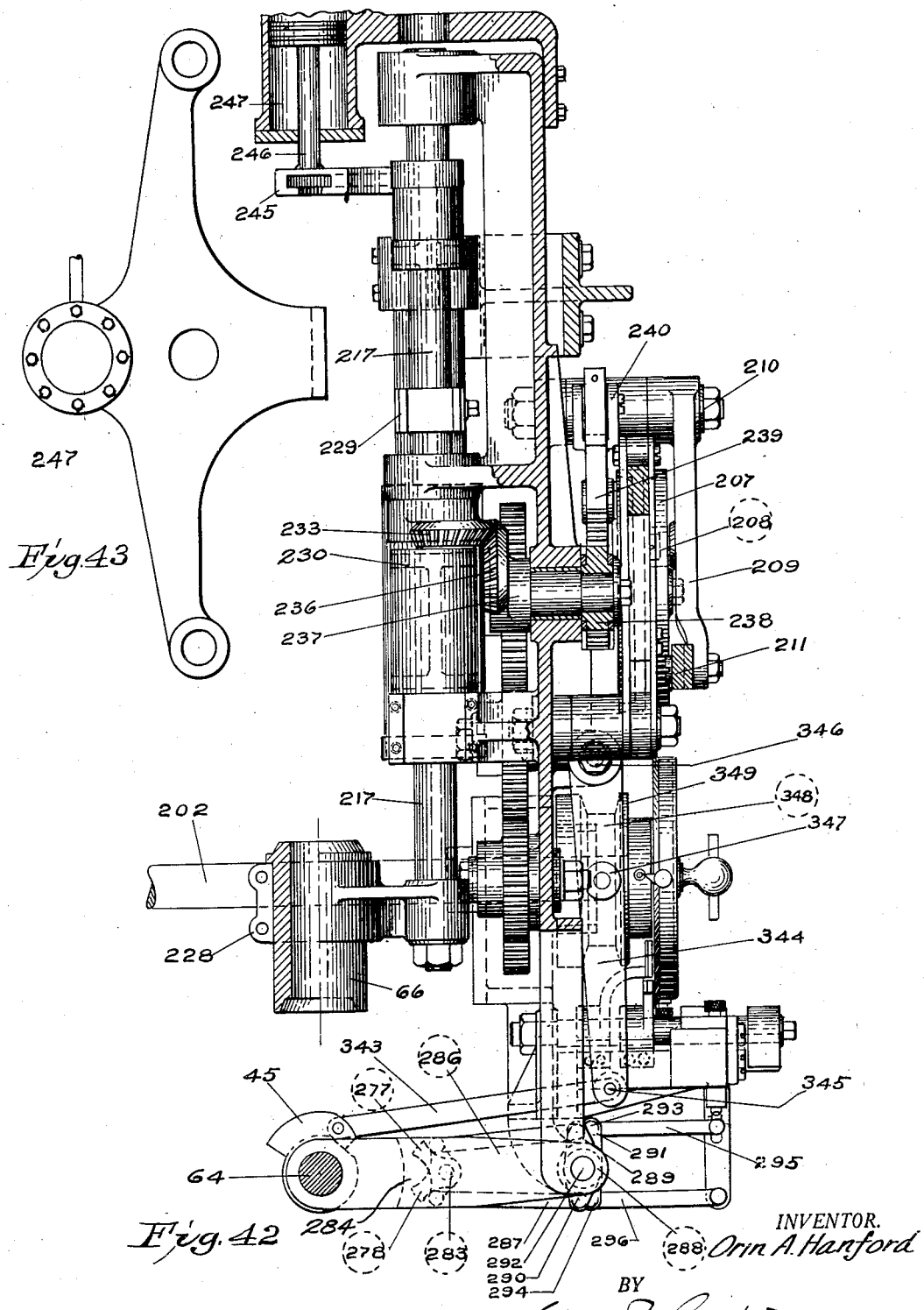

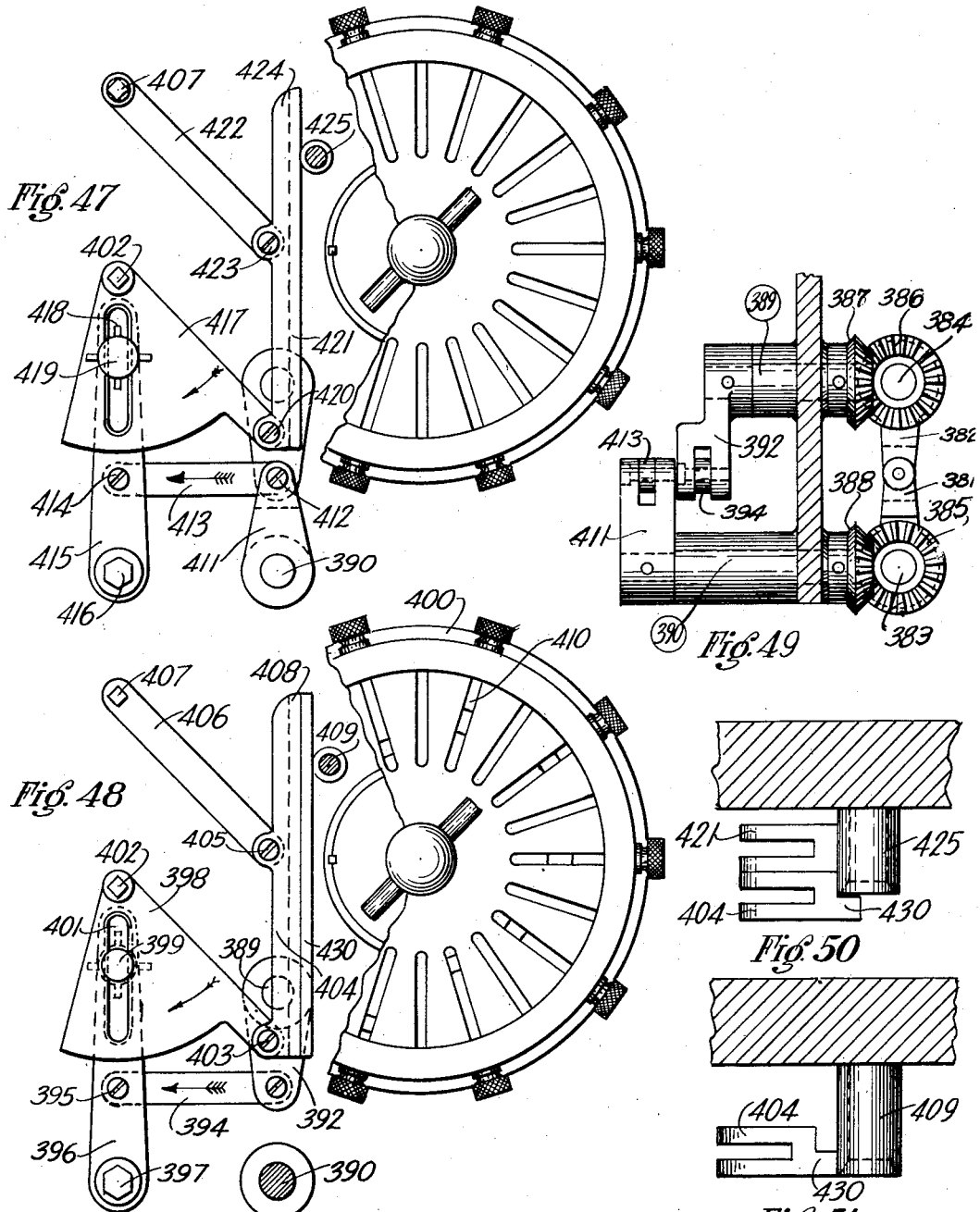

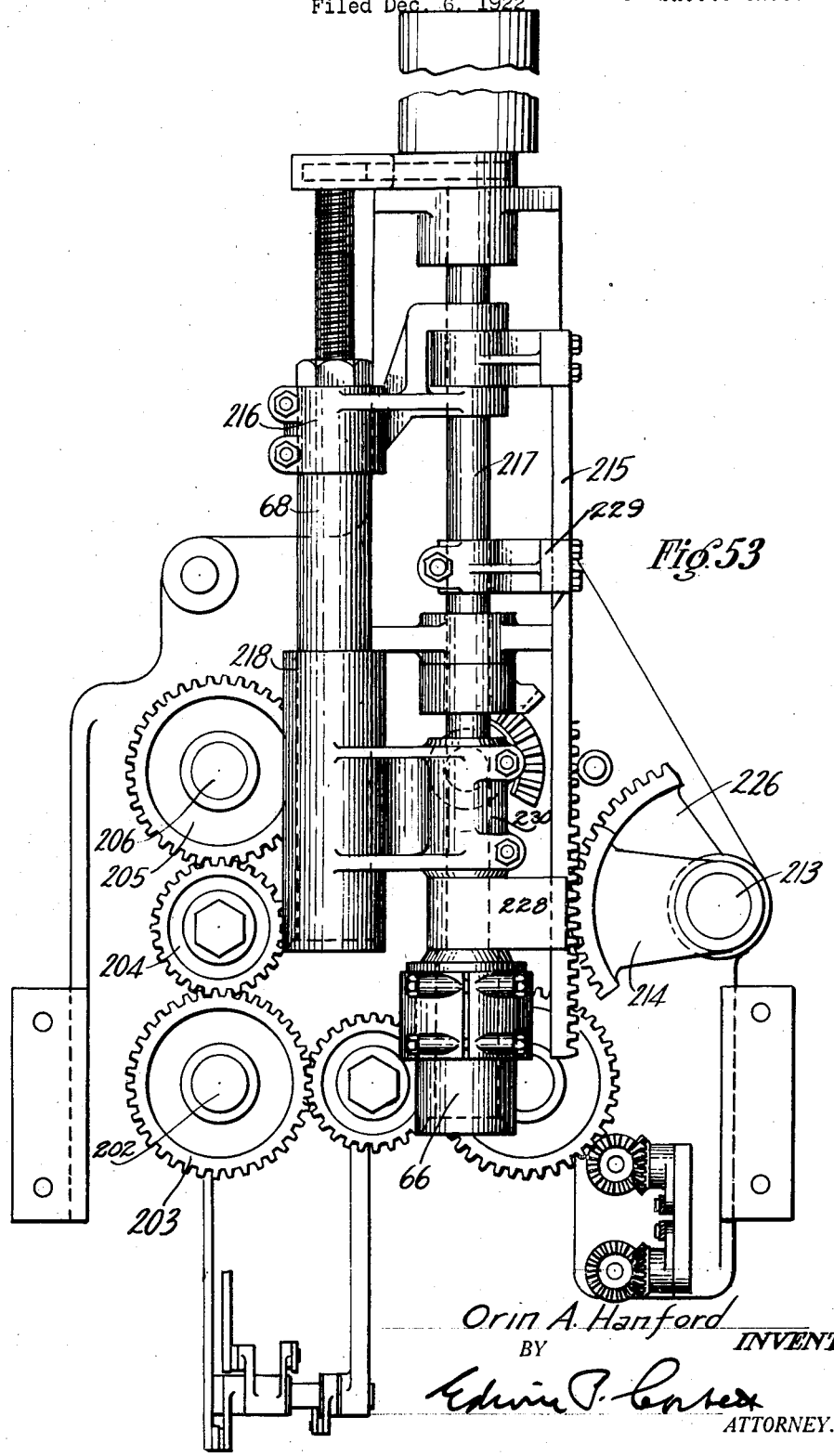

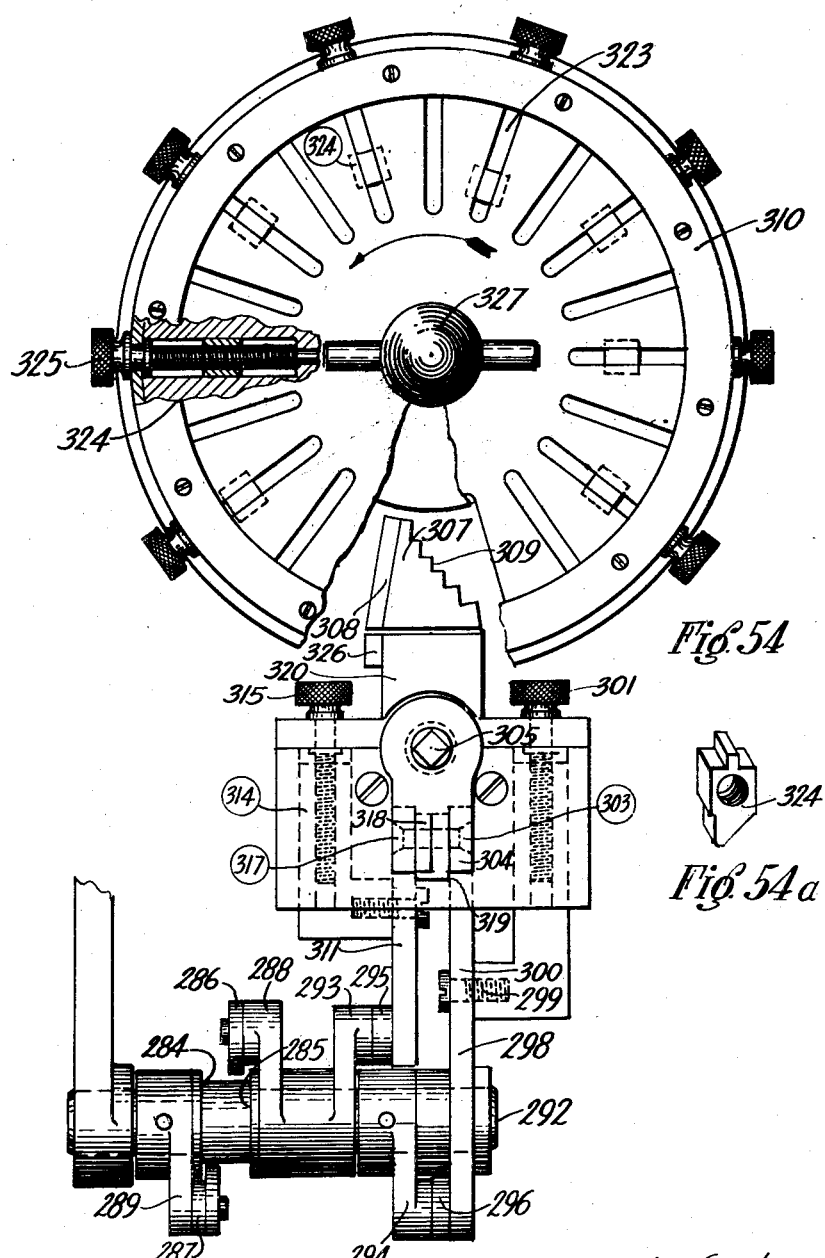

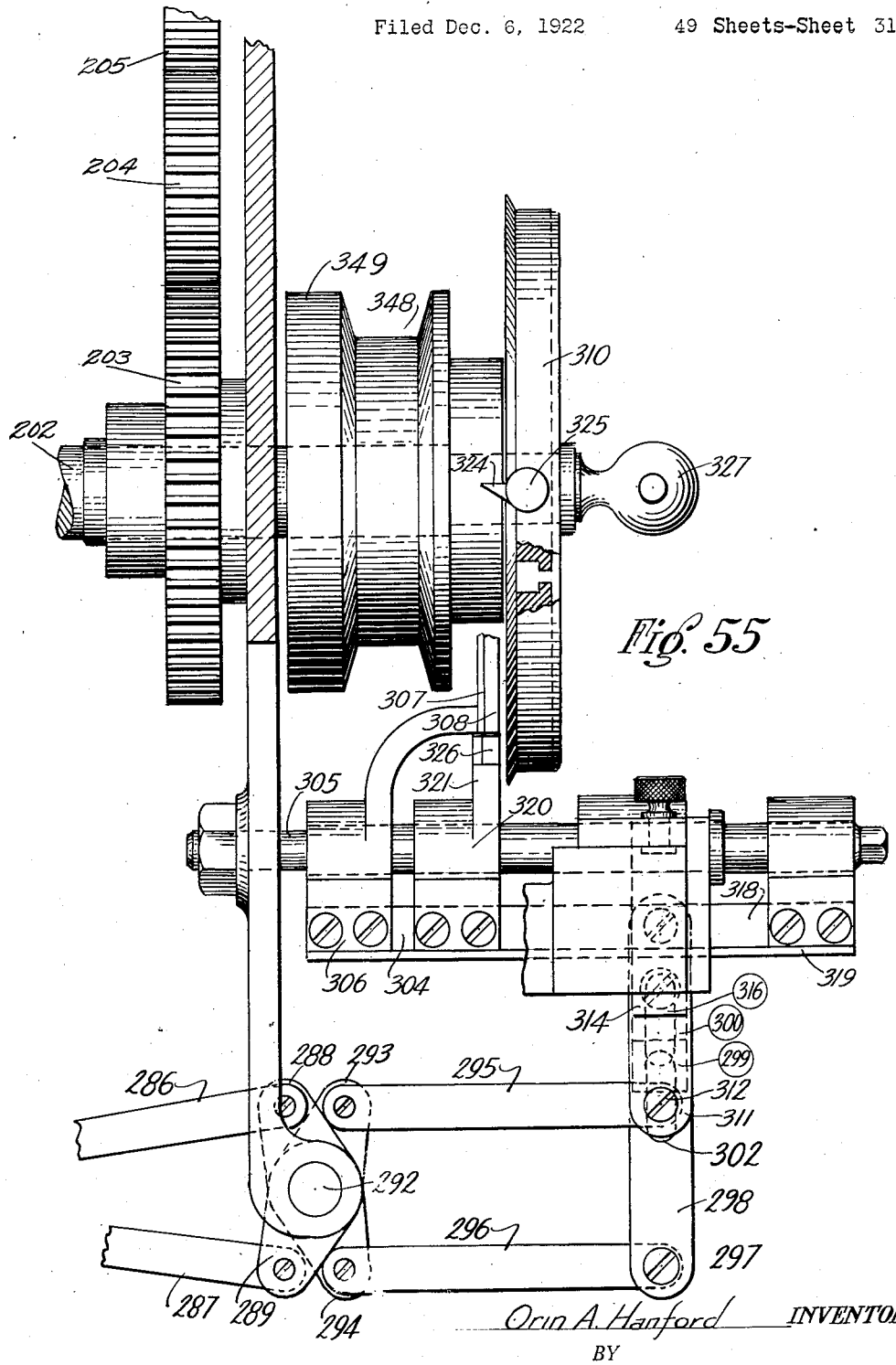

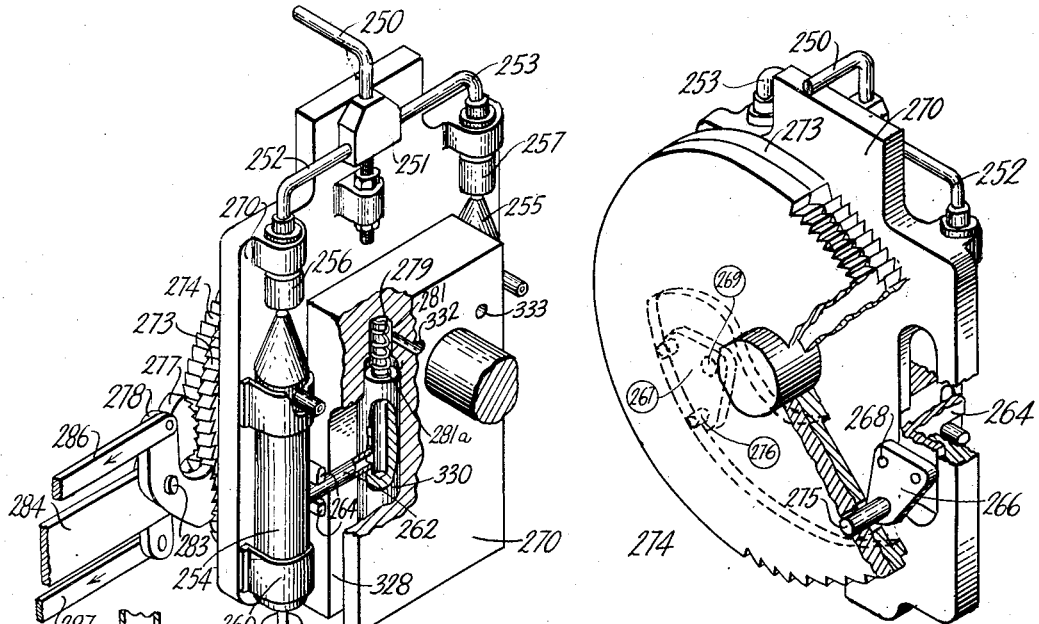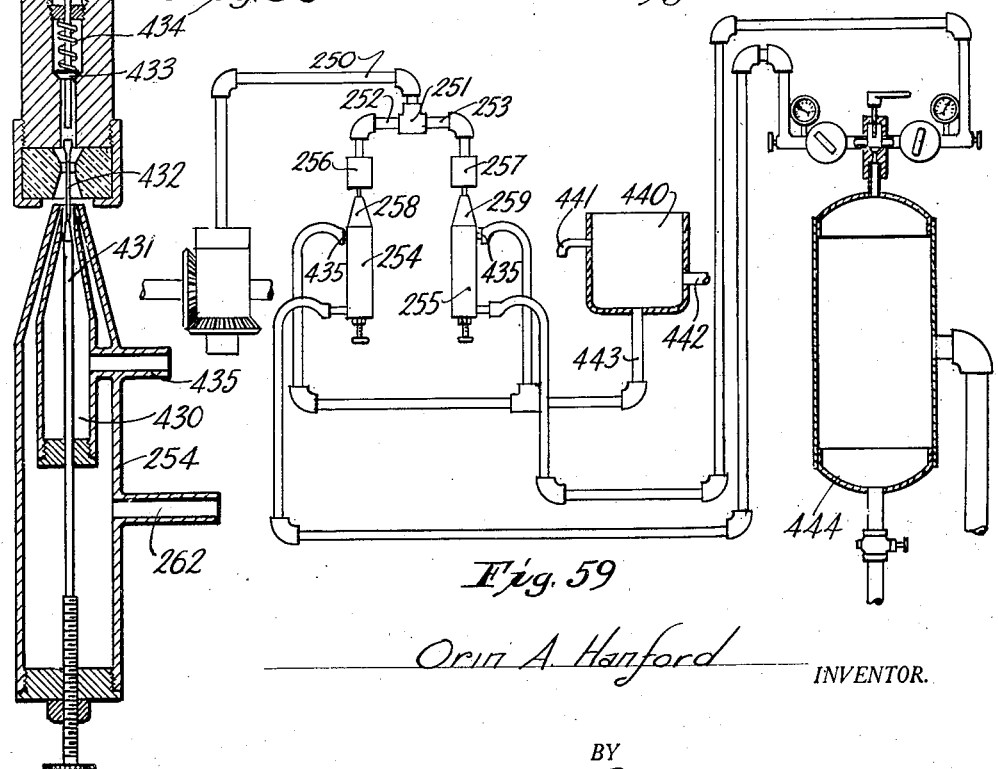

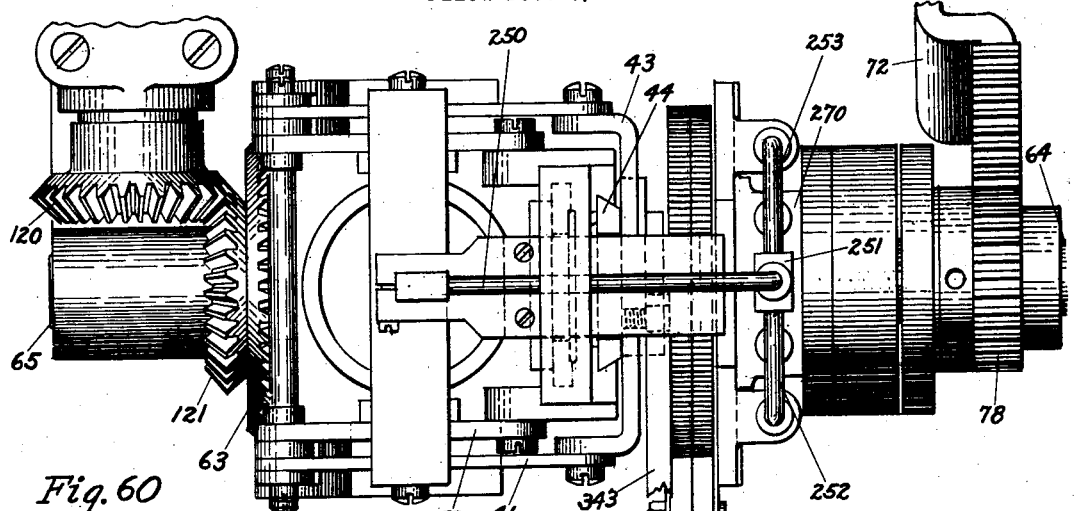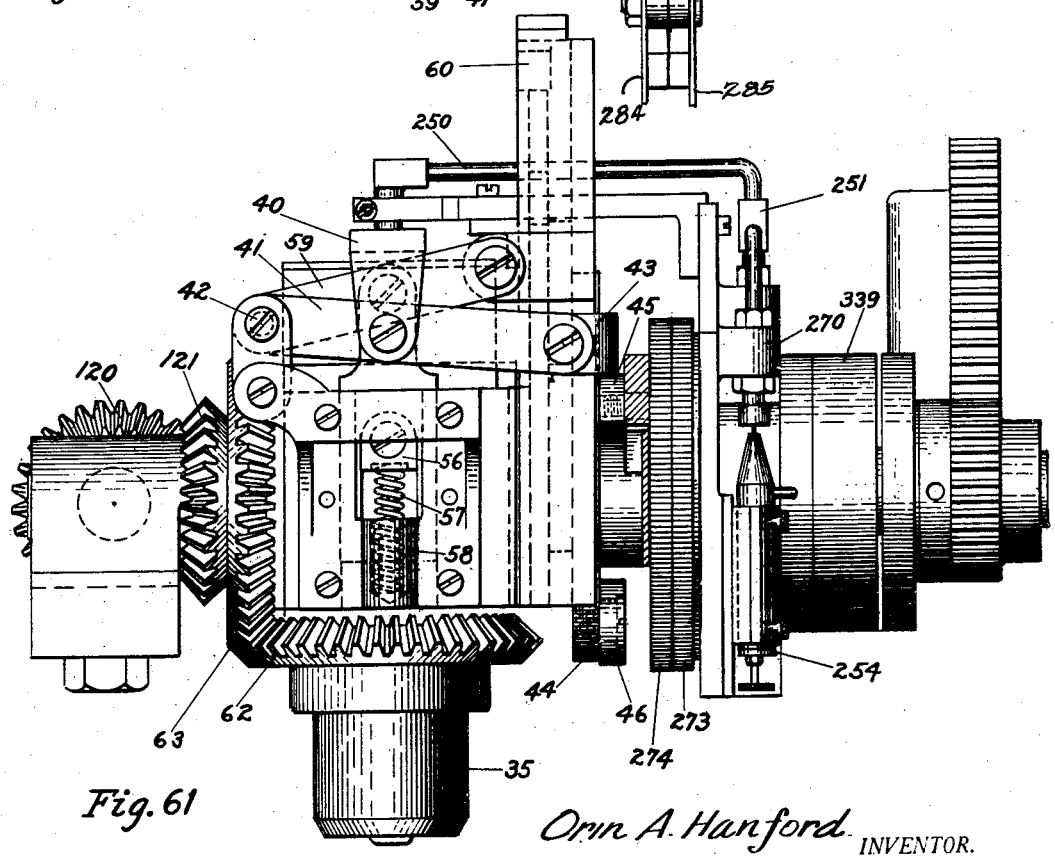

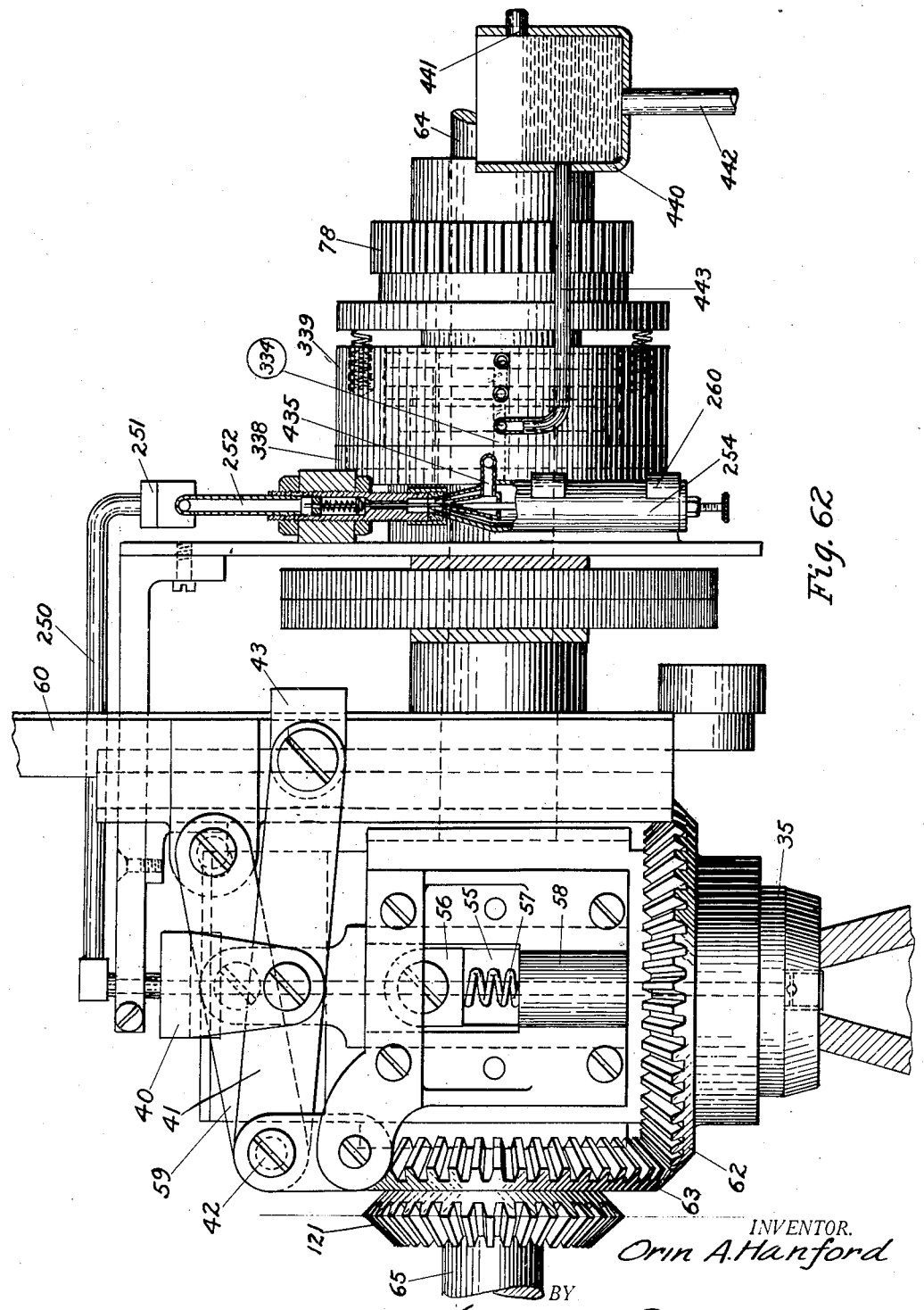

Feb. 21, 1928.
O. A. HANFORD
1,660,125
METHOD AND APPARATUS FOR FORMING GLASSWARE
Filed Dec. 6, 1922 49 Sheets-Sheet 35
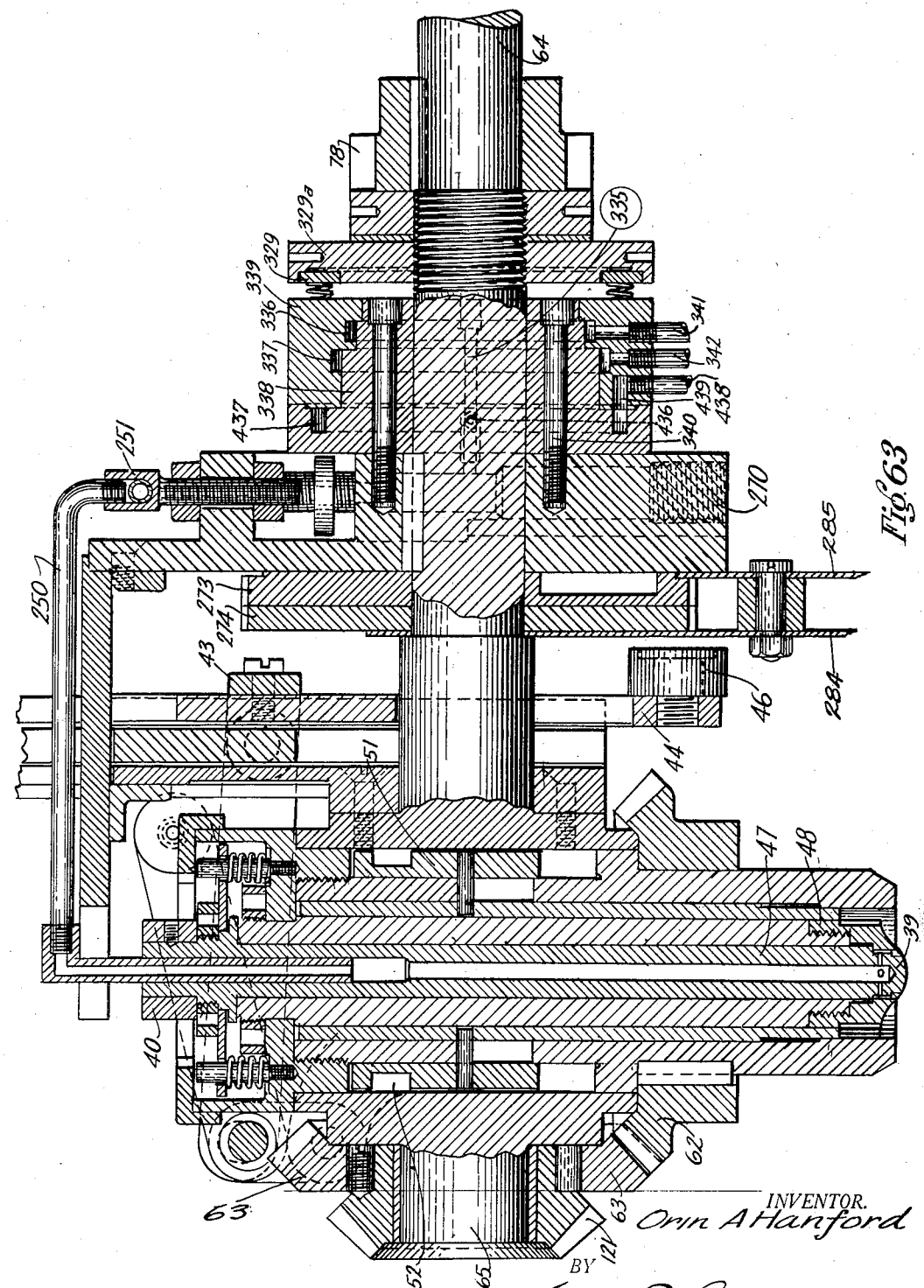
INVENTOR.
Orin A Hanford
BY
Edwin P. Carter
ATTORNEY.

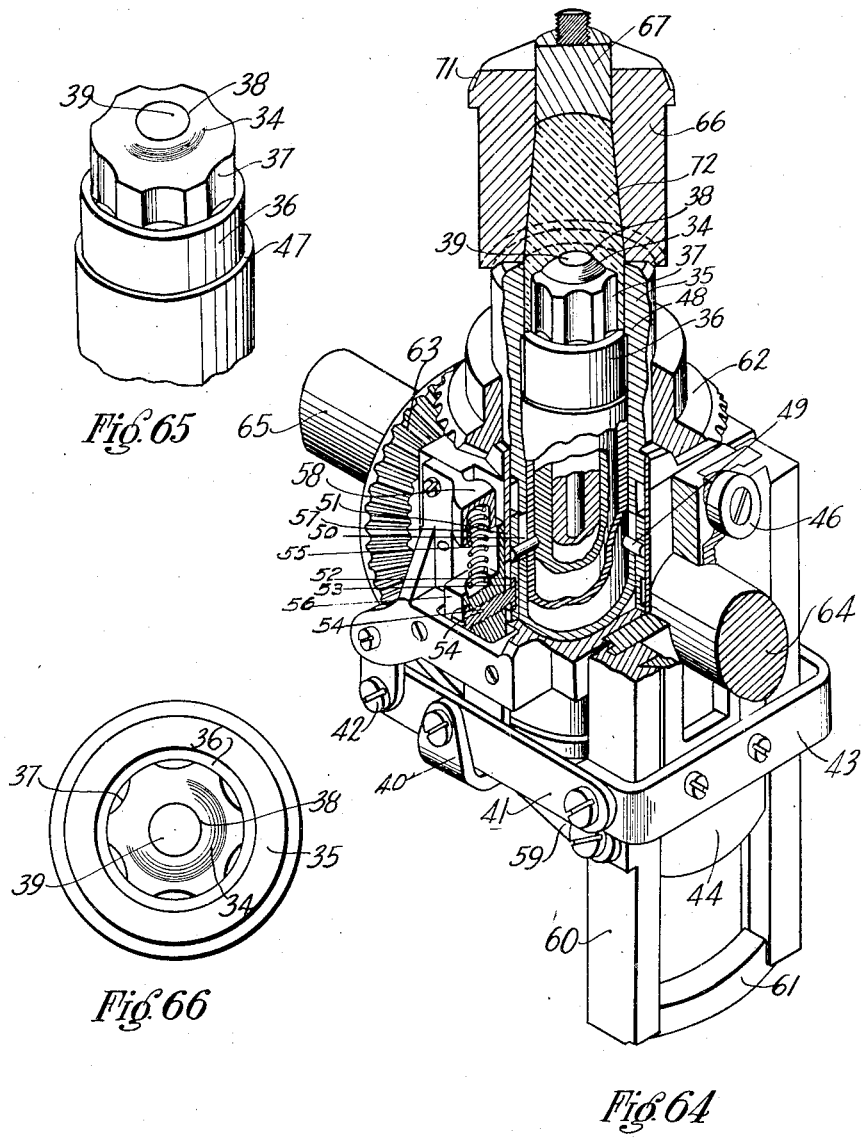

Feb. 21, 1928.
1,660,125
O. A. HANFORD
METHOD AND APPARATUS FOR FORMING GLASSWARE
Filed Dec. 6, 1922
49 Sheets-Sheet 37

Orin A. Hanford Inventor
By Edwin P. Coker Attorney

Feb. 21, 1928.

O. A. HANFORD 1,660,125

METHOD AND APPARATUS FOR FORMING GLASSWARE

Filed Dec. 6, 1922 49 Sheets-Sheet 38

Orrin A. Hanford INVENTOR.

BY

Edwin P. Corker ATTORNEY.

Feb. 21, 1928.

O. A. HANFORD 1,660,125

METHOD AND APPARATUS FOR FORMING GLASSWARE

Filed Dec. 6, 1922    49 Sheets-Sheet 43

Orin A. Hanford INVENTOR.

BY

Edwin P. Carver ATTORNEY.

Feb. 21, 1928.

O. A. HANFORD 1,660,125

METHOD AND APPARATUS FOR FORMING GLASSWARE

Filed Dec. 6, 1922   49 Sheets-Sheet 45

Orin A. Hanford INVENTOR.

BY

Edwin T. Coates ATTORNEY.

Feb. 21, 1928.

O. A. HANFORD 1,660,125

METHOD AND APPARATUS FOR FORMING GLASSWARE

Filed Dec. 6, 1922  49 Sheets-Sheet 46

Orin A. Hanford INVENTOR.

BY

Edwin P. Carex ATTORNEY.

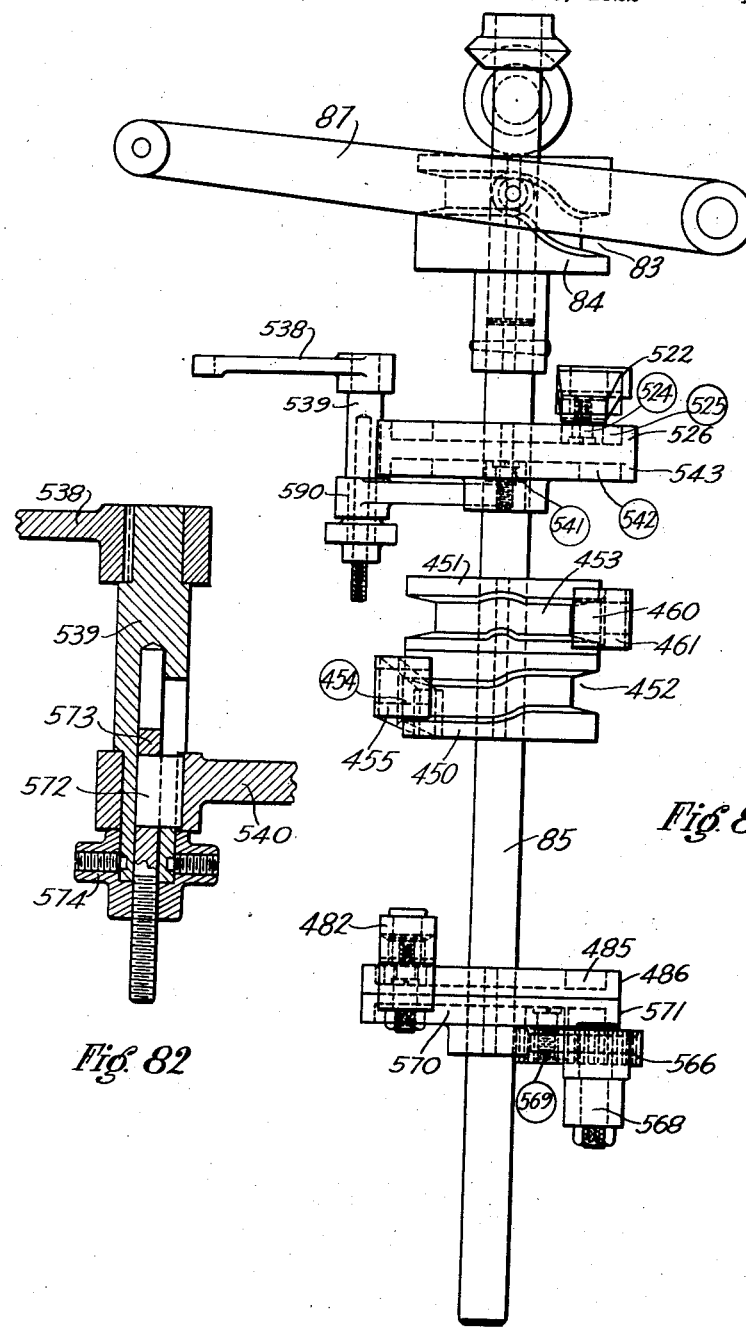

Feb. 21, 1928.

O. A. HANFORD 1,660,125

METHOD AND APPARATUS FOR FORMING GLASSWARE

Filed Dec. 6, 1922     49 Sheets-Sheet 49

Orin A. Hanford
INVENTOR.

BY

ATTORNEY.

Patented Feb. 21, 1928.

1,660,125

UNITED STATES PATENT OFFICE.

ORIN A. HANFORD, OF COLUMBUS, OHIO, ASSIGNOR TO THE FEDERAL GLASS COMPANY, OF COLUMBUS, OHIO, A CORPORATION OF OHIO.

METHOD AND APPARATUS FOR FORMING GLASSWARE.

Application filed December 6, 1922. Serial No. 605,319.

My invention relates to method and apparatus for forming glassware. It is particularly applicable to blown ware, being highly desirable in the making of blown tumblers and similar thin ware such as electric light bulbs.

The class of ware referred to is mainly manufactured at the present time by hand operators. Machines have been devised which aim to remove this class of ware from the exclusive field of hand manufacture but the success of these machines from an economical standpoint is extremely problematical. The best known types of machines of this class comprise a plurality of suction devices which are successively projected through the window of a tank to gather charges of glass and then withdrawn and manipulated both alone and in conjunction with the forming apparatus to effect production of the finished article, the forming, marvering, elongation and blowing of the charge being ordinarily performed while the suction gathering device is passing in a circle and ultimately back to the station from which it is projected into the tank for the gathering of subsequent charges.

My aim is the provision of an entirely novel method of getting the charge to the novel forming apparatus coupled with a number of novel methods of manipulation and coupled with many novel combinations and subcombinations of apparatus for producing the blown articles and delivering them from the machine. In its preferred form, my apparatus contemplates the provision of a plurality of identical ware-forming units arranged immovably and in series. In the form shown in the appended drawings, this series is circular, although results may be attained by the placing of the forming mechanisms in an arcuate or straight line series.

Each one of the forming units of the series is preferably a complete entity which is capable of receiving the charge, forming and marvering, or forming and blocking to produce the blank, elongating, blowing and ejecting the blown article. Furthermore, these units are preferably successively fed by an automatic lump forming feeder supplemented by distributing mechanism for successively delivering each charge to its unit and initiating the operation of this unit to effect the various steps of manipulation and discharge of the article. My method and apparatus preferably contemplates the overlapping of several units at a time, that is, the starting of one unit before the preceding unit has completed its operation upon the charge just delivered to it, it being obvious that the degree of overlapping may vary as desired.

Preferably, the units are independently removable from the entire apparatus. This is advantageous because it makes possible the continued operation of the apparatus as a whole while a unit which may need repair or adjustment is being removed to a workshop or other point away from hindrance of the apparatus remaining in operation.

The preferred form of my invention is shown in the accompanying drawings wherein similar characters of reference designate corresponding parts and wherein Figure 1 is a plan view, partly in section, of the preferred form of my complete glass forming apparatus, and showing all of the units in place and in contact with the central power transmission unit and also showing two of the blowing head units in operative position and the rest of the blowing head units in normal vertical position.

Figure 4 is an enlarged fragmentary view of three of the units shown in Figure 3, and showing in particular the receiving mold and forming plunger and the head for operating both of said units, and also showing the marvering roller and means for operating the same.

Figure 5 is a diagrammatical elevation showing two diametrically disposed units of my complete apparatus, and also showing the central power distributing unit for controlling all of the units and also for controlling the individual operation of each separate unit.

Figure 6 is a detail view of my automatic unit starting and stopping mechanism.

Figure 7 is a detail plan view of a cam, carried by the main cam shaft of each unit, for rendering my automatic starting and stopping device inoperative.

Figure 8 is a diagrammatical side elevation of a single complete glass forming unit, and showing my novel glass distributing apparatus, the manner of conducting the charges from the charge forming station to the receiving mold of the forming unit and the manner of rendering said forming unit operative after the glass has been delivered to the unit.

Figure 9 is a plan view of the operating and timing mechanism for automatically and intermittently revolving my distributing apparatus.

Figure 10 is a plan view of a single glass forming unit removed from my complete forming apparatus, and showing a general arrangement of the power transmission mechanism and relative parts, and the interfitting relation of the frame thereof.

Figure 12 is a side elevation of a complete glass forming unit, and showing the glass distributing means, means for manipulating the blank from the charge of glass to the complete formed article and means for conveying said article from the unit.

Figure 13 is a detail view similar to Figure 6 of the mechanism for shifting the clutches to transmit the rotation of the unit driving shaft to the respective parts of the unit.

Figure 14 is a fragmentary side elevation of the structure shown in Figure 12, and showing a charge of glass in the position where it is forced upon the blank supporting head.

Figure 15 is a fragmentary view similar to Figure 14 and showing the blank mold and forming plunger in their raised position, and also showing the blowing head and the blank thereon revolved to marvering position and in contact with the marvering roller.

Figure 16 is a view similar to Figure 15, but showing the forming plunger and its sleeve swung into inoperative position, and also showing the blowing head revolved in its angular elongating position.

Figure 17 is a view similar to Figure 16, and showing the blowing head revolved to vertical downward position and showing the blank in final blown position and conforming to the contour of the blowing mold.

Figure 18 is a detail view, partially in section, of the blank retaining head shown in Figure 16.

Figure 19 is a diagrammatical and fragmentary side elevation of the opposite side of the unit structure shown in Figure 12.

Figure 20 is an enlarged detail view of the cam and cam lever shown in Figure 19 for operating the three way valve which controls the movement of the forming plunger.

Figure 22 is a detail view, partly in section, of a unit main driving shaft and showing the manner of connecting this shaft to the main cam shaft.

Figure 23 is a diagrammatical plan view of the mechanism for transmitting the rotation of the main driving shaft into oscillation of the blowing head unit, and also showing the main shaft and cam thereon and the adjustable means for transmitting the motion of the cam to the blowing head.

Figure 24 is a diagrammatical plan view, partly in section, of the related mechanism for transmitting the rotation of the main driving shaft into rotation of the blank holding means of the blowing head.

Figure 25 is a diagrammatical plan view, partly in section, of the related mechanism for transmitting the rotation of the main driving shaft into oscillation of the blank retaining means of the blowing head.

Figure 26 is a detail view of the shaft for controlling all movements of the blank retaining means and also showing the mechanism for causing oscillation of this shaft.

Figure 27 is a detail view of the blank holding member of the blowing head in the initial stage of the elongation of the blank, wherein the blank is being held in an inclined position and a small puff of air has been introduced and the blank is sagging so as to stretch the upper side thereof and compress the lower side. The dotted lines show the position from which the blank has been oscillated or dropped.

Figure 28 shows the blank in the position it assumes immediately after the position shown in Figure 27, wherein additional air has been introduced and the blank holding head oscillated.

Figure 29 is a detail view illustrating the blank immediately after the next oscillation, the dotted and full line presentations indicating the position from which the blank drops to effect stretching of the opposite side from that stretched in Figure 27 and also to effect compression of the under side of the blank.

Figure 30 is a detail view illustrating the oscillation of the blank immediately subsequent to the steps shown in Figure 29.

Figure 31 is a detail view similar to the structure shown in Figure 30, and showing the blank as it would appear at the termination of the oscillating process and when the head has been swung until the blank is depending vertically.

Figure 32 is a detail end view of the blank as shown in Figures 27 and 29, the alternate directions of movement of the blank being illustrated by dotted and full line arrows.

Figure 33 is a detail view similar to Figure 32 and illustrating the blank in the positions as shown in Figures 28 and 30.

Figure 34:
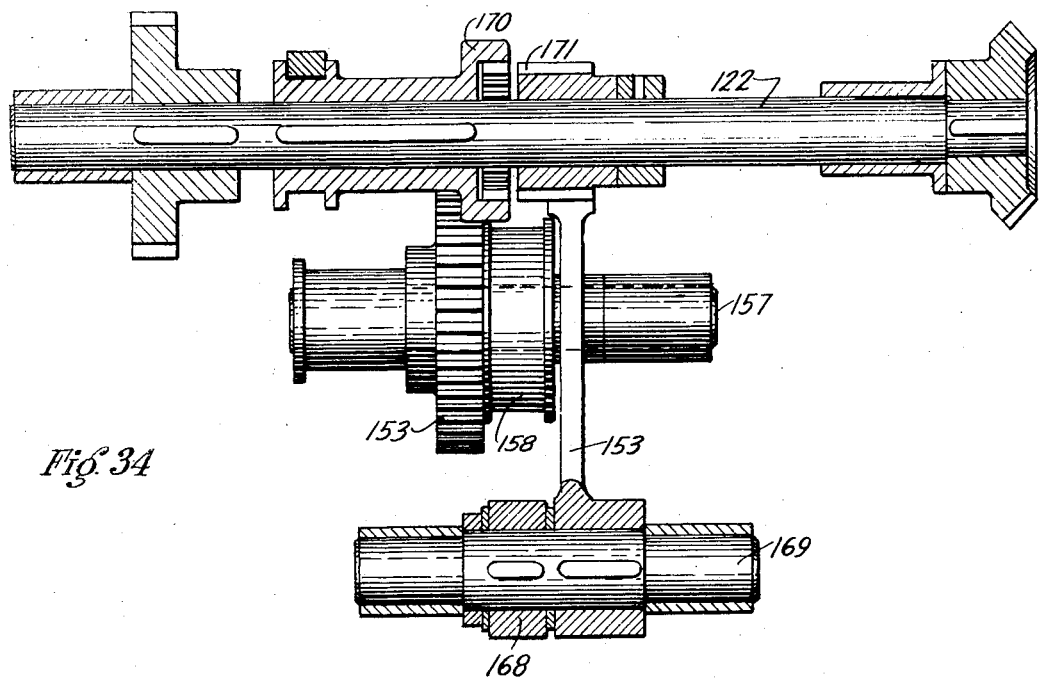

Figure 34 is an enlarged detail view, partly in section, of the shaft for controlling the operation of the blank holding head and the means for causing the oscillation of this shaft.

Figure 35:
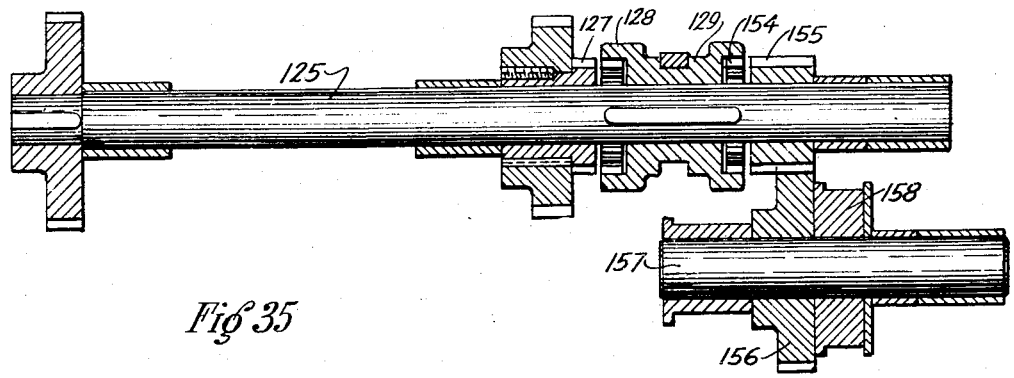

Figure 35 is an enlarged detail view of the intermediate shaft for transmitting the rotation of the main driving shaft to the mechanism for causing the oscillation of the blank holding head shaft.

Figure 36 is an enlarged detail transverse elevation of the mechanism for transmitting the rotation of the unit driving shaft to the various mechanisms for operating all of the parts of the unit.

Figure 37 is an enlarged fragmentary view of the mechanism for transmitting the rotation of the main cam shaft into oscillation of the blowing head shaft, and showing the mechanism for adjusting the throw and position of this blowing head shaft.

Figure 38 is a fragmentary plan view of the structure shown in Figure 37.

Figure 39:
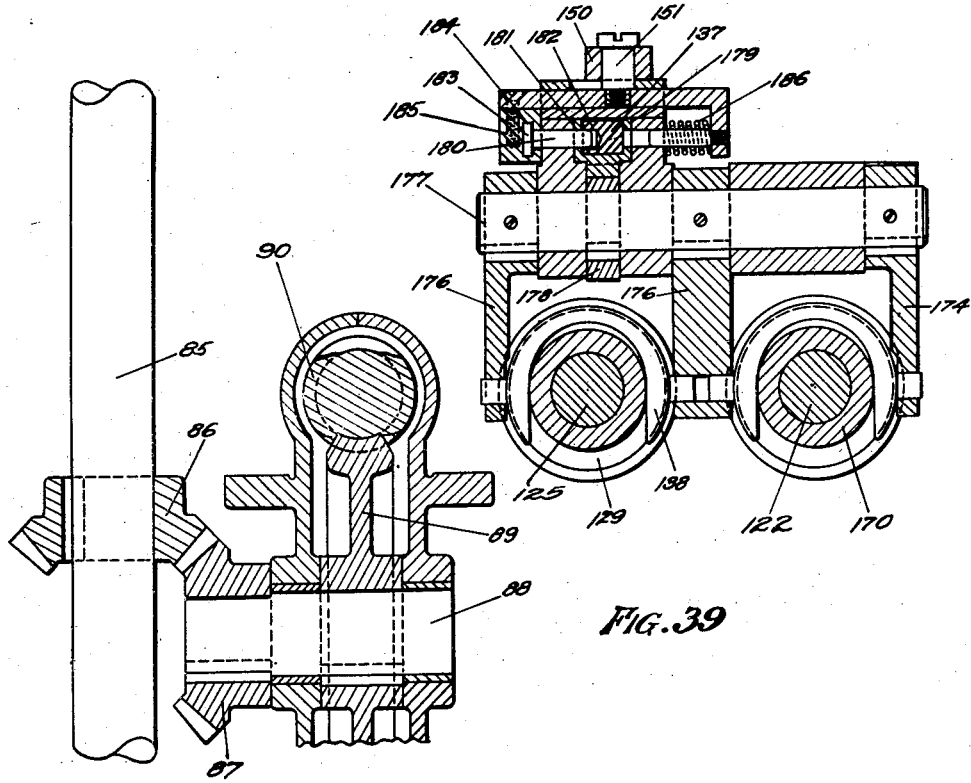

Figure 39 is an enlarged cross-sectional view taken on line 39—39 of Figure 10, and showing the main unit driving shaft, the intermediate shaft, the blank holding head controlling shaft and the mechanism for controlling the rotation, oscillation, or neutral position of said blank holding head controlling shaft.

Figures 40, 41:
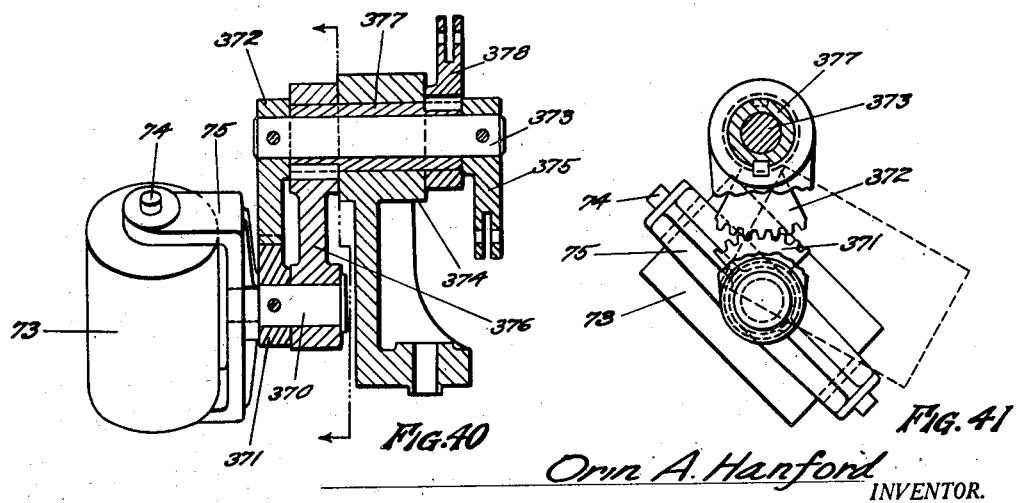

Figure 40 is a detail view of my novel marvering mechanism, and showing the means for swinging the marvering roller and the means for causing rotation of this marvering roller about an axis at right angles to the axis of the roller.

Figure 41 is a detail fragmentary side elevation of the structure shown in Figure 40, and showing in dotted lines the position of the marvering roller after it has been swung and rotated to a new marvering position.

Figure 42 is an enlarged elevation, partly in section, of a unit head frame and its related mechanism, and showing the cylinder mechanism for operating the forming plunger, the means for oscillating this forming plunger and the means for controlling the introduction of air into the blowing head.

Figure 43 is a detail plan view of the plunger cylinder structure and a frame for securing it to the main head frame of the unit.

Figure 44:
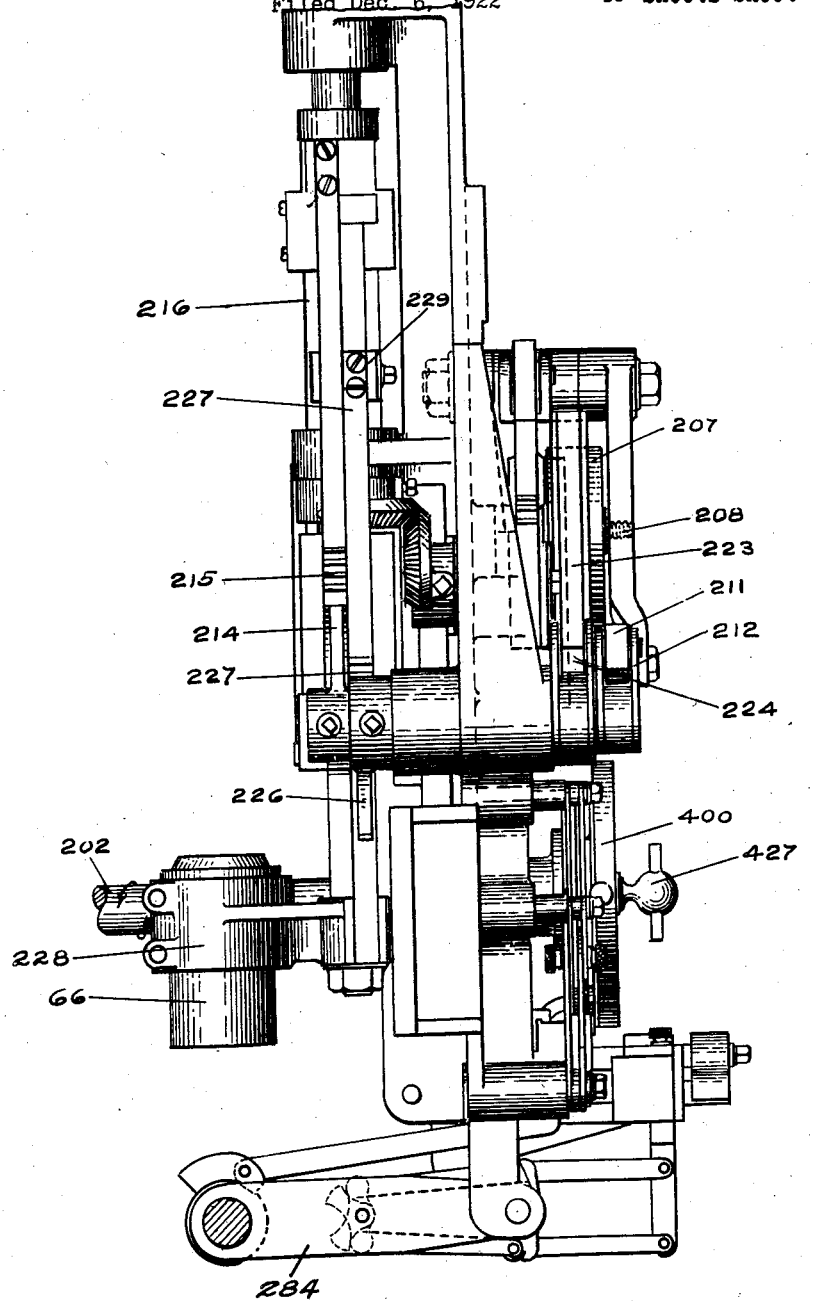

Figure 44 is an enlarged elevation similar to Figure 42, and showing in addition the mechanism for raising and lowering the plunger and blank mold mechanisms and the means for controlling the operation of the marvering roller.

Figure 45:
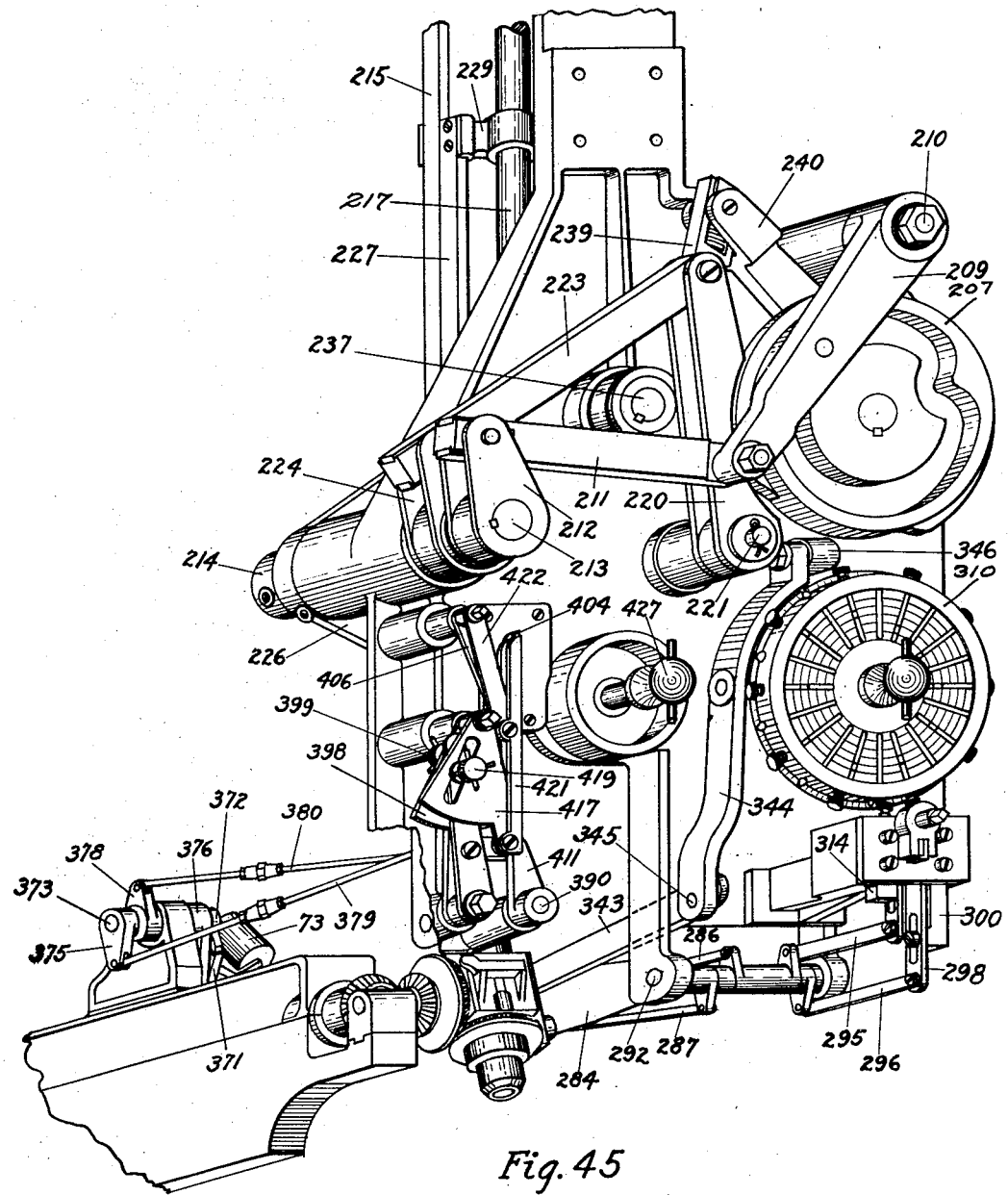

Figure 45 is a fragmentary perspective view of the front of a glass forming unit, and showing the marvering cam dial removed.

Figure 46:
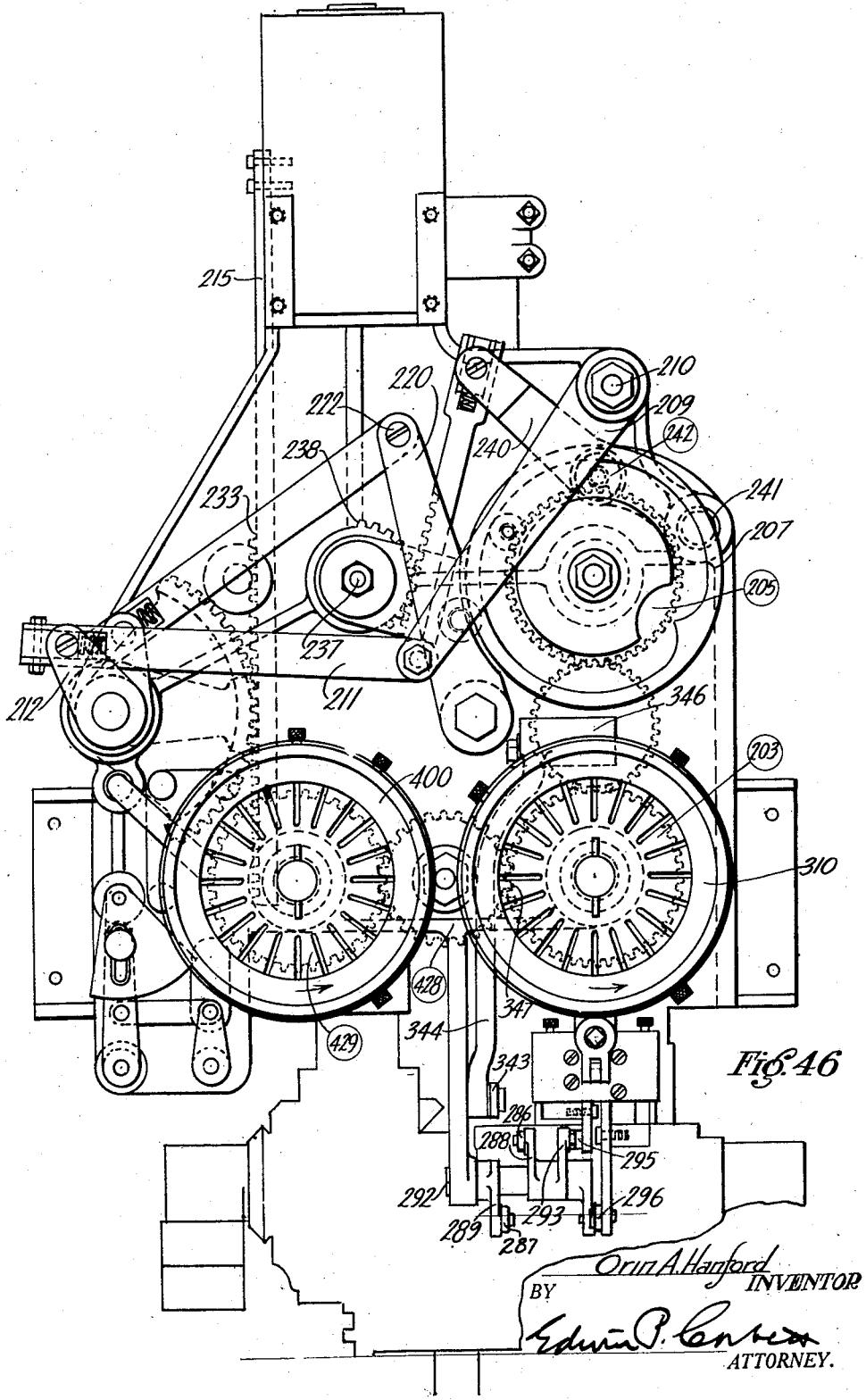

Figure 46 is a front elevation of one of my glass forming units, and showing the mechanism for automatically controlling the former and blank mold mechanisms and the dials for adjustably controlling the introduction of air to the blank and the marvering of the blank.

Figure 47 is a detail view, partly diagrammatical, of the marvering cam dial and the link and cam lever structure for controlling the rotation of the marvering roller.

Figure 48 is a detail view similar to Figure 47 showing the cam lever and link structure for controlling the swinging of the marvering roller.

Figure 49 is a detail view, partly in section, of the links and bevel gear structure for transmitting the motion of the cam levers to the marvering roller.

Figure 50 is a bottom fragmentary plan view, partly in section, of the two cam levers and the roller for operating one or both of said levers.

Figure 51 is a fragmentary view similar to Figure 50 but showing the cam lever for operating the swinging cam lever.

Figure 52:
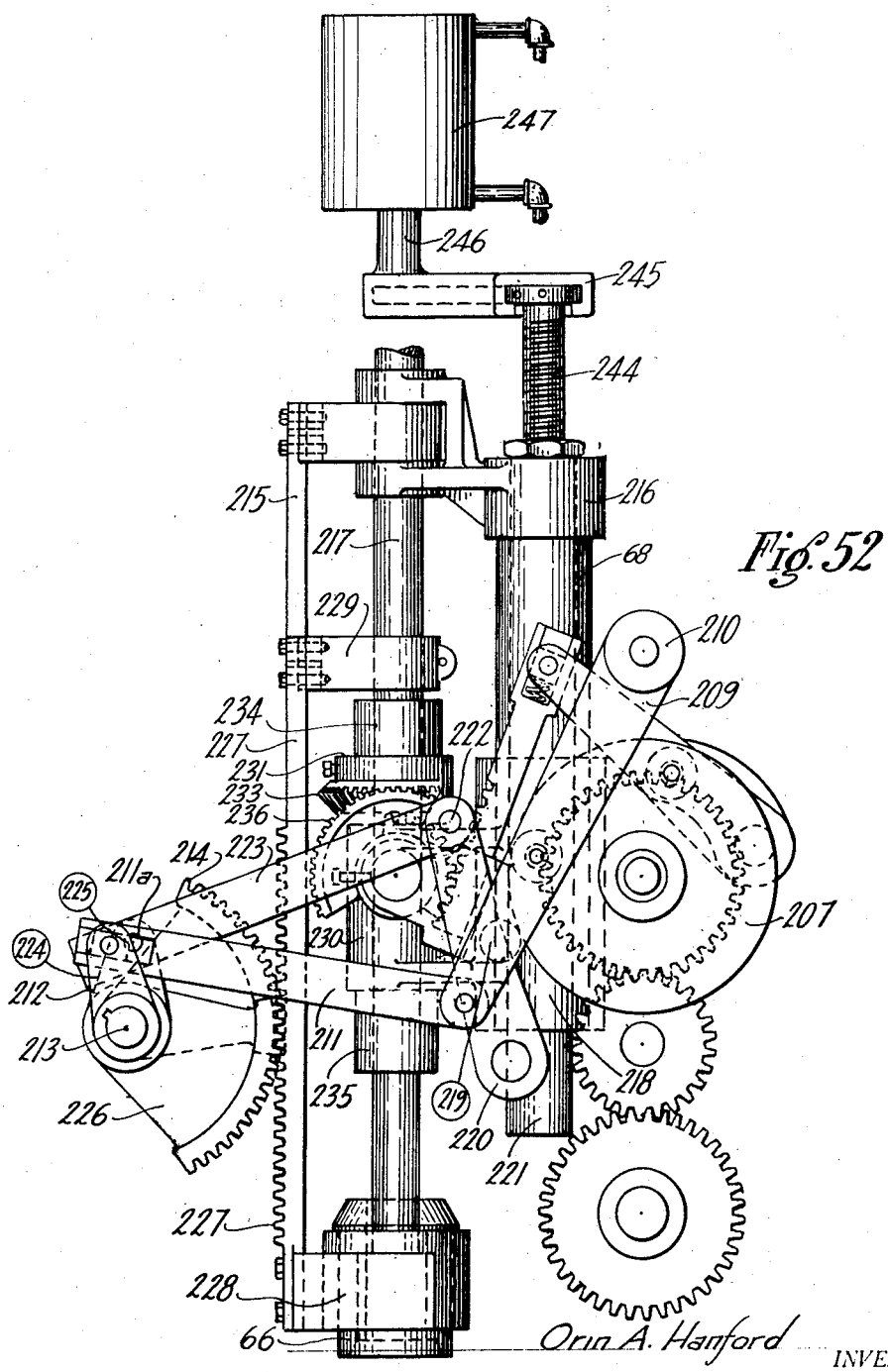

Figure 52 is a diagrammatical view similar to Figure 46 but showing the unit head frame removed and also showing the manner of operating the forming plunger and blank mold structures.

Figure 53 is a rear elevation of the structure shown in Figure 46.

Figure 54 is an enlarged detail view of the air controlling mechanism and the adjustable cam dial for operating said controlling mechanism.

Figure 54ª is a detail view of one of the cam nuts shown in Figure 54.

Figure 55 is an enlarged fragmentary side elevation of the structure shown in Figure 54, and showing the cam dial and the mechanism for transmitting the motion of the cam dial points to the mechanism for operating the ratchet wheels for controlling the inspirator nozzles.

Figure 56 is an enlarged diagrammatical perspective view, partly in section, of mechanism for automatically and intermittently controlling the introduction of air to the blowing head.

Figure 57 is a perspective view, partly broken away, of the opposite side of the structure shown in Figure 56, and showing in particular the mechanism for raising and lowering the nozzle structures into operative position.

Figure 58 is an enlarged cross-section of one of my nozzle structures, and showing the manner of introducing water to said nozzle structure in order to impregnate the air passing through said nozzle with moisture.

Figure 59 is a diagrammatical illustration of my apparatus for delivering moistened air to the blowing head.

Figure 60 is an enlarged detail plan view of my complete blowing head unit.

Figure 61 is a front elevation of the structure shown in Figure 60, and showing the ratchet wheels for controlling the reciprocation of the inspirator nozzles, the means for opening the valve in the blowing head when the blank has been secured to the blowing head and the means for automatically ejecting the blank from the blowing head after the blank has been blown.

Figure 62 is an enlarged front elevation similar to the structure shown in Figures 60 and 61, and also showing diagrammatically the manner of introducing water to the valve distributer whereby this water is continuously supplied to the inner nozzle of the inspirator.

Figure 63 is a vertical sectional view of the structure shown in Figure 62, and showing the blowing head proper turned to a horizontal position.

Figure 64 is a fragmentary perspective view of my blowing head, partly cut away, and showing in detail the mechanism for controlling the opening of the blowing head plug, the mechanism for ejecting the blank, and the blank mold and former in lower contacting position with the blank holding head.

Figure 65 is a perspective view of my blank supporting head with the enclosing cylindrical sleeve removed so as to show the structure of the cylindrical post with its longitudinal flutes therein and normally enclosed by the ejector sleeve.

Figure 66 is a plan view of my glass supporting and retaining head.

Figure 67:
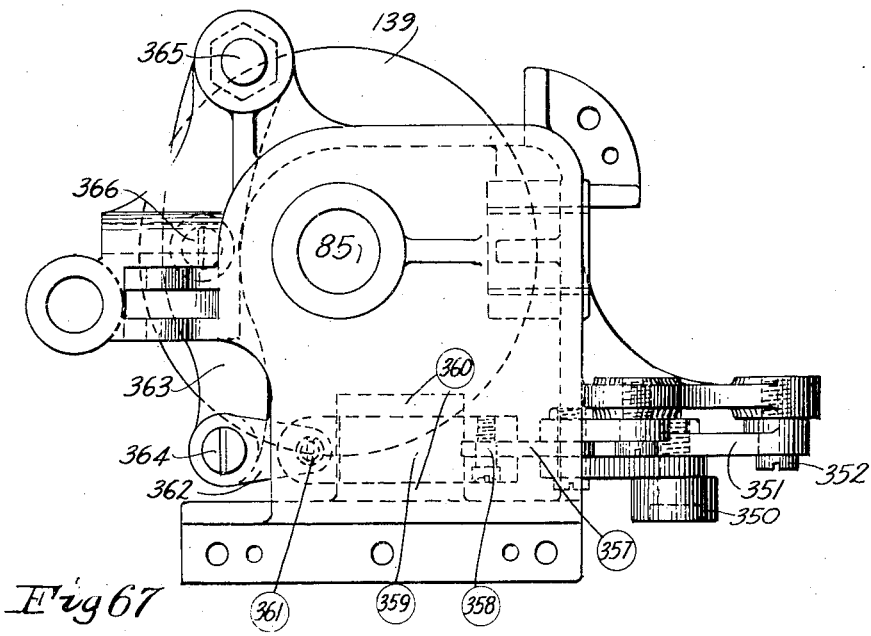

Figure 67 is a detail plan view of a structure for causing the ejection of the blank from the groove of the blank holding head, and showing the manner of operating this ejecting roller by means of a cam on the main unit cam shaft.

Figure 68:
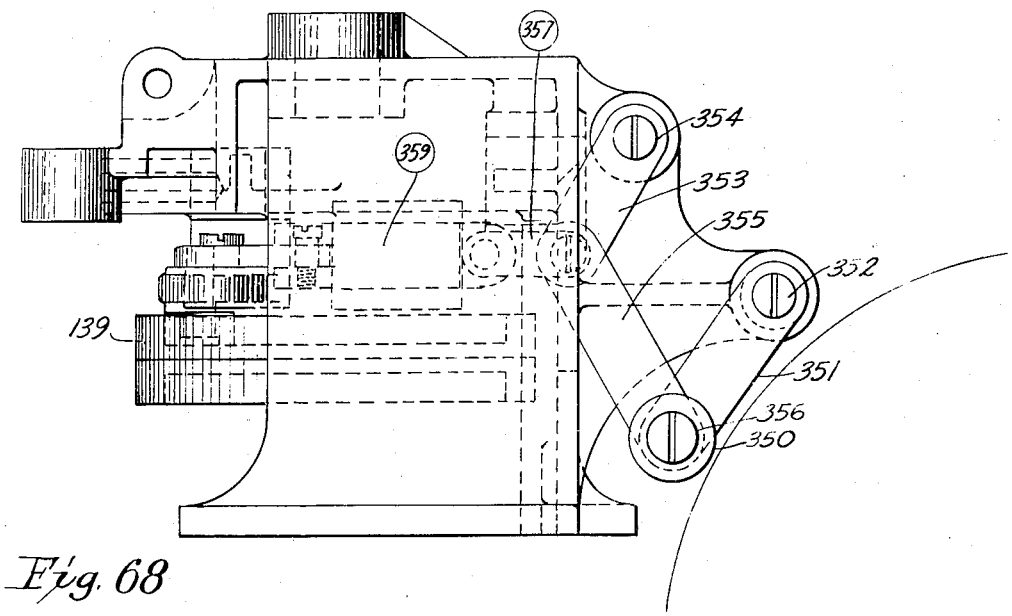

Figure 68 is a detail elevation of the structure shown in Figure 67, and showing the path of the ejector cam carried by the blowing head and the position of the ejecting roller relative to this path.

Figure 69:
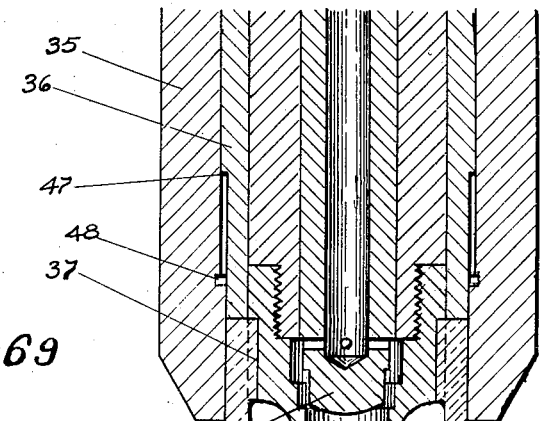

Figure 69 is a vertical sectional view illustrating the internal structure of the glass supporting and retaining head in inverted position, and showing the blank depending therefrom in the approximate position which exists immediately prior to the final blowing of the article.

Figure 70:
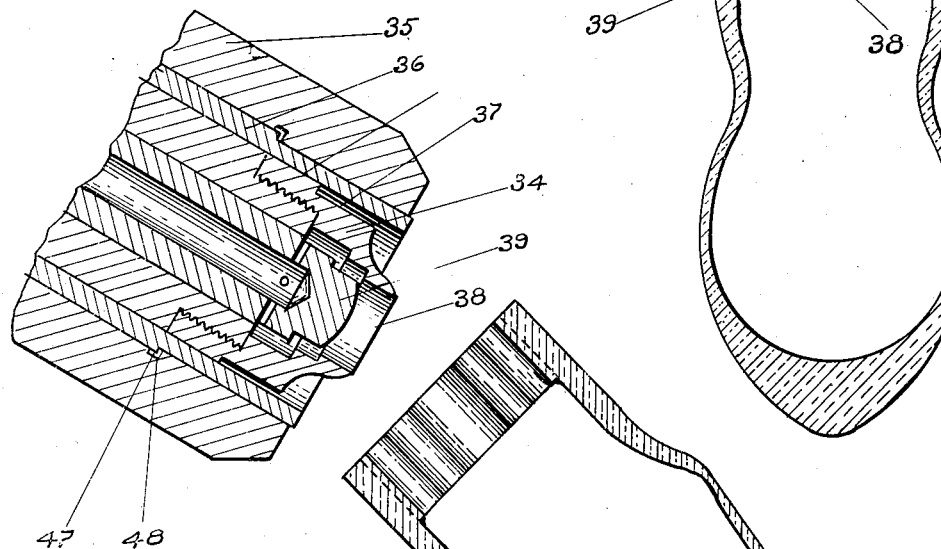

Figure 70 is a sectional elevation similar to Figure 69 showing the relation of the blowing blank and the position of the various parts of the glass supporting head immediately after the article has been ejected therefrom.

Figure 71:
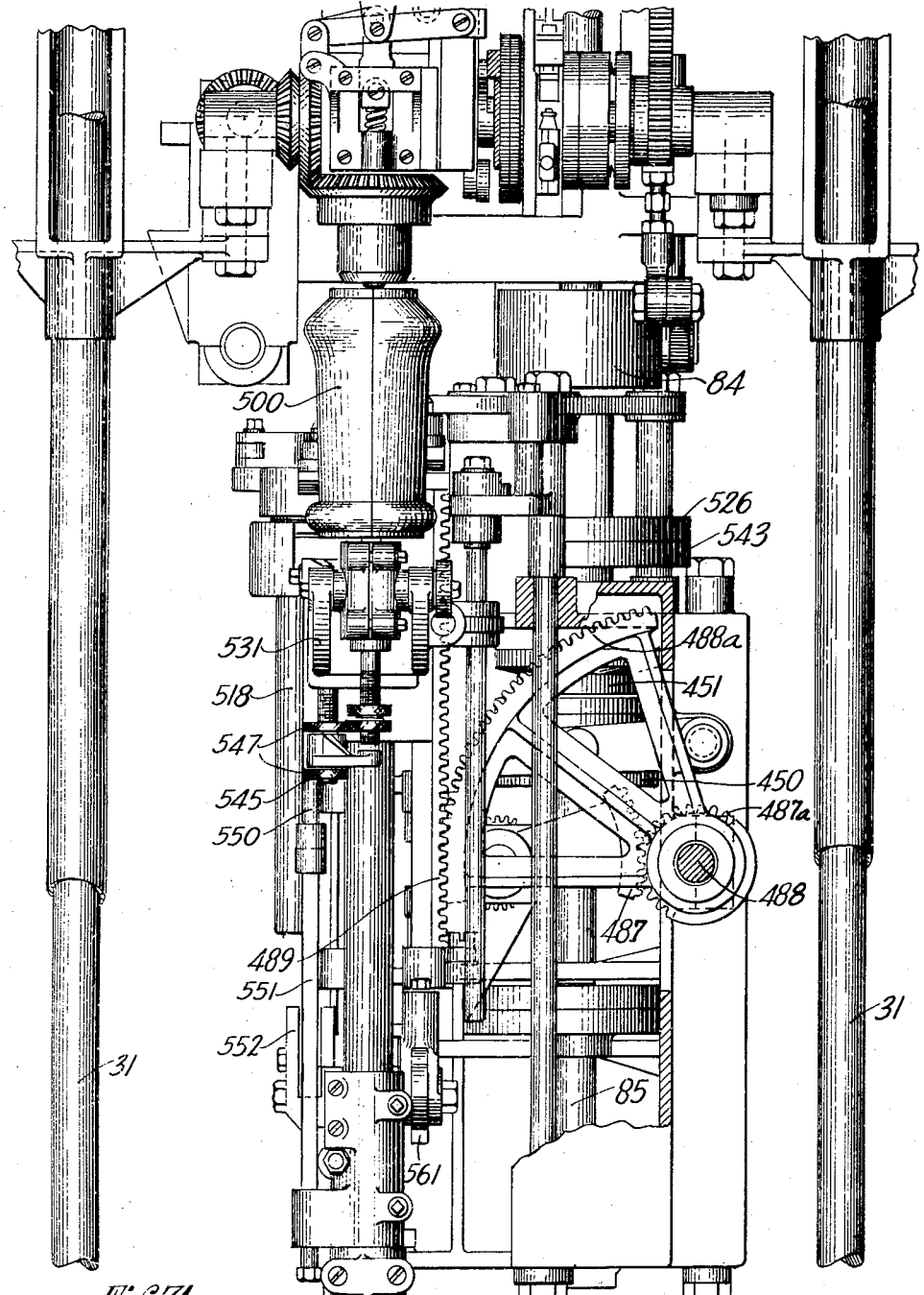

Figure 71 is an enlarged front elevation of the lower half of one of the glass forming units shown in Figure 12.

Figure 72:
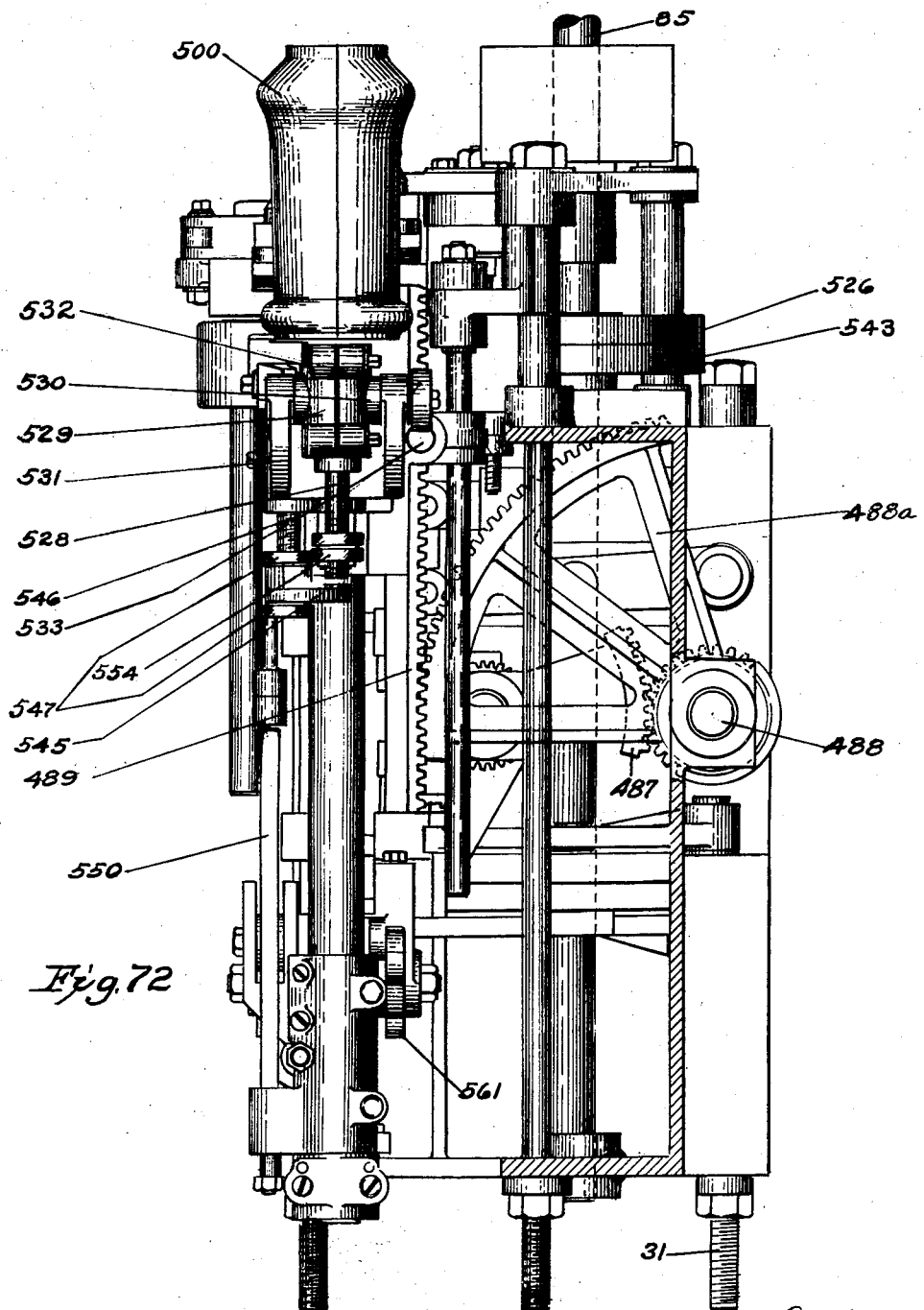

Figure 72 is a detail front elevation of the mold operating mechanism similar to the structure shown in Figure 71, and showing the manner of utilizing the rotation of the main cam shaft 85 to operate the mold operating parts.

Figure 73:
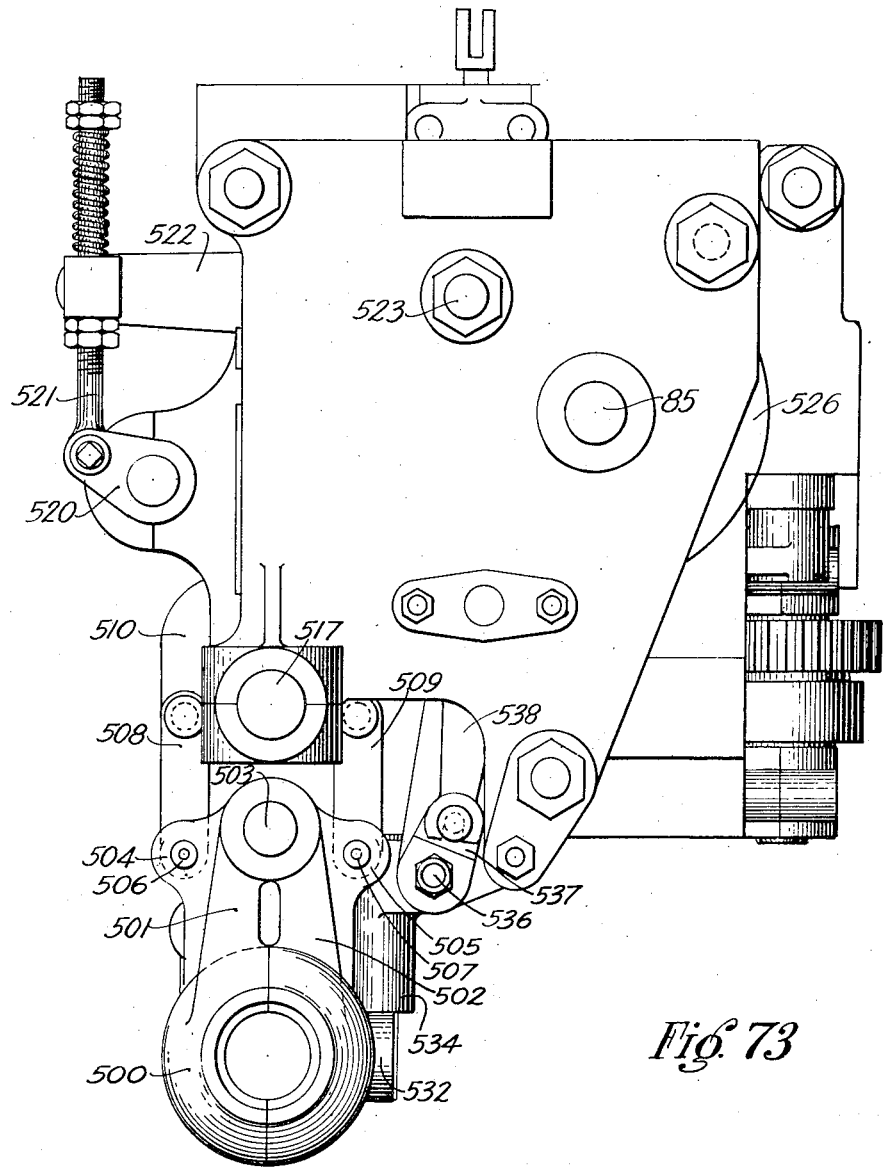

Figure 73 is a plan view of the structure shown in Figure 72.

Figure 74:
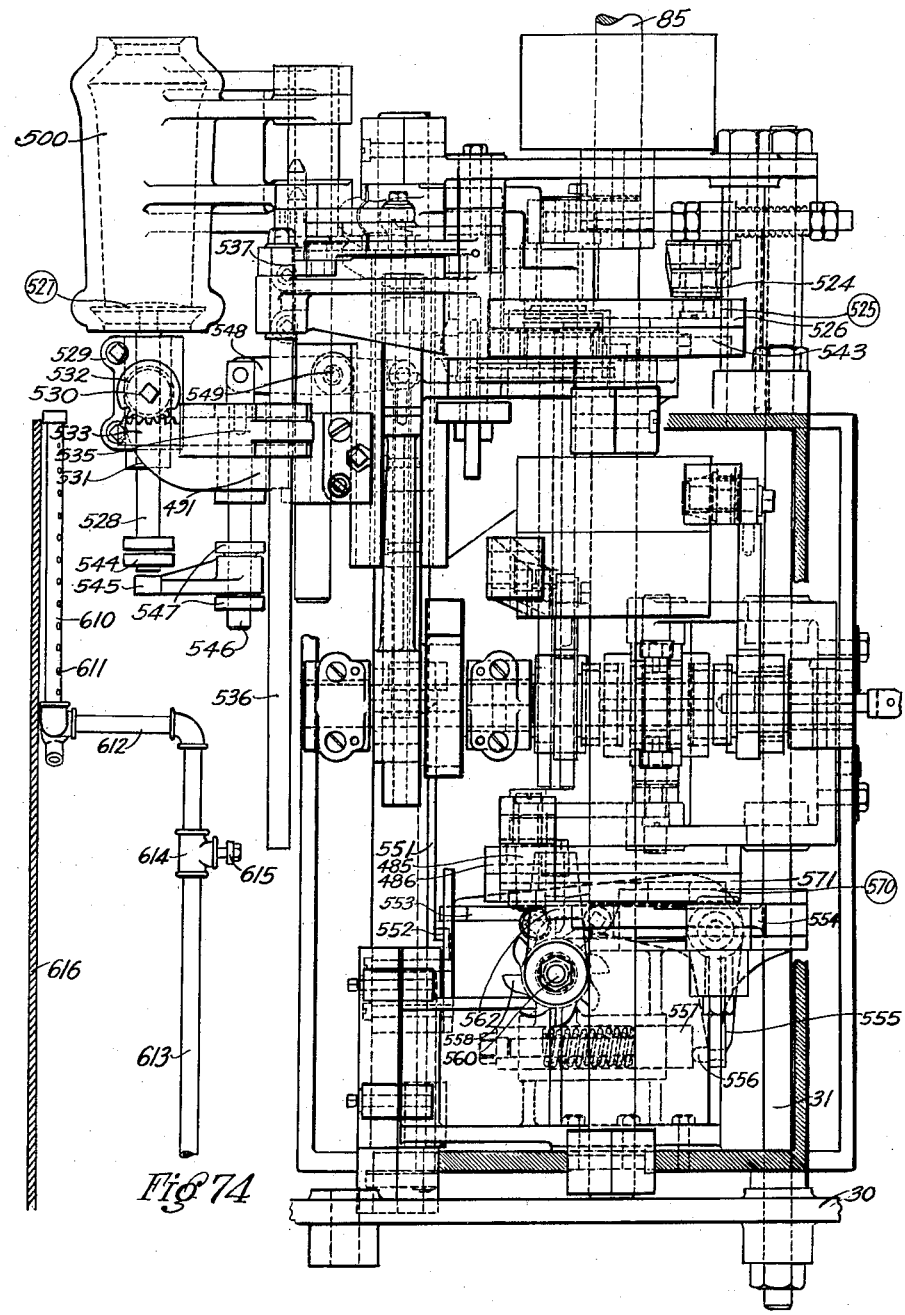

Figure 74 is a side elevation of the structure shown in Figure 72.

Figure 75:
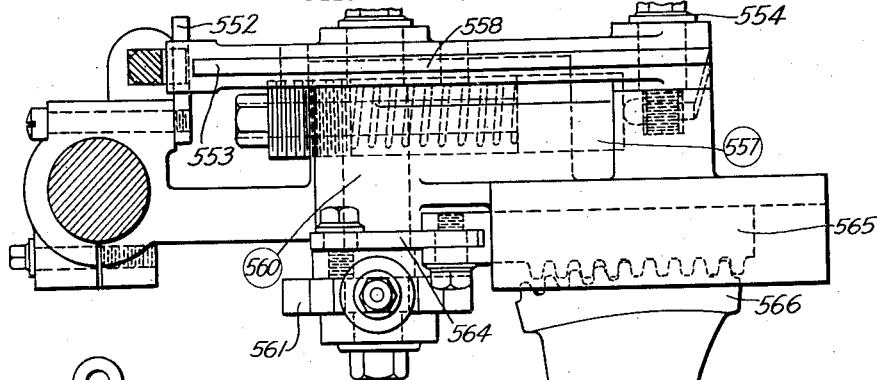

Figure 75 is a detail plan view, partly in section, of the mechanism for batting or setting the bottom of the blank immediately prior to the enclosure of the blank by the blowing mold.

Figure 76:
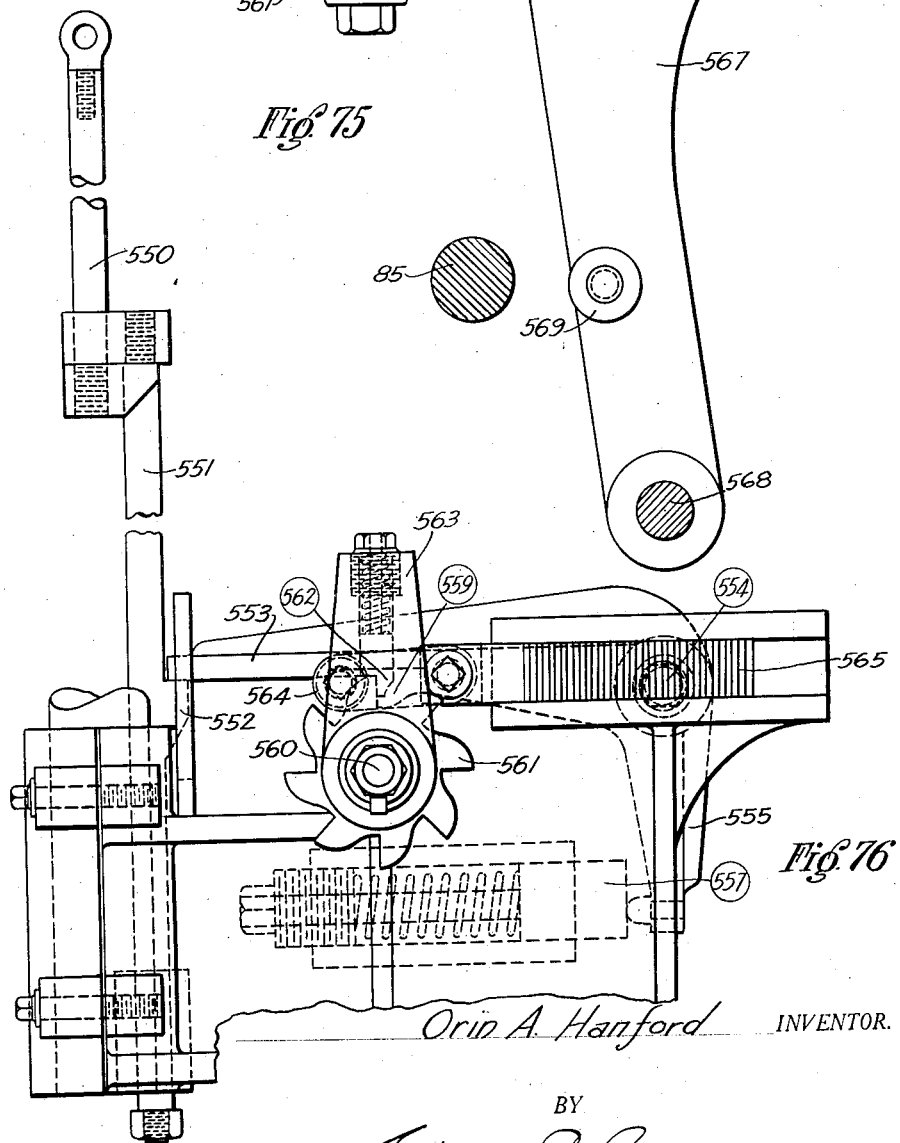

Figure 76 is a detail elevation of the structure shown in Figure 75.

Figure 77:
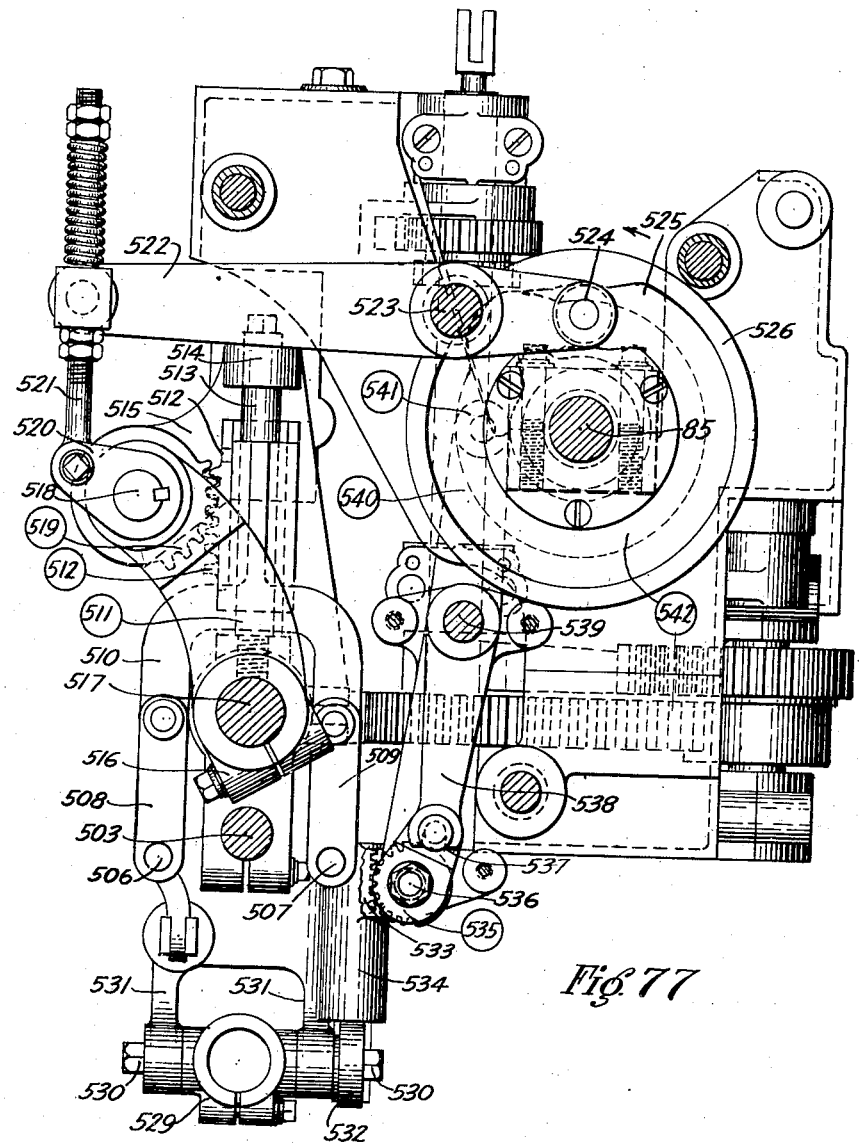

Figure 77 is a plan view of the mold operating structure similar to Figure 73, but taken at a plane just below the cover of the mold structure and showing in detail the mechanism for opening and closing the blowing mold sections.

Figure 78:
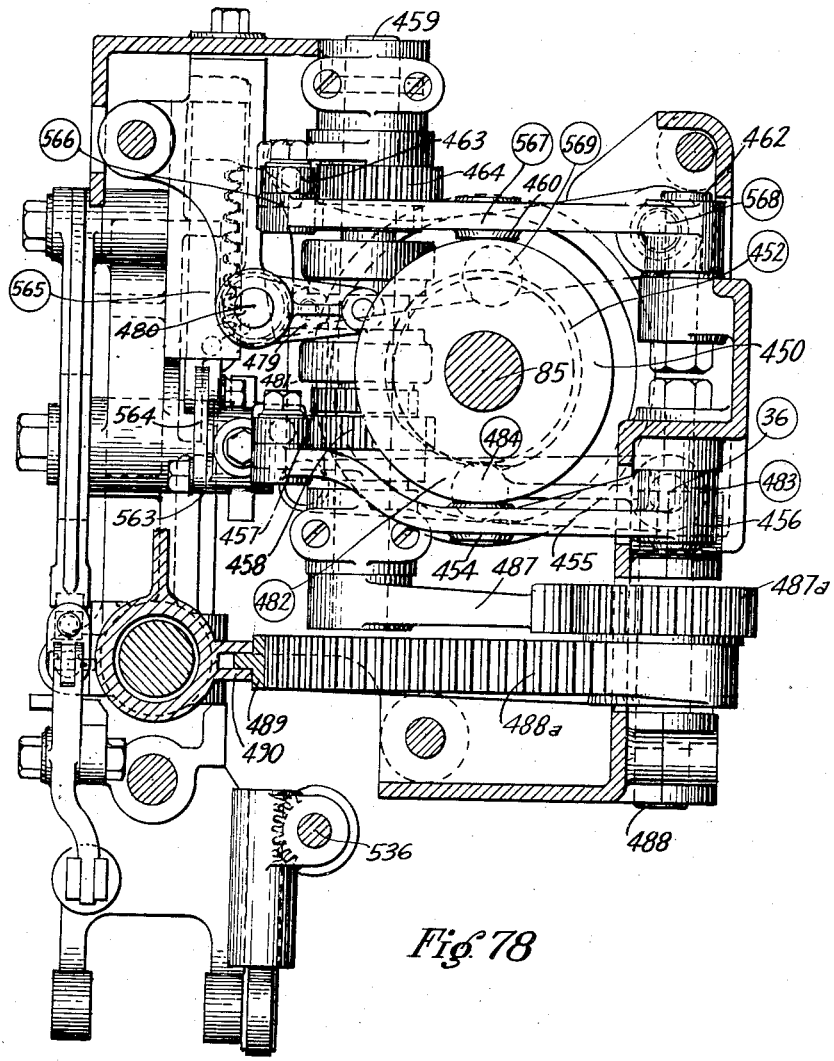

Figure 78 is a cross-section similar to Figure 77, but taken at a lower plane and showing the mechanism for raising and lowering the blowing mold structure and the mechanism for operating the bottom of the mold to tilt the bottom of the blank.

Figure 79:
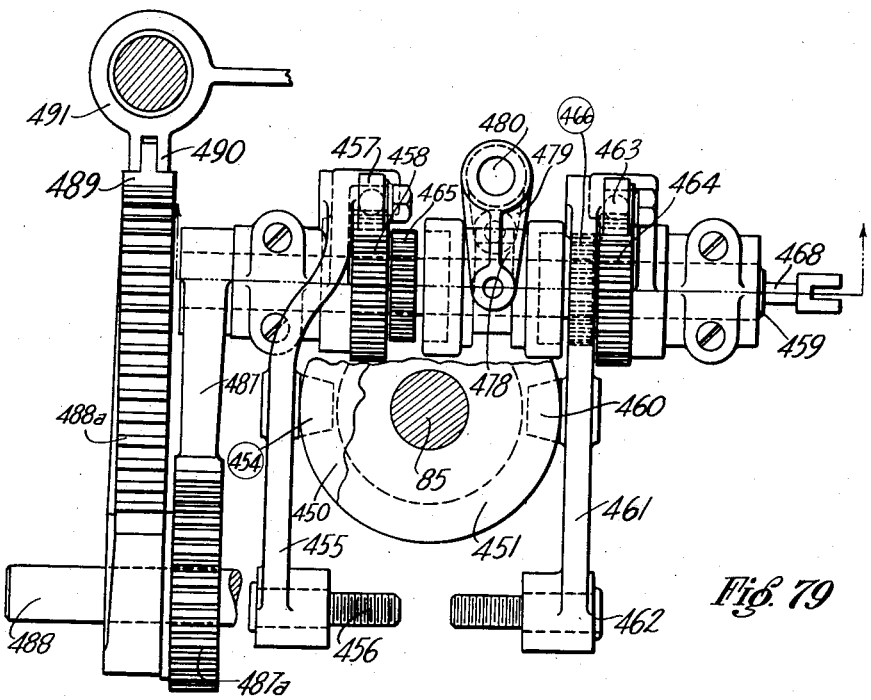

Figure 79 is a fragmentary plan view of the structure shown in Figure 78, and showing the means for raising and lowering the blowing mold from blowing to blow over position and means for raising and lowering the blowing mold from blowing to spraying position.

Figure 80:
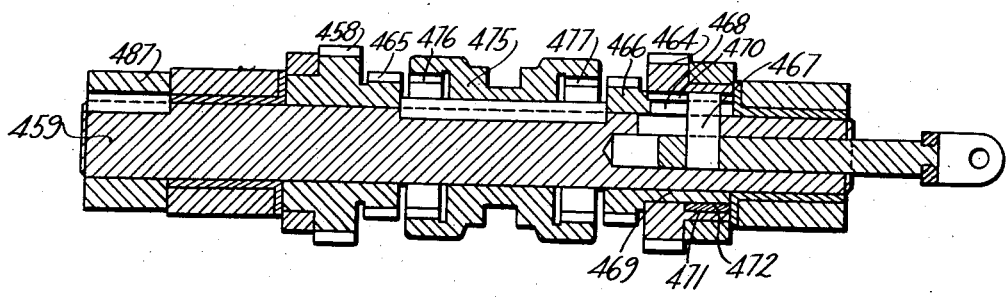

Figure 80 is a longitudinal section of the shaft and mold operating mechanisms shown in Figure 79.

Figure 81 is a diagrammatical view of the main cam shaft of a single forming unit, and showing the respective cams and cam levers thereon.

Figure 82 is a fragmentary vertical section of the mold bottom tilting means shown in Figure 81, and showing the manner of rendering this mechanism operative or inoperative to tilt the mold bottom.

Figure 83:
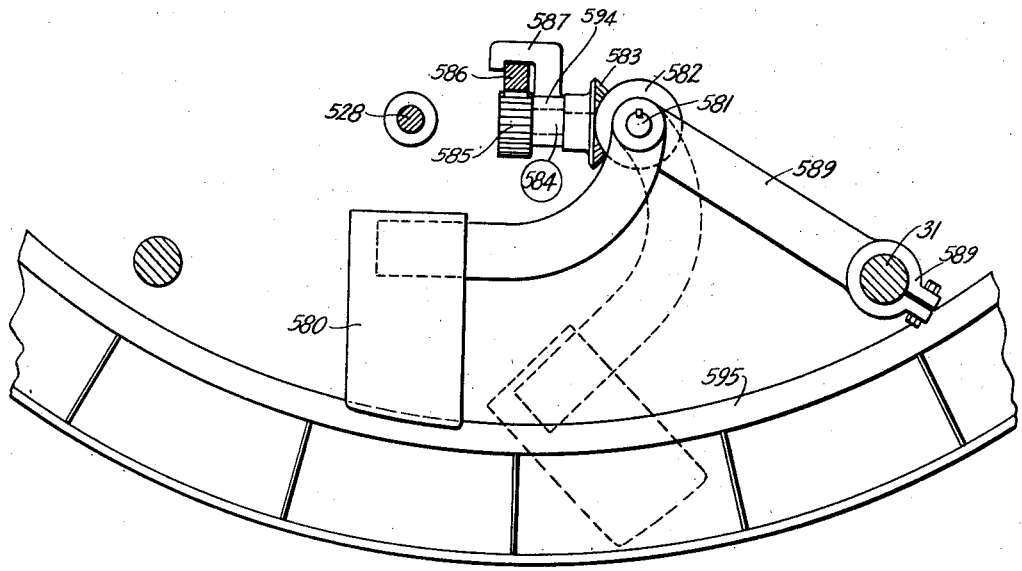

Figure 83 is a fragmentary plan view, partly in section, of the mechanism for conveying the blown article from the blowing head to the conveying trough.

Figure 84:
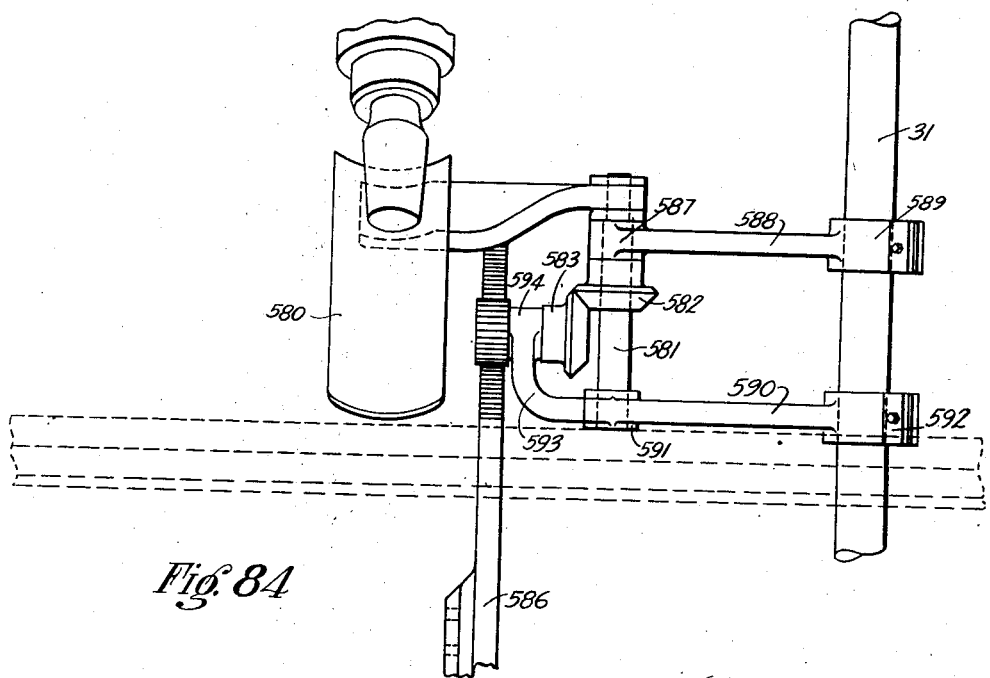

Figure 84 is a front elevation of the structure shown in Figure 83.

Figure 85:
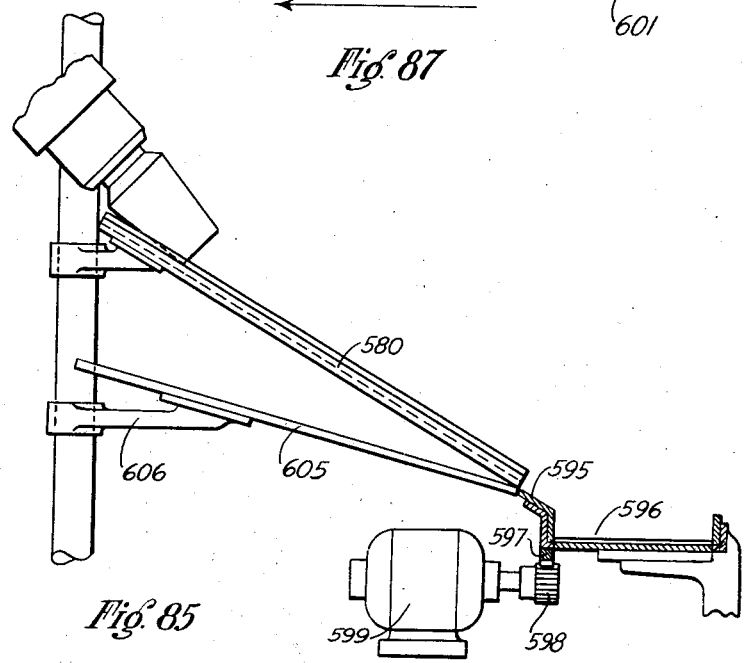

Figure 85 is a fragmentary side elevation of the structure shown in Figures 83 and 84, and also showing the oscillating trough for conveying the article, as it is ejected from the blowing head, to the conveying trough, and also showing a trough for receiving blow over ware as it is taken from the blowing mold.

Figure 86:
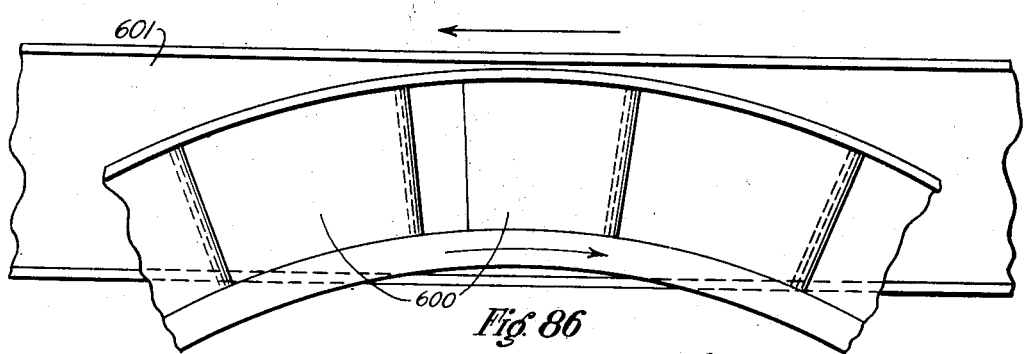

Figure 86 is a fragmentary plan view of the conveying mechanism for collecting the blown articles from the successive forming units and the main conveying means for receiving and conveying said articles away from the forming apparatus.

Figure 87:
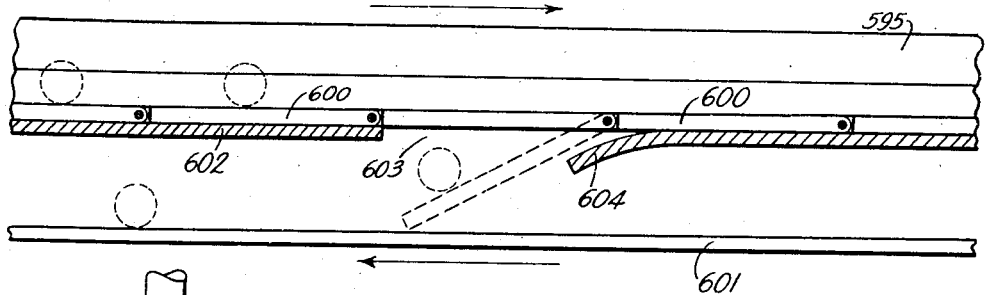

Figure 87 is a side elevation, partially in section, of the structure shown in Figure 86.

In describing the various parts of my invention, it will be well to recognize that the apparatus preferably used therein is separable broadly into charge distributing mechanism, forming apparatus and article removing mechanism. These three combinations are relatively independent in the sense that any one of them may be removed and replaced by other apparatus designed to accomplish the same results. This is also true of certain subcombinations forming more or less integral entities of either one or more of the three combinations, it being understood that the present invention covers a multiplicity of relatively distinct steps and integral subcombinations covering a large portion of the field of making ware.

This charge distributing mechanism is shown as being operative by a main driving shaft 1 which not only operates the charge distributing mechanism but, as shown, also furnishes the power to the forming apparatus. This distributing mechanism comprises a glass distributing means preferably in the form of a tube 2 of suitable diameter. The upper end of the tube is preferably enlarged to produce a funnel formation and is pivotally mounted in such a way as to permit of the swinging of the lower end of the tube in a circle immediately above and in discharging relation to the circular series of stationary molds each of which is equipped with complete forming apparatus which will be subsequently described. The upper enlarged end of this tube is disposed, as shown in Figure 8, immediately below and in position to receive charges of glass which are successively fed from an automatic feeder. The circular series of molds is of such diameter and the distance of such molds below the automatic feeder is preferably such that the distributing tube will be as nearly vertical as feasible, with the result that the molten gathers of glass will be rapidly and positively delivered from the feeding apparatus to the molds with substantially no change in temperature, plastic condition or form The lower end 3 of the distributing tube is carried upon the main driving shaft 1 by means of an arm 4 which ensures that the tube will always be held at a proper angle and likewise ensures that this lower end will travel in a path concentric with and immediately above the circular series of molds. The supporting arm 4 is secured to the tube 2 by means of a clamp 5. At its opposite end it is provided with a collar 6.

The lower end of the tube 2 is caused to move in its circular path with an intermittent motion by a structure shown best in Figures 8 and 9. This structure comprises an auxiliary vertical shaft 7 which is suitably mounted in the main frame in parallelism with the main driving shaft 1. This shaft 7 is rotated by the the main shaft 1 through the medium of bevel gears 8 and 9 respectively mounted on the shafts 1 and 7 and connected by bevel gears 10 which cause the shaft 7 to be rotated in the opposite direction to the operating shaft 1.

The supporting arm is freely rotatable upon the main shaft 1 and intermittent rotation thereof is effected by means of a ratchet wheel 11 having a sleeve 12 which extends upwardly into the hub 6 of the arm 4 and is keyed therein.

The ratchet wheel 11 and its sleeve extension are rotatably mounted upon the shaft 1 and the arm 4 is intermittently rotated by means of a spring pressed dog 13 which engages the notches 14 of the ratchet wheel 11. The dog 13 is carried and guided by means of a hollow cylinder 15 and is resiliently held in contact with the ratchet wheel by means of a coil spring 16 which is enclosed within the cylinder and encircles the stem 17 of the dog 13. This dog 13 and its retaining cylinder are mounted upon an arm 18 journaled on the shaft 1. The ratchet 11, the supporting arm 4 mounted thereon and the arm 18 are all positioned and held in operative relation by means of a supporting collar 19 secured to the shaft 1 by a pin 20.

Oscillating movement is imparted to the dog 13 by means of a crank 21 mounted upon the upper end of the shaft 7 and a link 22 pivotally connecting the crank 21 with the outer end of the arm 18. It will be apparent that complete rotation of the crank 21 will oscillate the dog 13 about the shaft 1 so that it will successively engage the successive notches 14 of the ratchet wheel 11 and thus advance the ratchet and the arm 4 definite distances in accordance with the distance between molds and the throw of the crank arm with the result that the lower end of the distributing tube is successively presented to a position immediately above each mold.

Extending outwardly from the hub 6 and at an angle to the arm 4, I have provided a branch arm 23. This branch arm 23 is so disposed with relation to the main arm 4 that, in the normal direction of movement of this arm 4, the arm 23 will follow in the rear of the arm 4 and at a predetermined distance therefrom. The arm 23 is preferably disposed below arm 4 and is provided adjacent its outer end with a pin 24. This pin 24 is a tripping pin which is designed to automatically trip mechanism of the forming unit after the charge has been delivered to such forming unit to effect initiation of the successive forming operations upon this charge. The preferred manner of producing this result will be described later in conjunction with the description of the mechanism for operating the forming unit structure.

The forming apparatus is shown best in Figures 1, 10, 11, 12, 14, 17 and 21. It preferably comprises a plurality of complete forming machines which are independent of each other with the exception that they are all driven from a main gear carried by the driving shaft. These forming machines are twelve in number in the apparatus which I have illustrated and they are removable from the rest of the machine for adjustment, repair or reconstruction in such a way as not to interfere with the continued operation of the other forming units or of the charge distributing mechanism or article removing mechanism. In other words, there is a main framework 30 and this main framework carries twelve unit structures which are secured thereto by the bolts 31. A complete unit structure is illustrated in plan in Figure 10 and it will be understood that any one of these units may be removed from the main framework by disconnecting the bolts 31 and without interference with the operation of the rest of the apparatus, as stated above.

Figure 1:
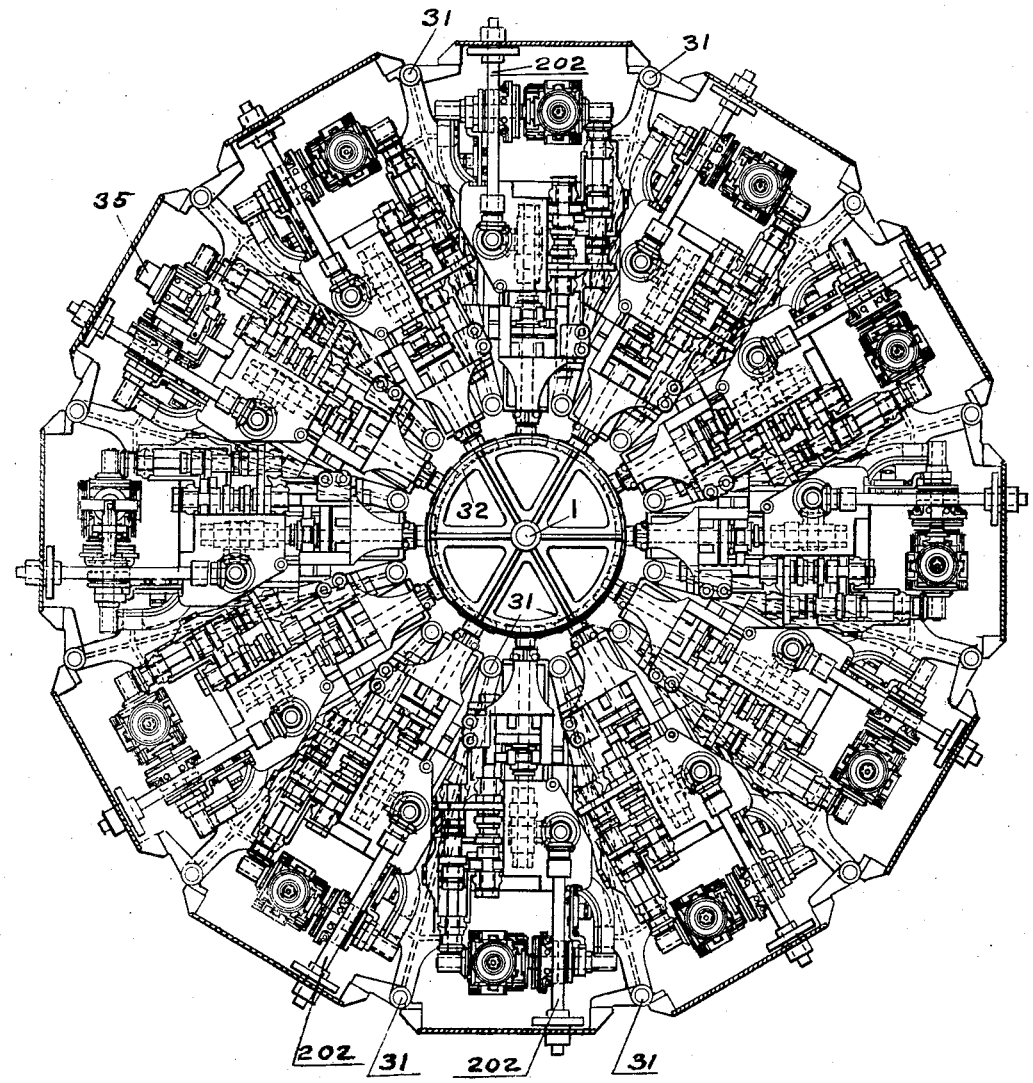
Figure 2:
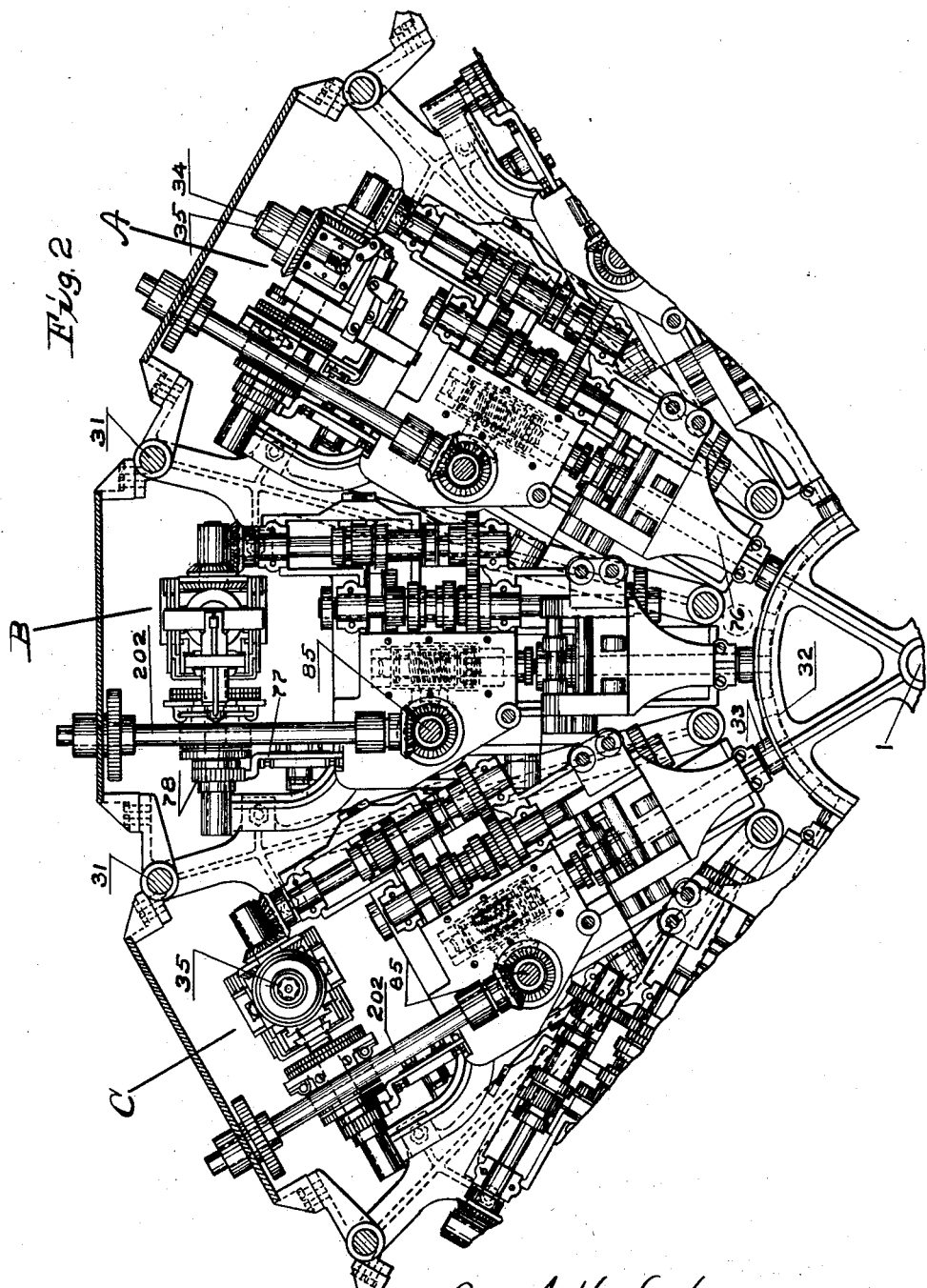
Figure 2 is a fragmentary enlarged view of three of the units shown in Figure 1, and showing the blowing head of one unit in approximate elongating position as at A, the blowing head of the next unit in inverted blowing position as at B, and the blowing head of the next unit in normal receiving position as at C.
Figure 3:
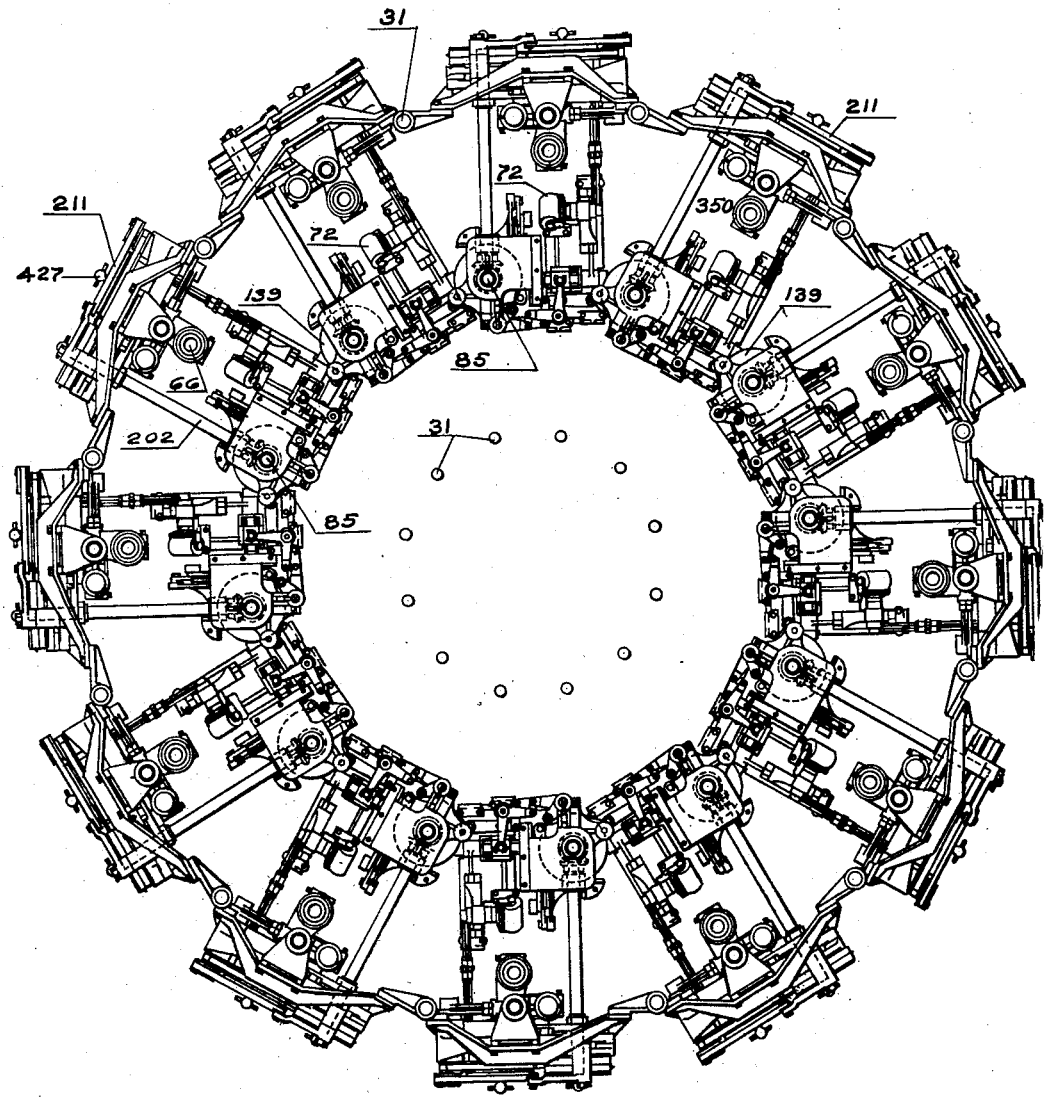
Figure 3 is a plan view of my complete apparatus similar to Figure 1 but showing only the upper part of each forming unit.
Figure 11:
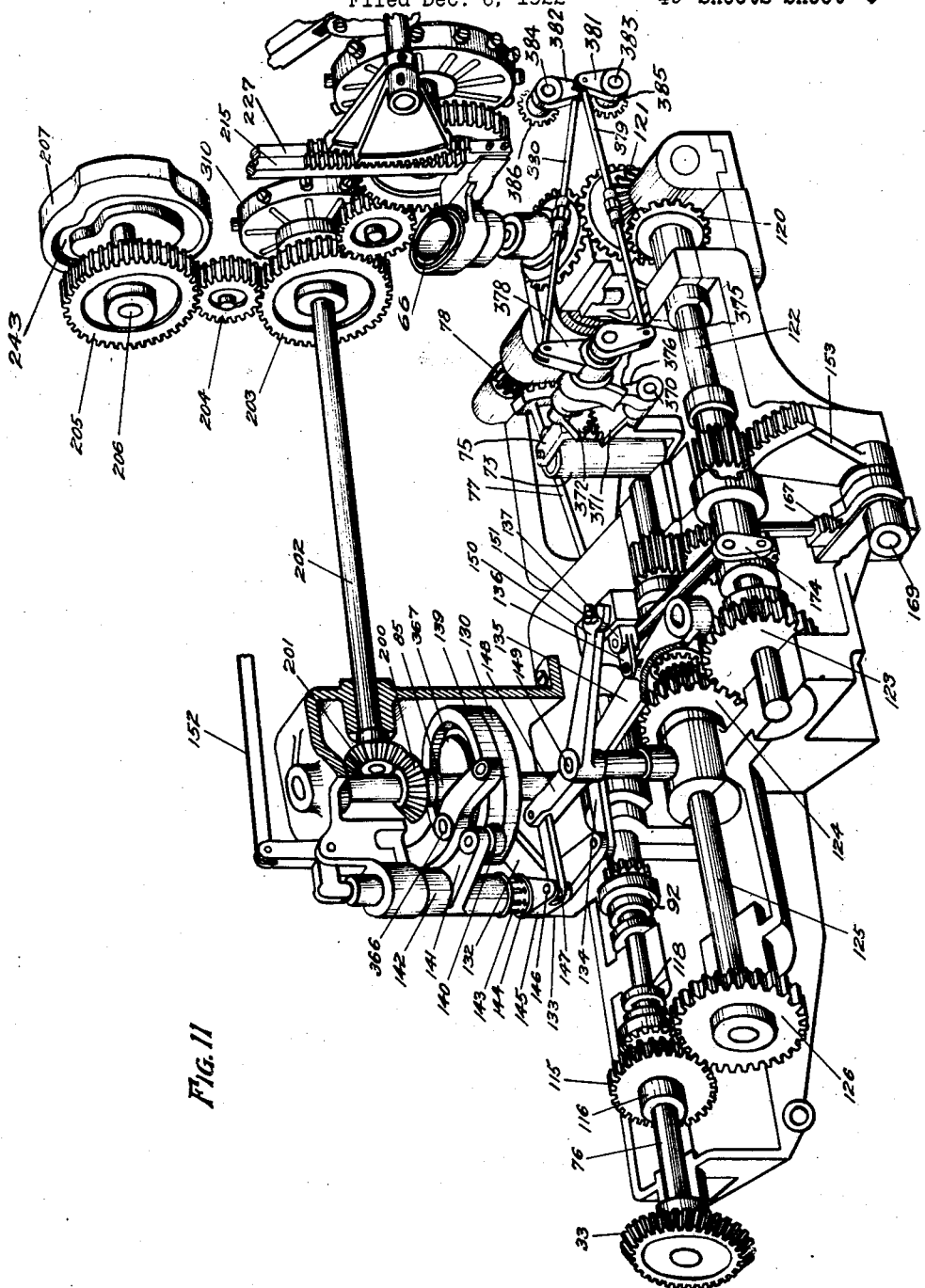
Figure 11 is a perspective view, partly broken away, of the structure shown in Figure 10.
Figure 21:
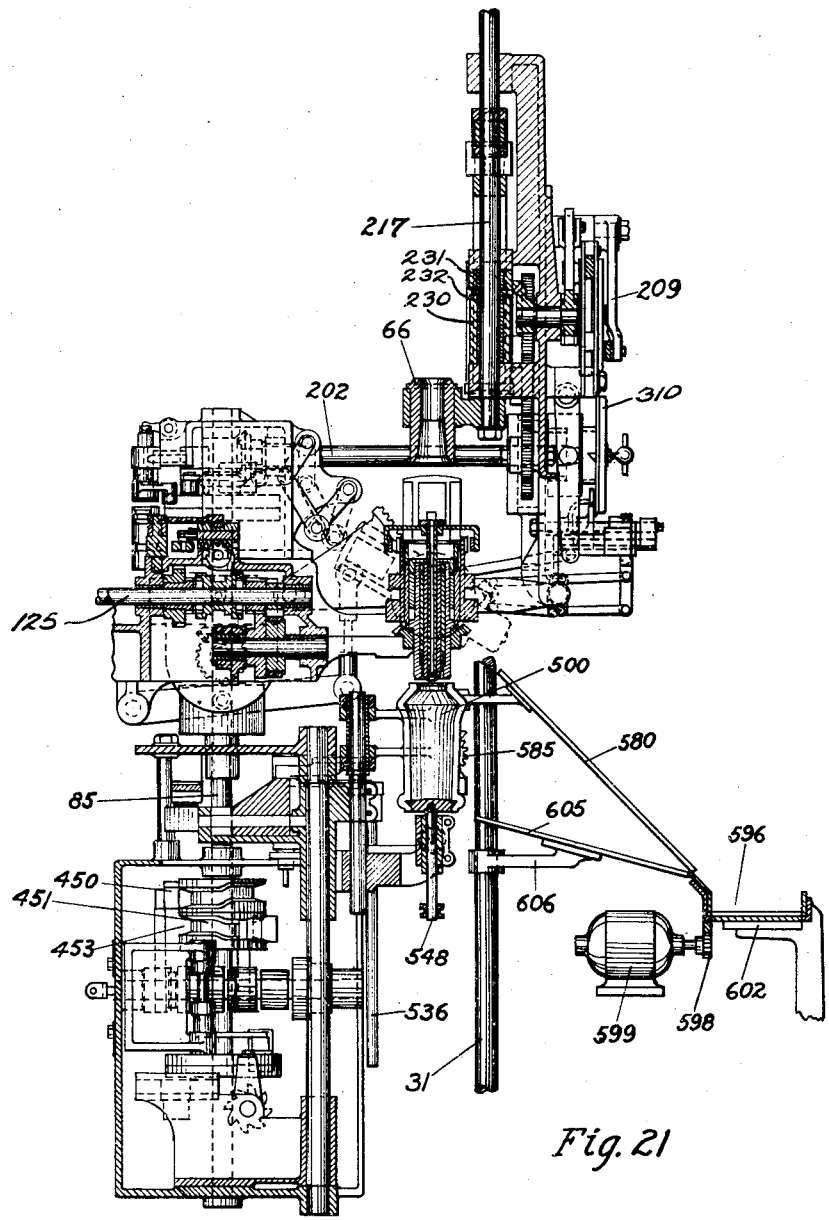
Figure 21 is a fragmentary longitudinal vertical section of the structure shown in Figure 12.

The actual working parts of each forming unit are illustrated most clearly in Figure 11. In this figure, it will be apparent that the gear 33 is the main driven gear of each forming unit, that is, it is the gear which takes its drive from the main gear 32 which is keyed to and rotated with the main driving shaft 1 of the entire apparatus.

The central element of each forming unit is the blowing head which receives the charge and retains it throughout formation as a blank and then as a blown article, in fact, in most cases, from the time of deposit of the charge thereon until ejection of the formed article therefrom. In conjunction with this blowing head, there are several sets of mechanism such as the blank forming apparatus, the marvering apparatus, the air controlling apparatus and the apparatus for manipulating the blowing head to bring it into proper relation to the supplemental apparatus just described and also to perform the steps of manipulation with relation to this apparatus and without relation thereto.

The blowing head, as best shown in Figures 61, 63 and 64, comprises a substantially cylindrical post 34, an enclosing sleeve 35 and an ejector sleeve 36. As shown, the post 34 is provided with a number of longitudinal flutes or grooves 37 and with a rounded head having a central hole 38 within which operates a controlling pin, to be described, that serves as a plug for closing the opening while the glass is being pressed onto the blowing head. The flutes may be placed in the interior wall of the sleeve 35 instead of in the wall of the post 34 or these flutes may be provided in both of these opposing walls. I have also found from experiments that results may be obtained if only one of these flutes is provided and, under some conditions, when no flutes are provided.

The sleeve 35 encloses the post 34 in concentric relation thereto and its internal diameter is such that an annular space or channel is thereby provided between the exterior longitudinal wall of the post and the interior longitudinal wall of the sleeve 35.

The ejecting sleeve 36 is disposed between the post 34 and the sleeve 35. When in withdrawn position, as when the glass blank is pressed onto the head, this sleeve terminates a substantial distance within the outer ends of the post 34 and the sleeve 35. In this position, it forms an unyielding base for the annular groove or channel in between the post 34 and the sleeve 35. This ejecting sleeve 36, however, is capable of movement toward the outer end of this post 34 and sleeve 35 and this movement is utilized for ejecting the blank or the base of the blank either after the formation is completed or at any time during the various steps leading to the final formation of such article.

Disposed within the hole 38 of the post 34 is a plug 39 that is movable into and out of closing relation to this hole. This closure is only effective during the forcing of the glass downwardly onto the receiving head. At other times, this plug 39 is withdrawn to the position shown in Figures 69 and 70 so that air or other expanding fluid may be introduced through the hole or opening 38 and into the blank.

The reciprocation of the plug 39 is effected by a structure partially illustrated in Figures 61 and 64. This structure comprises a yoke 40 pivoted to levers 41 on opposite sides of the blowing head, which levers are fulcrumed as at 42 and are in turn connected by a cross-yoke 43 secured to a reciprocable slide 44. It will be readily understood that the elevation of this slide will force the plug 39 into position to close the opening 38 and that this is automatically accomplished, as the receiving head moves to charging position, by means of a cam 45 shown in Figure 42 which operates upon the cam roller 46. This cam 45 is so shaped, and so placed relative to the roller 46, that as the blowing head swings from ejecting position to vertical receiving position the cam 45 will be advanced and the roller 46, moving with the swinging blowing head, will strike the cam 45 and thus elevate and force the plug 39 into closing position. Whenever the charge is to be marvered, the roller 46 will continue to ride on the cam 45 during the reversing movement of the blowing head and, as the blowing head returns from marvering toward vertical position, cam 45 will be retarded to thus effect lowering of the plug 39 and permit blowing of the blank at any desired position after marvering.

The ejector sleeve 36 is provided at a suitable distance from its outer end with a shoulder 47 that cooperates with a shoulder 48 in the interior wall of the sleeve 35 for limiting the ejecting movement of the ejector. This ejector sleeve is movable to effect ejection of the blank at the proper time through the medium of the pins 49 which extend through the slots 50 in an extension of the sleeve 35 and are embedded in a slidable sleeve or collar 51. The sleeve or collar 51 is provided with an annular groove 52 within which fits segmental members 53 that permit of rotation of the post 34, sleeve 35, ejecting sleeve 36 and slidable sleeves 51 and yet makes possible the movement of the sleeve 51 longitudinally of the post 34 and sleeve 35 with a consequent movement of the sleeve 36 longitudinally of such post 34 and sleeve 35.

The segmental members 53 are provided with apertures into which extend pins 54 whose outer portions are threaded so that they may be screwed into the slide 55. These slides 55 are provided with block or shoulder formations 56 upon the outer surfaces of which are spring seats for the reception of coil springs 57. These coil springs 57 are set at their outer end in bearings 58 with the result that the slides 55 are normally held in the position shown in Figure 64. Because they are so held, the ejector sleeve is normally withdrawn as shown in Figure 65.

The slides 55 are connected at their interior ends to levers 59 which are in turn connected to a yoke-like slide member 60 having at its innermost end a shoe formation 61. This shoe formation is designed to co-operate with a presser roller which becomes effective as the blowing head moves to discharge position, although this operation of the member 60 may be effected manually at any stage of the operation of the forming of the article. In either event, the application of sufficient pressure upon the shoe-like member 61 will result in forcing the ejector outwardly and in the expulsion of the blank or article as shown in Figure 70.

It will be noted that the sleeve 35 is provided with a miter gear 62 that may be driven by a miter gear 63 to rotate the blowing unit about its own axis. In practice, means is provided for positively swinging the blowing unit about the axis of the trunnions 64 and 65.

The blank forming apparatus of my forming mechanism is illustrated best in Figures 14, 15 and 53. It comprises a mold 66 open at both ends together with a plunger 67. The successive positions of these parts are illustrated in said Figures 14, 15 and 53 and it will be seen from this that the mold 66 is moved downwardly onto the upturned blowing head so that the blowing head becomes, in effect, the bottom of the mold. The external sleeve 35 of the blowing head has its outer corners chamfered and this coacts with a complemental formation of the mold 66 to ensure centering of the mold upon the blow head. When this mold is in this position upon the blow head, the charge is delivered to it and the delivering mechanism passes on at the same time starting this charged unit in operation. The plunger 67 and sleeve 68 then move downwardly and the shoulder 69 of the sleeve 68 with its undercut lower surface 70 seats itself upon the chamfered upper edge 71 of the mold. The plunger continues its downward movement and its lower end comes into contact with the glass charge and forces it downwardly onto the blowing head with the result that the glass is firmly packed into the space surrounding the post 34 and the blank is formed.

As clearly shown in Figures 14 and 64, the plunger 67 is provided with a removable lower end. This lower end or former is provided with a threaded shank designed to screw into the base of the plunger 67 so that this former may be interchanged with formers of different contour to thus change the shape of the top of the blank.

It will be noted that the mold 66 is flared downwardly and outwardly as at 72 for about the lower half of its length. The upper half is a straight cylinder designed to produce a close sliding fit with the plunger. After the formation of this blank as described, the mold is lifted with the plunger still remaining in position and bearing upon the nose of the blank. The flared contour of the mold avoids any dragging of the sides of the blank and the retention of the plunger in lowered position until the mold has been lifted obviates any distortion of the blank due to suction.

The marvering apparatus, as shown, comprises a roller 73 carried upon a shaft 74 which is in turn supported in a yoke 75. This marvering roller is disposed to one side of the blowing head and after the blank is formed by the blank-forming mechanism the blowing head is swung to a position as shown in Figure 15 wherein the blank is in contact with the roller. The blowing head is then operated to rotate the blank upon its longitudinal axis in contact with the roller which is idle. The support for the marvering roller is under the control of automatically operated mechanism which is effective to cause the said roller to assume variable positions. Because of this structure, it is possible not only to marver the blank but to effect additional shaping thereof as desired.

The blowing mold is located immediately beneath the blowing head and may be designated 500. At the proper time, this blowing mold is raised vertically and closed around the blank. The blank is then blown, preferably during rotation of the same, and after this the blowing mold is lowered and separated and sprayed with a cooling liquid. The spraying with this cooling liquid avoids all danger of contamination of the ware that inevitably arises from dipping of the mold in a bath after each molding operation. The liquid of such a bath always becomes dirty and oily with constant use and tends to produce harmful marks in the ware.

The unit driving mechanism embraces a multiplicity of interrelated mechanisms which are nevertheless divisible into means for operating the blowing head, means for operating the blank-forming mechanism, means for operating the marvering device, the air-controlling mechanism, and means for operating the blow mold structure. This entire mechanism receives its energy from the main gear 32 through the medium of the main unit gear 33. This main unit gear 33 is rigidly mounted upon the shaft 76 and the power is transmitted through this and supplemental shafts to produce the operation of these various mechanisms.

The means for operating the blowing head comprises, as shown in Figures 10, 11, 22 and 36, a means for swinging the blowing head in either direction in the form of a gear sector 77 for operating a pinion 78 which is carried upon the shaft 64 of the blowing head. This sector, as shown best in Figures 19, 37 and 38, is pivoted as at 79 and is movable up and down by means of a link 80 which connects it to a lever 81 having a roller 82 operating in a camway 83 of a cam 84 upon a shaft 85. The shaft 85 carries a bevel gear 86 which meshes with a bevel gear 87 upon a stub shaft 88 of a worm wheel 89, this worm wheel being cooperative with a worm 90 upon a shaft 91 that is in axial alignment with the shaft 76 and is operatively connectible thereto by means of an internal gear clutch 92.

The clutch 92 comprises a sleeve 93 splined to the worm shaft 91 and having an external gear 94. Cooperating with this portion of the clutch is an internal gear 95 carried upon the collar 96, which is likewise splined as at 97 to the shaft 76. The collar 96 of the clutch 92 is movable into active clutching relation by means of a shifting yoke 98 which is designed to be rocked by the partial rotation of the shaft 99 upon which it is keyed, this rocking of the shaft 99 being effected from the trigger 100 as shown in Figures 5 and 6 through the medium of the vertical shaft 101, the gear 102, the intermeshing gear 103, the shaft 104 which carries such intermeshing bevel gear, a rack sector 105 carried by said shaft 104, a rack 106 operated thereby slidable against a keeper member 107 within which rests a finger 108 carried upon a collar 109 which is keyed to the shaft 99. Thus, it will be seen that the tripping of the trigger 100 by the arm 23 with its depending finger 24 automatically moves the clutch into position to drive the worm shaft 91 and that a partial result of this is the swinging of the sector 77 and the consequent swinging of the blowing head, the time of occurrence of this being determined, however, by the contour of the camway 83. This trigger 100 is also preferably provided with a manually operable lever which leads to the front of each unit so that the clutch 92 may be rendered operative independently of the arm 23 and also inoperative to permit repair or removal of any unit.

It should be noted that the lever 81 is fulcrumed as at 110. It should also be noted that the link member 80 is of a turnbuckle structure so that it may be adjusted to regulate and vary the position of the sector 77 relative to any given point on the cam 84, or, in other words, to vary the position of the blowing head. It will also be noted that the link member 80 is not connected directly to the sector 77 but is pivotally connected to a slide member 111 fitting in a slideway 112. This slide is adjustable in its slideway by means of the set-screws 113 and 114 so that the distance of the link connection from the pivot 79 of the sector may be varied at will. The purpose of this radial adjustment is to effect a much finer adjustment than would be possible through the turnbuckle, to compensate for any errors in the centers 79 and 110 and wear in the camway, and to vary the stroke of the sector 77.

The means for rotating the blowing head comprises a gear 115 loosely mounted upon the shaft 76 and limited as to movement in one direction by a collar 116. Upon its opposite side, this gear 115 is provided with a gear 117 which constitutes a portion of a clutch whose other portion is formed by a slidable collar 118 having an internal gear clutch structure 119 complemental to the gear 117. The bringing of these clutch members into driving relation when the driven parts are in a certain predetermined relation will serve to rotate a bevel gear 120 which will in turn drive the bevel complemental gear 121 with the result that the bevel gear 63 which carries the gear 121 will drive the bevel gear 62 to effect rotation of the blowing head continuously in one direction. The intermediate driving mechanism which serves to accomplish this continuous rotation in one direction comprises the shaft 122 which carries at its opposite end a gear 123 which is normally in mesh with a gear 124 upon a parallel shaft 125 which likewise carries a gear 126 permanently meshing with the gear 115. However, the gear 124 is normally an idle gear but may be connected to the shaft because it is provided on one face with a gear clutch element 127 which is complemental to an internal gear clutch element 128 of a double clutch member 129.

This double clutch element 129 is movable into position to lock the gear 124 to the shaft 125 under the control of a cam 130 carried upon the shaft 85 which, as explained, is driven from the shaft 76. The apparatus utilized for effecting the automatic and intermittent locking of the gear 124 to the shaft 125 and, consequently, automatically and intermittently effecting rotary movement of the blowing head comprises a cam roller (not shown) carried by an arm 132 and pivoted at 133. This arm 132 is a bell crank and its opposite end is connected by a link 134 to a lever 135 which in turn operates upon a link 136 which is connected by a rack oscillating mechanism 137 to the yoke 138 for shifting the double clutch member 129. In the normal operation of this structure, the bell crank arm 132 is moved inwardly by the groove in the lower surface of the cam 130 for a definite portion of the cycle of the unit. During this portion of the cycle of the unit, it therefore follows that the blowing head is being rotated. The primary purpose of the rotation thus effected is for the marvering of the blank and the cam is so constructed and so mounted as to bring about this rotation during the period when the blank is in contact with the marvering device and, if desired, for a short time before and for a short time after marvering.

Another important purpose of this rotation is for the making of paste mold and some classes of iron mold ware wherein it is desirable to rotate the blowing head during the blowing operation. Thus, the double clutch 129 is moved to the left, as shown in Figure 24, to effect rotation during marvering, is shifted to neutral or to the right for subsequent operations, and is again shifted to the left to cause rotation of the blank in the blowing mold.

For the making of most iron mold and blowover ware wherein it is desirable to prevent rotation of the blank in the blowing mold, an additional cam 139 is mounted on the shaft 85 immediately above the cam 130. This cam 139 operates upon a roller 140 which rides on the exterior or periphery of the cam 139 and which is carried by an arm 141 of a clutch member 142. This clutch member 142 is provided with pin-like teeth 143 which are complemental to a series of holes 144 in the female portion 145 of the clutch structure. This portion 145 is provided with a bifurcate arm 146 which embraces and which is pivoted to one end of a link 147 connected to one end of the bell crank lever 148. The bell crank lever 148 is fulcrumed at 149 and its opposite end is provided with a yoke 150 embracing a pin 151 which projects upwardly from the structure which carries the yoke 138.

This yoke 138 is provided with shifter arms 176 which are keyed to the shaft 177 (see Figure 39). This shaft likewise carries a gear sector 178, the teeth of which are designed to be engaged by a rack member 179. The rack member is carried by the general bearing framework and is slidable in this framework to oscillate the sector 178. The upper portion of this rack member 179 is U-shaped to receive the rack slide 137. This rack and rack slide are held in operative or locked relation by means of a pin 180 designed to enter the holes 181 and 182 respectively in the rack and rack slide. The opposite end of the pin 180 is upset as at 183 and this upset portion is slidable in a T-slot 184 in the transversely slidable frame 185. This frame 185 is operated by means of the pin 151 and in normal position it is designed to hold the pin 180 in locking position by means of a spring 186.

When it is desired to rotate the blowing head while the article is being blown in the blow mold, the clutch member 142 remains in inoperative position and the normal reciprocation of the slide 137 will cause the double clutch 129 to be moved to the position previously described to effect rotation of the blowing head. However, when it is desired to prevent rotation of the blowing head during the final blowing operation, the clutch member 142 is forced downwardly into operative position by means of a hand lever 152 and the pin 151 and its frame 185 will be moved against the action of the spring 186 to withdraw the locking pin 180 from the rack slide 137. Thus, when the blowing head swings to final blowing position, the rack slide will move freely in the guides of the rack 179 and the clutch 129 will remain in neutral position.

The means for oscillating the blowing head is comprised partially of the means for rotating the blowing head and partially of certain additional structure that is at times utilized to translate the straight rotatory action of the blowing head into an oscillatory action thereof. This oscillatory action of the blowing head is primarily effected through the medium of a toothed sector 153 which is automatically rendered effective to oscillate the shaft 122 while, at the same time, the means for rotating this shaft is rendered ineffective.

Whether the means for rotating the shaft 122 or the means for oscillating this shaft is effective, is dependent upon the position of the double clutch member 129 which is not only adjustable to effect either operation but is also adjustable to a position wherein neither operation will take place. As shown in Figure 35, the double clutch member 129 is in neutral position wherein the shaft 122 will be stationary, that is, will neither be rotated nor oscillated.

This double clutch member is provided with an internal gear 154 which is adapted when the clutch is properly moved to mesh with a broad faced gear 155 which is in turn in mesh with a gear 156 carried by a shaft 157 parallel thereto. This shaft 157 likewise carries an eccentrically mounted disk 158 which is embraced by a strap member 159 to form an eccentric. This eccentric carries a threaded bolt 160 passing through a housing 161. The bolt carries a stop and guide member 162 which is slidable in a guideway 163 in said housing and which is abutted upon opposite sides by coil springs 164 and 165. The opposite ends of these coil springs bear against the ends of the guideway 163 and produce a cushioning action between the bolt structure and a rack 167 carried by the said housing. This rack 167 cooperates with a toothed sector 168 which is secured to a shaft 169 to which is also secured the sector 153.

As shown in Figure 34, the clutch member 170 is out of engagement with a broad faced pinion 171 and this broad faced pinion is freely rotatable about the shaft 122 while the clutch member 170 is splined to this shaft. Likewise, the broad faced pinion 155 is freely rotatable about the shaft 125 while the double clutch member 129 is splined to this shaft. Therefore, in order to render the oscillating sector 153 effective to oscillate the shaft 122 and the blowing head it is necessary that the clutch members 129 and 170 be moved into intermeshing relation with the broad faced pinions 155 and 171, respectively. This is automatically accomplished by the groove in the under surface of the cam 130 in its continued travel through the medium of the bell crank 132, the link 134 and the lever 135 which operate through the link 136 and link 137 to shift the double clutch 129 supplemented by a rocker device comprising the shaft 177 and the depending arms 174 and 176 to shift the clutch 170.

The means for operating the blank forming mechanism is mainly driven from the shaft 85 through means of bevel gears 200 and 201 which transmit power to the shaft 202. This shaft 202 carries adjacent its end a gear 203. This gear 203 operates through the medium of an idle gear 204 to drive a gear 205. The gear 205 is carried upon a stud 206 upon the other end of which is a cam 207. This cam 207 is provided with a cam groove in which operates a roller 208 carried by a lever 209. The lever 209 is fulcrumed at one end as at 210 and is connected at its opposite end to a link 211 which is in turn connected by a cushion connection 211ª to a crank arm 212 on a shaft 213. The shaft 213 carries at its opposite end a toothed sector 214 and this toothed sector 214 cooperates with a rack 215 upon the sleeve 68 through the medium of a collar 216 which is slidable upon the pivot shaft 217.

The sleeve 68 is slidable within a sleeve 218 and carries at its lower end a beveled undercut shoulder 69. The sleeve 68 is that sleeve which carries the plunger 67 reciprocable therein. The sleeve 68 is movable downwardly by downward movement of the rack 215 until it seats upon the blank mold 66 and thus is centered by the mold to ensure positive entrance of the plunger 67 into the mold, as has already been described. To withdraw the sleeve 68, the collar 216 is moved upwardly.

The cam 207 is also provided with a cam periphery. This cam periphery is designed to contact with a roller 219 carried upon a lever 220, which lever is fulcrumed at one end as at 221. The opposite end of the lever is pivoted as at 222 to a link 223 and the other end of this link 223 is connected to a crank arm 224 by a cushion connection 225. The crank arm 224 is carried upon a sleeve shaft whose opposite end carries a sector 226. This sector 226 meshes with and operates a rack 227 for the raising and lowering of the blank mold 66. The blank mold is preferably connected to the rack through the medium of a clamp 228.

This clamp 228 is also secured to the base of the pivot shaft 217, and the upper end of the rack 227 is likewise secured to this pivot shaft by means of the clamping bracket 229. Thus, it will be seen, as best shown in Figures 42 and 57, that the blank mold 66 is held in constant vertical alignment by virtue of the rigid bracing construction as described and that any vertical reciprocation of the rack 227 will be equally distributed, through clamps 228 and 229, to the vertically movable pivot shaft 217 and the blank mold 66. The bracket 229 also serves as a guide for the rack 215.

The cam members for raising and lowering the blank mold and the plunger carrying sleeve 68 are such as to properly time these operations with relation to each other and to the blowing head. It is important to note, also, that the cushion connections 211ª and 225 prevent any injurious jarring of the parts as they are moved into their respective positions.

It will be seen that the sleeve 218 is carried upon the pivot shaft 217 through the medium of a clamping sleeve 230. This clamping sleeve is provided with a bevel gear segment through the medium of a collar 231 having a sleeve 232 depending therefrom and extending into the clamping sleeve 230. The clamping action of the sleeve 230 is immediately effective upon the extension 232 while the segmental bevel gear 233 is rigidly carried upon the collar 231. This sleeve and collar structure is limited in its upward movement by the bearing collar 234 and in its downward movement by the bearing collar 235.

This mechanism is operable to move the plunger and its enclosing sleeves into position for operation upon the charge within the blank mold or out of position to permit ready delivery of the charge to the blank mold. These movements are effected by swinging these parts in an arc, the driving force being applied to the gear sector 233 by a gear sector 236 which is keyed to a stub shaft 237. The opposite end of the stub shaft is provided with a mutilated gear 238 which is keyed thereto and is designed to be oscillated by means of a rack 239 having a cushioned pivotal connection with a lever 240 that is fulcrumed as at 241 and carries a roller 242 for coaction with a cam groove 243 on the rear surface of the cam 207. It will be understood that this action is entirely automatic and is properly timed with relation to the other operation of the unit.

It will also be understood that the shaft 217 merely serves as a pivot for the swinging of the sleeve 218 and that this shaft is movable vertically independently of all parts except the clamps 228 and 229.

The plunger 67 is provided with an adjustable threaded extension and a collar 244. This collar 244 and its plunger 67 are carried by an arcuate T-slotted member 245 and this arcuate member forms the lower part of a piston rod 246. Thus, when the plunger 67 and its sleeve are oscillated into and out of operative position above the blank mold, the collar 244 will move in its natural arcuate path within the T-slot. The piston rod 246 is reciprocated at the proper intervals of time by admission of fluid pressure into the cylinder 247, this admission of fluid pressure being controlled by a suitable three-way valve. The piston of this three-way valve is operated by means of a lever 248 fulcrumed to the cam housing and which lever is oscillated by means of a roller coacting with a cam groove in a cam 249. This cam 249 is mounted upon the cam shaft 85.

The air controlling mechanism, in addition to the plug 38 and its operating mechanism, comprises a conduit 250 which connects with a T-union 251 from which radiate a puff air conduit 252 and a blowing air conduit 253. The operation calls for a supply of puff air at certain times to the puff air conduit, and at other times to the blowing air conduit. For example, in the making of certain types of ware, it is desirable to introduce several successive puffs of low air pressure into the blank immediately after marvering and before and during elongation while the high pressure air or blowing air is only introduced into the blowing air conduit to blow the article to final form. I accomplish this result by the utilization of make and break nozzles, the make and break nozzle 254 being operated at predetermined instants and for predetermined intervals to enter the end of the puff air conduit structure 252 for the supply of puff air thereto and the make and break nozzle 255 being operable at the time of the final blowing operation to enter the blowing air conduit 253.

An important feature of this structure arises from the fact that during the operation of my apparatus the puff air and the blowing air is flowing all the time. A large part of the time it is passing to the atmosphere while the rest of the time it is passing through the puff air and blowing air conduits. In other words, there is no stoppage of the air movement and a very important result of this is that there is no deposit of sediment or other foreign substance and no condensation either of which is likely to create defects in the ware produced.

The specific structure of the nozzles and the means for operating and supplying air thereto is shown in Figures 54, 55, 56 and 58. In these figures, it will appear that the conduits 252 and 253 are provided with socket-like terminals 256 and 257 which preferably comprise conical seats for the reception of the conical ends 258 and 259 of the nozzles 254 and 255. The nozzles 254 and 255 are shown disposed immediately below the terminals 256 and 257 of the conduits 252 and 253 and they are slidably mounted in guides 260 and 261.

The nozzles 254 and 255 are provided with lateral projections 262 extending inwardly toward each other and these lateral projections are respectively embraced by the bifurcate extensions 264 and 265 carried by bell cranks 266 and 267. These bell crank levers 266 and 267 have their fulcrums 268 and 269 carried upon a supporting plate 270. This nozzle and bell crank structure is best shown diagrammatically in Figures 56 and 57.

The other ends 271 and 272 of these bell crank levers are respectively connected to ratchet wheels 273 and 274 through the medium of pins 275 and 276. To accomplish this, the pin 276 is directly connected to the ratchet plate 273 while the pin 275 extends through an arcuate slot in the ratchet plate 273 and is then connected to the ratchet plate 274.

The ratchet plates 273 and 274 are circular in form and are laid face to face, being provided with ratchet teeth on their peripheries. These plates are partially rotatable in opposite directions by means of dogs 277 and 278 and these partial rotatory movements are effected at chosen intervals to reciprocate and move the nozzles 254 and 255 into cooperative relation with the terminals 256 and 257 of the conduits 252 and 253. The movement of these nozzles away from such cooperative relation is effected automatically by springs 279 which fit at their upper end into sockets 281 and bear at their lower ends upon the projections 281ª.

The dogs 277 and 278 are fulcrumed as at 283 upon plates 284 and 285 which are disposed upon opposite sides of ratchet plates. These dogs are of bell crank construction, the ends which contact with the teeth of the ratchet plate being serrated while the opposite ends are pivoted to links 286 and 287. These links 286 and 287 are in turn pivoted at their opposite ends to lever arms 288 and 289. These lever arms 288 and 289 are fulcrumed upon the shaft 292 and their opposite ends are connected at 293 and 294 to links 295 and 296, respectively.

The link 296 is pivoted as at 297 to a lever 298, this lever 298 having a fulcrum 299 adjustable by means of the sliding element 300 under the control of the adjusting screw 301. In order to facilitate this adjustment, the lever 298 is provided with a slot 302 through which passes the fulcrum pin 299. At its upper end, this lever 298 is pivotally connected at 303 to a member 304 slidably carried upon a rod 305 by means of guide blocks 306.

This slide member 304 carries upon the rearmost block 306 an upstanding foot structure 307 which is beveled on one edge as at 308 and provided with a series of step-like notches 309 upon the other edge. This foot structure is designed to be automatically forced rearwardly at definite intervals and for predetermined periods by means of a cam that may be generally designated 310. When this foot is pressed rearwardly by this cam structure, the various levers and links are actuated to bring the pawl 277 into contact with its ratchet wheel to move the puff air nozzle into position to introduce puff air to the blank with the frequency and for the period or periods desired. The manner of regulating the cam structure to determine the frequency and length of these periods will be subsequently explained.

The link 295 which ultimately actuates the ratchet wheel that moves the blowing air nozzle into operative position is poviotally connected to the lever 311 as at 312 and this lever 311 is mounted upon a fulcrum 313, which fulcrum is adjustable through the medium of the slide element 314 and the adjusting screw 315. This fulcrum 313 also passes through a slot 316 in the lever 311. The upper end of the lever 311 is pivoted as at 317 to a member 318 which is slidably carried by the member 304. It will be noted that this member 304 is integrally formed at its base with a laterally extending flange 319 and this flange affords the sliding support for the member 318.

The member 318 is provided at its opposite end with an upstanding collar 320 which also carries an upwardly projecting foot 321 which is operative by the cam member that I have generally denoted 310. Briefly stated, the forcing of this foot 321 rearwardly by the cam member results in the movement of the blowing air nozzle into operative relation to its conduit.

The cam dial 310 is driven from the main cam shaft 202. This dial is provided with a plurality of radial slots 323 within which are mounted cam nuts 324, one nut being mounted in each slot. Each cam nut is adjustable along its slot and, therefore, radially of the dial by means of a screw rod 325. Under the usual conditions of operation, certain of these cam nuts are adjusted to contact with the foot 307 to render the puff air effective at predetermined intervals while others of these cam nuts are adjusted to operate the foot 321.

Upon observing the direction of rotation of the cam dial 310, as indicated by the arrow in Figures 46 and 54, it will be obvious that a cam nut which is nearer to the center of the dial will contact with a relatively narrow portion of the foot 307 because of the step construction of this foot with the result that the application of the puff air by this one cam nut will be for a relatively short period of time. However, the same cam nut may be adjusted radially outward to produce varying degrees of prolongation of this period. A similar result may be attained by the utilization of several cam nuts in successive slots, even though these cam nuts are located as near to the radial center of the dial as is possible with the structure shown, providing they are not moved so far inward radially as to entirely escape the foot 307 which occurs when these cam nuts are moved inward to inoperative position.

One cam nut is ordinarily utilized for the operation of the foot 321 to move the blowing air nozzle into position to deliver the blowing air to the blank. However, the blowing period may be prolonged by positioning a plurality of the successive cam nuts at such points on the dial that they will contact with and force the foot 321 rearwardly as they are rotated by the dial into contact with such foot. It should be noted that the foot 321 is beveled as at 326. The dial 310 is secured to the shaft 322 by means of a screw knob 327 which may be removed to permit removal of the dial and by a suitable disk clutch which makes it possible to adjust the dial independently of the shaft 202.

The means for introducing the air to the nozzles 254 and 255 contemplates the utilization of the lateral projections 262 and 263 of these nozzles. Therefore, these lateral projections are in the form of conduits. These conduits extend into a slot 328 in the side of the integral block formation 270. Each of these conduits which constitute the lateral projections 262 is threaded into cylindrical conduit members 330 with their outer ends only open and normally held at the bottom of their supporting channels by the coil springs 279 and 280. Air is introduced into the interior of these conduits and, consequently, into the nozzles 254 and 255 by means of ducts 332 and 333. Air is supplied to these ducts through the medium of passages 334 and 335 which connect at their opposite ends with annular grooves 336 and 337. These annular grooves 336 and 337 are partly carried in the periphery of a step cone structure 338 and are completely formed by coinciding grooves on the inner surface of a collar 339 which is rotatably mounted upon such step cone structure. The step cone structure is secured to the nozzle supporting plate 270 by means of bolts 340. This step cone structure also carries the passages 334 and 335 so that when this structure is bolted to the integral plate 270 these passages will register with the respective puff and blow air ducts 332 and 333. The collar 339 is held in rotatable contact with the step cone structure through the medium of suitable springs carried by a ring 329 and this ring is rotatably seated in a groove provided in a disk structure 329ª mounted upon the trunnion 64. The puff air and blow air is delivered to the grooves 336 and 337 by means of conduits 341 and 342 which extend through the collar 339 and which thereby hold the collar stationary while the step cone and nozzle structure is rotated from receiving to elongating and blowing position.

The air may be automatically moistened on its way to the blank. This applies both to the puff air and to the blowing air. I have found it highly advantageous to simulate the conditions arising in the making of blown ware by the manual process by impregnating the air on its way to the blank with a moisture vapor. However, it will be understood that my apparatus may be utilized without impregnating the air with moisture. Likewise, it will be understood that I may utilize other apparatus than that about to be described for effecting such impregnation.

The air may be impregnated with moisture in several different ways. I have shown one method of accomplishing this in Figures 56, 57, 58 and 59 wherein the air is caused to pass through the main nozzle 254 and then by an inner nozzle 430 containing water. This inner nozzle is provided with a needle valve 431 which is adjustable to vary the amount of moisture absorbed by the puff or blow air passing through the nozzles 254 and 255. This needle valve is also provided with a valve stem extension 432 which is designed to raise the check valve 433 contained in the terminals 256 and 257 against the pressure of the spring 434 whenever the nozzle structure is reciprocated and thus cause the otherwise freely flowing air to pass through the conduits 252 and 253 to the blowing head.

Each of the inner nozzles 430 is provided with a branch pipe 435, which pipes extend outwardly through the walls of the nozzles 254 and 255. The pipes 435 are connected by passages 436 to an annular groove 437 in the step cone 338. Water is supplied to this groove 437 by means of a conduit 438, threaded into the collar 339 and connected to the groove by a passage 439.

As shown diagrammatically in Figures 58 and 59, the water-supplying device embodies a tank 440 with an overflow pipe 441, a supply pipe 442 and an outlet pipe 443. This outlet pipe 443 connects to the branch pipes 435 of the inner nozzles. The head of water desirably maintained in the tank 440 is just sufficient to maintain a volume of water in the inner nozzles 430 that will permit the air passing by such nozzle to draw with it a moderate amount of moisture. Also, as is diagrammatically shown, the air is supplied from an air supply reservoir 444 having suitable outlet pipes leading to the lateral projections 262 and 263 of the nozzles 254 and 255.

The means for closing the air controlling plug of the blowing head, that is, the means for intermittently operating upon the roller 46 to accomplish this comprises the cam 45 which is carried upon the shaft 64 upon which the blowing head is mounted. This cam 45 is oscillated to intermittently move the roller 46 to an extent sufficient to close the air controlling plug of the blowing head, against the pressure of the resilient means which normally hold this plug open, by means of a link 343 and a lever 344 which is pivoted thereto as at 345 and which is fulcrumed at its oposite end as at 346. This lever carries a roller 347 that cooperates with a cam groove 348 of a cam 349 carried by the shaft 202 which also carries the dial for actuating the feed and complemental structure that controls the movement of the nozzle.

A means for operating the blank ejector is shown best in Figures 62 and 63 and comprises a roller 350 carried by a parallel link structure. This parallel link structure embodies a link 351 pivotally supported as at 352, a link 353 pivotally supported as at 354 and a link 355 pivoted to the link 351 at one end at the point 356 at which the roller 350 is carried. This link 355 is pivotally connected at its opposite end to the lower end of the link 353 and both of these links are pivoted at the same point to a horizontally extending link 357.

The horizontally extending link 357 is pivoted at its innermost end at 358 to a slide 359 which is slidable in guideways 360. The opposite end of the slide 359 is pivoted as at 361 to a link 362 whose opposite end is in turn pivoted to a lever 363 as at 364. The lever 363 is fulcrumed as at 365 and carries a roller 366 for coaction with a cam groove 367 in the cam 139 upon the upstanding shaft 85. By means of this mechanism, the roller 350 is at the proper time brought automatically into position to operate the presser foot 61 to eject the blank or the finished article. It will be understood that this presser foot 61 may be operated manually at any time.

The mechanism for operating the marvering apparatus is best shown in Figures 40, 41, 45, 47 and 48, as comprising a means for partially rotating the yoke 75 which carries the marvering roll and a means for partially revolving this yoke. These means are operated independently or together and they afford an unlimited range of adjustment.

In the first place, the yoke 75 of the marvering roller carries a stub shaft 370. Keyed to this shaft is an upstanding segmental gear 371 which intermeshes with a similar segmental gear 372. The segmental gear 372 is pivotally carried by means of a shaft 373 which is ultimately supported by the frame member 374 and which is provided upon its outer end with an arm 375 keyed to the shaft 373. This structure is operative by an apparatus to be described and when so operated it partially rotates the marvering roller about the axis of the yoke shaft and consequently about an axis at right angles to the rolling axis of the marvering roller. Stated another way, this adjustment constitutes one means for varying the angle of inclination of the rolling axis of the marvering roller.

Immediately adjacent the sector 371 and rotatably supporting the shaft 370, is a hanger arm 376 whose upper end is integrally connected to a sleeve shaft 377 at right angles thereto. This sleeve shaft 377 surrounds this shaft 373 of the sector 372 and forms the immediate bearing for this shaft, the sleeve shaft itself passing through and being supported by the frame member 374. The sleeve shaft 377 is also provided with an arm 378 which is keyed thereto. The member 376 is adapted to be swung by power applied through the arm 378 and the swinging of this member 376 will serve to move the shaft 370 in a rotary path so that the marvering roller as a whole will swing in a rotary path.

It is interesting to note that this double sector adjustment and the swinging arm adjustment are independently operable. At the same time, the swinging of the arm 376, if unaccompanied by movement of the sector 372, will not only result in the bodily swinging of the marvering roller but will also result in the rotation of the marvering roller about the axis which is at right angles to its rolling axis, this being due to the fact that the sector 371 is in mesh with the sector 372 and is also keyed to the shaft 370 of the yoke 75 which supports the marvering roller. On the other hand, means has been provided, as will be described, for automatically giving the sector 372 a compensatory movement which will either wholly or partially prevent the tilting of this roller due to the intermeshing sector so that swinging of the roller may be accomplished either with or without tilting of its axis or while tilting the axis to variable extents.

The arms 375 and 378 are respectively connected with links 379 and 380 which are in turn respectively connected with arms 381 and 382 carried on stub shafts 383 and 384. These stub shafts respectively carry bevel gears 385 and 386 which mesh with other bevel gears 387 and 388 upon shafts 389 and 390.

The shafts 389 and 390 carry cam arm mechanisms which are automatically operated upon to automatically effect the adjustment of the marvering roll by a cam dial 400. The shaft 389, for instance, is operated upon by a compound leverage mechanism embodying a downturned arm 392 which is keyed thereto and which is provided at its lower end with a bifurcation 393 for the reception pivotally of a link 394. This link 394 is pivoted as at 395 to a lever 396 which is fulcrumed as at 397 and connected at its upper end to a triangular plate lever 398 by means of a pin 399 adjustably located in a slot 401. This triangular plate lever is fulcrumed as at 402 and is connected as at 403 with a cam lever 404. The cam lever arm 404 is pivoted as at 405 to a link 406 which is in turn fulcrumed at 407. The upper end 408 of the cam lever arm 404 extends into cooperative relation to a series of rollers 409 of the cam dial 400.

It will further appear that these rollers 409 are mounted adjustably in radial slots 410 of the cam dial 400 and are longer than the rollers which operate upon the compound leverage which is connected to the shaft 390 and which is now to be described. It should be noted that the adjustment of these rollers radially of the cam dial 400 produces in effect a cam track which operates upon the lever 404 to automatically swing the arm 375 (see Figures 11 and 40) to produce a consequent automatic adjustment of the sectors 371 and 372 and that this adjustment may be intermittent or continuous over a given period.

The swinging of the arm 376 to effect this automatic adjustment of the marvering rollers is effected through the medium of the shaft 390 and related mechanism through the medium of the compound structure which also cooperates with the cam dial 400 as follows:

The shaft 390 has keyed thereto an upstanding arm 411 which is pivoted as at 412 to a link 413. The link 413 is connected at 414 to a lever 415 which is fulcrumed as at 416. The upper end of the lever 415 is connected to a triangular lever plate 417 through the medium of a slot 418 by means of a clamping pin 419 which is adjustable in this slot. This triangular plate 417 is likewise fulcrumed upon the shaft 402 and is connected at 420 to a cam lever arm 421 which is in turn pivoted to a link 422 as at 423, this link being fulcrumed upon the shaft 407. The upper end 424 of the cam lever arm 421 is designed to cooperate with a series of cam rollers 425, which rollers are carried in the slot 410 of the cam dial 400 and are adjustable along said slot and, therefore, radially of the cam dial. It will be understood that these cam rollers 425 exert either an intermittent or continuous pressure upon the cam lever arm 421 by acting as a cam track for the same. This results in the automatic adjustment of the arm 378 and the consequent automatic adjustment of the swinging arm 376. It will be obvious that the two series of cam rollers 409 and 425 may be so positioned as to produce the swinging and rotative adjustment described at the same time or to produce either one without the other. It should be noted that the cam lever 404 is preferably offset as at 430 so that the roller 425 which operates the cam lever 421 may be of such a length as to also operate the lever 404. The roller 409, as shown, is designed to actuate the cam lever 404 independently of any action of the roller 425.

The cam dial 400 is removably clamped upon a shaft by means of a removable knob 427 and a suitable multiple disk clutch and this shaft 426 is driven from the shaft 206 by means of the train of gears 205, 204 and 203, the idle gear 428 and the gear 429 which is carried on the shaft which carries the cam dial 400.

The operating mechanism for the blowing mold is directly controlled from the main cam shaft 85 (see Figures 71, 74, 77 and 78). It comprises mechanism whereby the mold may be operated for the making of paste mold ware. It also comprises mechanism for the making of iron mold ware, the latter including means for substantially duplicating the blow-over operation, common in the making of such iron mold ware.

The basic structure of this mechanism for raising and lowering the mold comprises cams 450 and 451 respectively having cam grooves 452 and 453 in their peripheries. The cam 450 operates through means of the groove 452 upon a roller 454 carried by a lever 455 to swing such lever up and down about its fulcrum 456. At its opposite end, this lever 456 carries a rack 457 which meshes with a gear 458 which is normally loose upon a shaft 459.

The cam 451 operates through means of its groove 453 upon the roller 460 of a lever 461. This lever 461 is fulcrumed as at 462 and carries at its opposite end a rack 463. The groove 453 operating upon the roller 460 of this lever 461 will serve to raise and lower this rack 463. This rack 463 is in mesh with a gear 464 that is normally loose upon the hub of a clutch member 466.

The gears 458 and 464 each carry upon their inner ends male clutch members 464 and 466, the clutch members 465 being permanently connected to the gear 458 while the clutch member 466 is connected to the gear 464 by means of a slidable key 467. This key 467 is carried by a manually operable rod and is operable in a key slot 468 provided in the hub 469 of the gear 466. The rack pinion 464 is rotatably mounted upon the hub 469 and is also provided with a key slot 470 for the reception of the key 467. Thus, the forcing of the key 467 into the slots 468 and 470 will lock the gears 464 and 466 and will render the rack 463 operative to oscillate the gear 464. The hub of the gear 464 is recessed as at 471 to receive a slotted brass sleeve 472 and withdrawing of the key 467 into the slot in the sleeve 472 will obviously disconnect the gears 464 and 466 so that the gear 464 will rotate freely on the hub 469.

Disposed in between the gears 458 and 464 and splined to the shaft 459 is a double clutch member 475. This double clutch member 475 comprises a female clutch member 476 on one side for intermeshing with the male clutch member 465 and a similar female clutch member 477 upon its opposite side for meshing with the male clutch member 466.

This double clutch member is automatically movable to cause it to connect the gears 458 and 464 to the shaft 459 at chosen intervals by means of a yoke member 478 forming part of a lever 479 fulcrumed at 480. This lever 479 is pivotally connected to a link 481 whose opposite end is connected pivotally to a lever 482. This lever 482 is fulcrumed as at 483 and carries a roller 484 whereby it is actuated to shift the clutch by means of a groove 485 in a cam 486 which is also connected to the shaft 85.

In making paste mold ware, the clutch is in intermeshing relation with the male member 465 so as to positively connect the gear 458 to the shaft 459. The result is that the movement of the rack 457 in one direction will rotate the shaft 459 and this will swing the toothed sector 487 to rotate the gear 487$^a$ on a stub shaft 488 which will in turn swing the toothed sector 488$^a$ to raise the mold through the medium of a rack 489. This rack 489 is connected to a bifurcated portion 490 of a mold carrying frame 491. The movement of the rack 457 in the opposite direction at the proper time by means of the cam which actuates the lever 455 will result in a downward movement as will be understood.

In the making of blow-over iron mold ware, the additional operation of raising and lowering the mold for a short distance below the blowing head during the latter portion of the blowing period is automatically effected whenever the blow-over mechanism for connecting the gear 464 to the shaft 459 has been manually set. Under these conditions, the movement of the female portion 477 of the double clutch member 475 into clutching relation to the male clutch portion 466 renders the rack 463 effective to initiate rotation of the gear 464 and shaft 459 at an earlier instant. There results an earlier swinging of the gear sector 487, and the mold containing the blown article is lowered a short distance. The air controlling mechanism is then operative to introduce air through the blowing head with the result that the exposed glass between the bottom of the blowing head and the top of the blow mold will be expanded. The rack 463 is then reversed by its cam 453 and the mold is again raised. It will be obvious that this upward movement of the mold will break the thin glass in the blow-over section, thus leaving the blown article to be ejected from the blowing mold and the severed base of the article to be ejected from the blowing head. The clutch 475 is then automatically shifted to engage the gear 464 to effect normal lowering of the mold by movement of the rack 457.

The mold opening and closing mechanism is shown best in Figures 73 and 77. It comprises in combination with the mold 500, integral arms 501 and 502 which are pivoted upon the shaft 503. These integral arms are provided with apertured lugs 504 and 505 and into the apertures of these lugs extend upstanding pins 506 and 507 carried upon links 508 and 509. These links 508 and 509 are in turn pivoted to a yoke 510. The yoke 510 is secured integral with a rack member 512. The rack 512 is slidable upon a cylindrical guide 513 which is secured in a collar 514, this collar 514 being carried by a casting 515 which is slidably clamped by the clamp 516 to the post 517. The casting 515 is also slidably mounted upon an upstanding post 518 upon which is slidably keyed a toothed sector 519. This rotatable post 518 is keyed at its upper end to an arm 520 which is operative to swing the two arms to open and close the mold sections by means of a pivoted rod 521 having a cushion connection with one end of a lever 522. This lever 522 is fulcrumed as at 523 and its opposite end carries a roller 524 working in a groove 525 of a cam 526 likewise carried upon the shaft 85. It will be understood that the cam groove 525 actuates the lever 522 at proper intervals to open and to close the mold sections, these operations being timed with the other operations of the mold and its appurtenant mechanism. It will also be understood that the casting 515 and the mold opening structure is movable vertically and simultaneously with the raising and lowering of the blow mold structure, so that oscillation of the lever 520 is effective at any time to open or close the mold.

When the blowing mold is lowered and opened it is automatically sprayed with a cooling liquid by means of apparatus best shown in Figures 12 and 74. This apparatus comprises upstanding pipes 610, perforated as at 611, which are suitably located in front of each mold and which are so diagonally disposed relative to the open mold sections, that the jets of water from each pipe will strike the respective mold halves in such a manner as to effectively spray the entire inner surface of the mold. The pipes 610 are connected by means of a pipe 612 to a common liquid supply pipe 613. Interposed between the pipes 612 and 613 is a valve 614 and its resilient valve lever 615. This valve lever 615 is disposed in the path of the mold arm 531, so that when the mold structure is lowered the arm 531 will engage the lever 615 and the valve will be opened to effect spraying of the mold sections, and when the mold is raised this lever will be automatically released to close the valve 614. The pipes 610 and the lowered mold are preferably enclosed by means of a casing 616 which is designed to safely conduct the waste liquid away from the unit.

The bottom of the blow mold may be designated 527 and is shown fitting in an internal substantially V-shaped groove at the bottom of the mold section. This bottom is carried upon a vertical rod 528. This rod 528 extends downwardly from the bottom 527 through a clamp sleeve 529 having trunnion members 530. The trunnions 530 are journaled in the arms 531 which form part of the framework 491 which is connected to the rack 489 for raising and lowering the molds.

Rigidly secured to one of the trunnions 530, is a toothed sector 532 which is operable by means of a rack 533 to tilt the mold bottom for the discharge of the blown blank therefrom whenever the blank is separated from the blowing head, as in blow-over work. This rack is slidably mounted in the bearing 534 and at its opposite end it meshes with a toothed sector 535 mounted upon the shaft 536 and capable of slidable movement up and down this shaft as the mold carrying structure moves up and down.

This toothed sector 535 is splined upon the shaft 536 and the upper end of this shaft is provided with a crank arm 537 to which is pivotally connected one end of a lever 538. This lever 538 is keyed to a shaft 539 and at a lower point upon the shaft 539 is keyed another lever 540 carrying a roller 541 that operates in the cam groove 542 of a cam 543 likewise mounted upon the shaft 85 immediately beneath the cam 526. This leverage mechanism is operated automatically by the cam 543 at proper intervals to tilt the bottom 527 of the mold at the proper time for discharging the blown blank.

It will be understood that this tipping operation is to be used only when the blown blank is to be discharged directly from the blow mold. In all other cases when the blown blank is to be ejected from the blowing head this tipping mechanism is preferably rendered inoperative. To effect this inoperativeness, the shaft 539 is provided with a slidable key 572. This key 572 is connected to an internal rod 573 which rod is movable up and down in the shaft 539 by means of a threaded collar 574 which is rotatably secured to the lower end of the shaft 539. The lever 540 is secured to the shaft 539 by means of the key 572 when this key 572 is in its lowest position. Thus, it will be obvious that, whenever the collar 574 is turned in one direction and the sleeve 573 pushed upwardly, the key 572 will be disengaged from the key slot in the arm 540 and that this arm 540 will then oscillate freely upon the shaft 539.

Batting the bottom of the blank immediately before the closing of the mold is a feature of importance in the making of certain classes of ware. For this reason, as best shown in Figures 74, 75 and 76, the rod 528 which carries the mold bottom 527 is provided with lock nuts 544 for adjusting its effective length and it is located immediately above an arm 545 which is adjustably carried upon the threaded end of a rod 546, adjusted position being maintained by properly positioning the nuts 547. This rod 546 is slidably mounted in a bearing on one of the arms 531 and is connected at its upper end to one end of a lever 548 which is fulcrumed as at 549 and which is connected at its opposite end to a rod 550. This rod 550 depends from the lever to which it is connected and it is adjacent its lower end adjustably connected to an offset depending rod 551 which carries at its lower end an outstanding extension 552. Contacting with the rod 552 is the end of a lever 553 which is fulcrumed at 554 and which has a downwardly depending arm 555. This downwardly depending arm 555 carries an inturned stud bearing against a resilient positioning buffer 557. Disposed immediately beneath the horizontal arm of the lever 553 is a ratchet wheel 558 which is prevented from rotation in one direction by a pawl 559. This ratchet 558 is mounted upon a shaft 560 which carries at its other end a similar ratchet 561.

The ratchet 561 is designed to be driven in one direction by a dog 562. This dog 562 is carried upon a member 563 that is connected by means of a link 564 to a rack member 565. The rack member 565 is slidably mounted and slides as the result of an impetus given to it by a toothed sector 566 carried upon one end of a lever member 567 which is fulcrumed as at 568 and which carries a roller 569 intermediate its end. This roller 569 works in a cam groove 570 of a cam 571 which is likewise mounted upon the shaft 85. The movement of this dog in one direction as the result of the operation of this cam upon its lever causes a step-by-step rotation of the ratchet shaft, one step for each blank to be batted. The step movement of the ratchet shaft brings one of the teeth of the ratchet 561 into position to rapidly lift the lever arm 553 momentarily which instantly returns and contacts with the lug 552 to raise the mold bottom quickly against the bottom of the blank through the medium of the rods 551, 550, lever 548, rod 546, arm 545 and bottom carrying rod 528.

The blowing blank mechanism is shown best in Figures 12, 83 and 84. It contemplates the provision of a device for each forming unit which is automatically movable into position to receive the blown blank at the moment of its ejection from the blowing head and to deliver it to an annular conveyer extending around the entire apparatus, which annular conveyer is automatically operated to deliver these blown blanks to an endless conveyer at a given point.

The device for receiving the blown blank from the blowing head at the time of ejection by the automatic ejector comprises a chute member 580 which is keyed to a shaft 581 that carries thereon a bevel gear 582. This bevel gear 582 meshes with a bevel gear 583 on a shaft 584 carrying a pinion 585 at its opposite end. The pinion 585 is designed to be driven by a rack 586 which is carried by a bracket 587 mounted upon the bearing 534 which carries the rack 533 that causes the tilting of the mold bottom. The mechanism is thereby so timed as to automatically present the chute 580 into position shown in Figure 83 where it receives the blown blank at the time it is ejected automatically from the blowing head which has been moved to the ejecting position shown. The structure is also such that the receiving chute is automatically moved out of position before the blowing head with its elongated blank swings from elongation position into blowing position, thereby avoiding interference with this movement of the blowing blank into blowing position. The shaft 581 is supported at one point by a collar 587 carried upon an arm 588 whose opposite end carries a clamp 589 which embraces the shaft 31. This shaft is also supported by an arm 590 through means of a collar 591, the arm 590 being clamped as at 592 to the same shaft 31. The arm 590 also carries an upturned extension 593 which terminates in a bearing 594 for the shaft 584.

When the blank receiving member 580 is in operative position, its lower end overlaps an inclined asbestos flange 595 of an annular trough 596 which surrounds the entire machine and which is continuously rotated by means of a rack 597 on the bottom thereof. This rack 597 is driven by a pinion 598, from a small motor 599.

It will be obvious that whenever the blown blank is tipped and ejected directly from the blow mold 500, instead of being ejected from the blowing head, as in the making of blow-over ware, that the chute 580 will be too high to receive the blank. I have, therefore, provided an auxiliary and stationary chute member 605 which is secured to the supporting shaft 31 by means of a suitable clamping bracket 606. The upper end of this chute 605 is preferably positioned, as best shown diagrammatically in Figure 12, at a point which is adjacent the bottom of the mold 500 when this mold is in its blowing position. The lower end of this chute is positioned adjacent the inclined edge of the revolving asbestos flange 595.

It will be understood that when the mold 500 is in its uppermost position, the chute 580 will be swung to its inoperative dotted line position as shown in Figure 83 and that the path of the chute 605 will be unobstructed to conduct the blow-over ware to the annular trough 596.

The annular trough 596 is provided at intervals with pivoted trap-doors 600 which are normally closed but which automatically open at a given point above an endless conveyor 601. This may be readily accomplished by the provision of an annular plate 602 immediately beneath the bottom of the annular trough with a portion cut away as at 603. It will be readily understood that these pivoted trap-doors are normally held closed by the plate and that they drop open as they reach this cutaway portion 603. Then, as they continue in their movement with the rotating annular trough, they are automatically closed as they ride upon the end 604 of the annular plate opening.

It will be understood that the cam 130 and its groove may be changed to effect oscillation of the blank at any desired position of its cycle and for any duration or even for its entire cycle from receiving until after and during blowing in the blow mold. It will also be understood that the blowing head may continuously swing from marvering to blowing position and be elongated and oscillated while swinging. It will be further understood that, when desired, air may be introduced continuously during oscillation of the blank so that the blank will be elongated with substantially no elongation.

The operation of the complete glass forming apparatus will be best described by substantially following the course of a single charge of glass from its delivery to a single unit until its ejection and conveyance from that unit as a blown article. It will be assumed that this single unit as best shown in Figures 10, 42 and 53 is empty and at rest, with the exception of the continuous movement of the bevel gear 33 and the gears 115 and 116, which movement, however, does not normally affect the operation of the unit.

The distributing tube 2, being timed in operation with the automatic glass feeder, will, upon registering with the blank mold 66, conduct a charge of glass directly into this blank mold. As the distributing tube moves on to its next intermittent position, the pin 24 of the integral branch arm 23 will engage the operating trigger 100 and thus automatically set the effective parts of the unit in operation after the distributing tube has delivered a charge to and has passed by the unit.

The swinging of this trigger 100 and the rotation of its shaft 101 will rotate the shaft 104, Figures 5 and 12, through the medium of bevel gears 102 and 103. The shaft 104 is provided with a gear sector 105 which is normally held in inoperative position by means of a cam mounted on the cam shaft 85, but when this shaft 104 is oscillated the sector 105 will move the rack 106 to depress the arm 107 and the end of the rack 106 will then strike and move the finger 108 to oscillate the clutch shifting arm carried by the shaft 99. This oscillation of the shifting arm will move the yoke 98 and cause the clutch 92 to mesh with the gear 94 and thus transmit the motion of the main unit driving shaft 76 to the worm shaft 91.

The automatic rotation of the worm shaft 91 will result in the rotation of the main cam shaft 85 through the medium of the worm wheel 89 and the bevel gears 86 and 87, and in the direct rotation of the shaft 202 through the bevel gears 200 and 201. The blank forming cam 207 is controlled, through the gears 203, 204 and 205, by shaft 202, and the continued rotation of shaft 202 will cause the cam lever 240 and the rack 239 to be lowered to actuate the gear sector 238 and thus cause oscillation of the sleeves 218 and 68 and the plunger 67 from normal inoperative position, as shown in Figure 53, to the operative position shown in Figures 12 and 14, which is in longitudinal alinement with the blank mold 66.

Continued rotation of the cam 207 will result in the actuation of the lever 209 by the cam groove in the front face of the cam 207 and causing the lever 209 to be drawn toward the center of the cam. This movement of the lever 209 (through the medium of the link 211 and arm 212 and the sector 214 and rack 215) will lower the sleeve 68 until it contacts with and is centered by the upper chamfered edge of the mold 67. Coincident with the movement of the lever 209, and the downward movement of the sleeve 68, the plunger 67 will be lowered by the automatic lowering of the piston rod 246 and its arcuate T slot member 245. The reciprocation of this piston rod 246 is controlled directly by the main cam shaft 85 through the medium of the cam 249, the lever 248 and a three way valve operative by the cam lever 248, whereby actuation of the lever 248 will cause the three way valve to admit air to the top of the cylinder 247 and force the plunger 67 downward in unison with the lowering of the sleeve 68.

This downward movement of the plunger 67 will be continued after the sleeve 68 has been centered and until the plunger 67 has entered the blank mold 66 to a predetermined adjustable position where the bottom of the plunger will contact with the charge of glass, force a portion of the charge into the blank holding groove between the post 34 and the sleeve 35 of the blowing head and then positively form the blank to conform with the shape of the blank mold 66 and the bottom of the plunger 67. The position of the parts of the forming mechanism at this point of the cycle is best shown in Figure 14. Further rotation of the cam 207 will move the levers 220 and 209 in unison to move the racks 215 and 227 upwardly, causing the tapered blank mold 66 and the sleeve 68 to be lifted from the glass blank while the plunger 67 is still in forming position and thus preventing the formation of any vacuum.

After the mold 66 has been raised a definite distance the cam 249 is timed to operate the three way valve to raise the plunger 67. Continued rotation of the cam 207 will raise and hold the mold 66 to a position above the blowing head, as shown in Figure 15 and will raise the sleeve 68 until its bottom is clear to swing above the mold. Further rotation of the cam 207 will be effective to raise the lever 240 to again actuate the gear sector 238 and thus swing the sleeves 68 and 218 and plunger 67 back to normal inoperative position.

The pressure to which the charge of glass has now been submitted leaves the blank securely retained to the blowing head and with a definite shape corresponding to the mold 66 and the bottom of the plunger 67. This forming period is preferably of short duration and the only substantial chilling of the glass will be at the bottom of the blank and within the groove between the post 34 and the sleeve 35 in the blowing head.

The continued rotation of the cam shaft 85 and the cam 84 thereon is so timed that, after the mold 66 is raised clear of the glass blank, the lever 87 will be actuated to oscillate the sector 77 to rotate the blowing head and swing the blank back against the marverer 73 whenever it is desired to marver the glass. As the glass blank is swung toward the marvering position, as shown in Figure 15, the clutch 129, Figure 35, is shifted to engage the gear 127 by means of the arm 135 which is controlled by the cam 130 on the cam shaft 85. This gear 124 being in mesh with the gear 123 will rotate the shaft 122 and thus rotate the glass blank through the medium of the bevel gear 120 on the shaft 122 and the bevel gears 62 and 63 on the blowing head. This transmission of power from the main shaft 76 to the blowing head is best shown in Figure 24.

Simultaneous with this rotation of the glass blank against the marvering roller, the longitudinal axis of the roller will be adjustably swung and tilted to effect any desired additional shaping of the blank. This rotation or swinging of the marvering roller is controlled directly by the adjustable cam dial 400 which is rotated by the operating shaft 202 through the gears 203, 428 and 429. The blank will remain in rotating contact with the marvering roller 72 until the roller is tilted or swung to form the desired contour of the blank when further rotation of the cam 84 will raise the lever 81 and sector 77 to rotate the blowing head about its horizontal axis, and towards and past its normal vertical position.

Immediately after the marverer completes its rolling operation the cam 130 is timed to actuate the lever 135 and shift the clutch 129 from rotating to neutral position. It will be understood that while the blowing head is in vertical receiving position the air hole 38 in the blowing head post will be closed by the valve plug 39, and further that this plug will be preferably maintained in closed position by the cam 45 and roller 46 until after the marvering operation as above described. After the mavering operation the rotation of the cam 349 by the shaft 202 will actuate the lever 344 to oscillate the cam 45 in a counterclockwise direction, as shown in Figure 42. Thus as the blowing head, with the marvered blank retained thereon, is swung back from marvering position the plug 39 will be automatically withdrawn by resilient means within the blowing head so that air or other expanding fluid may be introduced through the opening or hole 38 and into the glass blank.

The cam dial 310 is directly rotated by the shaft 202. Continued rotation of this dial 310 will cause one of the adjustable cam points 324 to depress the foot structure 307, the depression of which will, through the medium of levers 298, 294 and 289 and the pawl 277 and ratchet wheel structure 273, raise the nozzle structure 254 into operative position with the puff air terminal 257 to cause the normally freely flowing air to be conducted through the blowing head and into the glass blank. The nozzle 255 will only remain in raised operative position as long as the foot structure 307 is depressed so that any number of puffs of air may be intermittently admitted to the blank for variable durations and at any point as it is swung back from marvering position. Continued rotation of the cam 84 will swing the blowing head until it reaches a downward position at an angle of about 45°, as best shown in Figure 16. The cam 84 will temporarily hold the blowing head at this position which is the elongation position for the blank.

Just before the blowing head reaches this elongating position the cam 130 will actuate the lever 135 to shift the clutch 129 from neutral position to a position engaging the gear 155. This gear 155 will transmit the rotation of the shaft 125 to the eccentric shaft 157 and eccentric 158, and this eccentric will effect the oscillation of the gear 171 through the medium of the rack 167, gear sector 168 and the gear sector 153. The shifting of the clutch 129 will simultaneously shift the clutch 170 to engage the gear 171 and thus lock this gear to the shaft 122 so that whenever the clutch 129 engages the gear 155 the rotation of the main shaft 76 will be effective to oscillate the shaft 122.

As above described, the shaft 122 directly controls the rotation, oscillation, or neutral position of the blank holding post of the blowing head. Thus as the blowing head is swung to this downward angular position the cam 84 is timed to effect oscillation of the blank and the cam points 324 on the dial 310 are positioned to depress the foot 307 and cause the introduction of a puff or puffs of air to the blank during this oscillation.

Thus the elongation of the blank is effected by oscillation of the blank mechanically while the blowing head is held at an angle. During this oscillation, intermittent puffs of air are introduced into the blank and are held therein while expansion takes place. The result of this is best illustrated in Figures 27 to 33 wherein the blank first sags to stretch the upper side and compress the lower side of the blank and then is oscillated to a new position wherein the side which has just been compressed becomes the upper side and is stretched while the side which has just been stretched becomes the lower side and is compressed.

Further rotation of the cam 130 will then shift the clutch 129 to hold the post of the blowing head stationary and continued rotation of the cam 84 will cause the blowing head to be swung from elongating position toward a vertical downward blowing position. Coincident with the swinging of the blank downward from elongating position, the rotation of the cam 450 secured to the cam shaft 85 will be effective to raise the open blow mold to its uppermost position, as shown in Figures 17 and 71, by means of the clutch 481, the gear 465, the sectors 485 and 488, and the rack 489 which carries the complete mold structure. As the blank completes its downward swinging movement it will enter the open mold sections 500 and will be centered in longitudinal alinement with the center of the mold and mold bottom 527. Upon the termination of the downward swinging movement of the blowing head the cam 526, on the shaft 85, will oscillate the lever 522, Figure 77, to close the mold sections around the blank through the means of the vertically slidable gear sector 519, rack 512, yoke 510 and pivoted links 508 and 501.

It will be understood that when the blank requires to be set, this operation will be accomplished, after the blowing blank has been centered in the mold 500 and before the mold has been closed, by a sharp upward movement of the bottom plate 527. The bottom plate 527 strikes the bottom of the blank a blow, which sets the blank, and returns to its normal position and the mold 500 is then closed in the manner described above. The upward movement of the bottom plate 527 is effected by the cam 571, the sector 566 of the lever 567, the rack 565, the member 563, dog 562, ratchet wheels 561 and 558, the lever 553, the depending rods 550 and 551, the lever 548, the depending rod 546, the arm 545 and the bottom plate stem 544.

As the mold closes the clutch 129 is shifted from neutral to rotating position by the cam 130 and the lever 135 for paste mold work. In iron mold work the clutch 129 remains in neutral position and the blank is not rotated. The mold 500 remains closed while the blank receives its final blow out. This blow out is effected by means of the continued rotation of the cam 310 which will cause one or more of the adjustable cam points 324 to depress the foot 321 and this depression, through the medium of the levers 311 and 288 and the pawl 278 and ratchet wheel structure 274, will raise the nozzle 254 into cooperative relation to the blowing air terminal 256 and will cause the normally freely flowing air to be conducted through the blowing head structure and into the glass blank for the final blow out. When sufficient time has been allowed for the blank to completely fill the mold 500 the foot 321 is released by the cam point or points 324, and the air ceases to flow into the blank.

The mold 500 is opened by the cam 526, the blowing head rotation is stopped and it is returned to the ejecting position which is substantially the same as the elongation position. The cam 450 then lowers the mold, and the rack 586 carried by the member 534 causes the chute member 580 to be swung into position for receiving the blank which is then ejected by means of the cam 139, the lever 363, and the roller 350 which presses the shoe formation 61 and through it the ejector sleeve 36. The ejected blank slides down the chute 580 into the annular trough 529 where it is carried until deposited on the conveyer 601 by the trap doors 600. It should be noted that on the upward movement of the mold 500 the rack 586 causes the chute 580 to swing as shown in Figure 83 so that it will not interfere with the elongated blank as it is swung into the mold.

The downward motion of the mold, as it nears its lowest position, causes the member 491 to strike the lever 615 opening the valve 614 which allows water or other cooling fluid to be sprayed upon the open mold by holes 611 drilled in pipes 610.

After ejecting the blank the cam 84 returns the blowing head to its charging position and the cam forces the clutch 92 out of mesh with the gear 94 and the unit will become inoperative until started upon a new cycle by the pin 24 engaging the trigger 100, as above described.

In the making of blow over ware, the cam 451 lowers the mold a short distance below the blowing head when the blowing operation is nearly complete. The lowering of the mold 500 from the blowing head allows the blank to be bulged or blown over outside of the mold and when the mold is raised to its former position the bulged portion is cracked off leaving the blank in the mold 500 and only the neck portion remains in the blowing head. The rack 586 is disengaged and the chute 580 remains at one side. The blank is ejected from the mold 500, when it is opened, by means of tilting the bottom plate by the cam 543 and allowed to slide down the stationary chute 605. The neck portion of the blank is ejected from the blowing head in the manner described above when not making the blow over.

It will be understood that the marvering operation may in some cases be eliminated and the blank swung immediately from charging to elongating position.

It will also be understood that the blank holding head and the groove therein may be of any suitable size and may also be interchangeable so that different sized heads may be used with a single blowing head unit.

Having thus described my invention, what I claim is:

1. The combination of a glass delivery trough having an outlet, severing means operating periodically below the outlet of said trough, a plurality of forming units arranged in an arc substantially about an axis passing through the axis of the outlet of the feeder, an inclined chute with its upper end below the severing means in position to receive the severed charges and designed to successively deliver such charges to said forming units.

2. In combination with a glass distributing apparatus, of an inclined conduit pivoted at one end, means for revolving the other end with a step by step movement, means for receiving the glass from the said conduit and means effective by the movement of said conduit to render said receiving means operative.

3. In combination with a glass distributing apparatus, of an inclined conduit pivoted at one end, means for moving the other end with a step by step movement, means for receiving the glass from the said conduit and means effective by the movement of said conduit to render said receiving means operative.

4. The combination of a glass delivery trough having an outlet, severing means operating periodically below the outlet of said trough, a plurality of forming units arranged in a circle substantially about an axis passing through the axis of the outlet of the feeder, and an inclined chute with its upper end below the severing means in position to receive the severed charges and designed to successively deliver such charges to said forming units.

5. The combination of a glass delivery trough having an outlet, severing means operating periodically below the outlet of said trough, a plurality of forming units arranged in an arc substantially about an axis passing through the axis of the outlet of the feeder, an inclined chute with its upper end below the severing means in position to receive the severed charges and with its lower end movable to successively deliver such charges to said forming units.

6. The combination of a glass delivery trough having an outlet, severing means operating periodically below the outlet of said trough, a plurality of forming units arranged in an arc substantially about an axis passing through the axis of the outlet of the feeder, an inclined chute with its upper end below the severing means in position to receive the severed charges and with its lower end movable in a rotary path to successively deliver such charges to said forming units.

7. The combination of a glass delivery trough having an outlet, severing means operating periodically below the outlet of said trough a plurality of forming units arranged in an arc substantially about an axis passing through the axis of the outlet of the feeder, an inclined chute with its upper end below the severing means in position to receive the severed charges and designed to successively deliver such charges to said forming units and means for starting said forming units to work automatically and successively as the charges are delivered to them.

8. The combination of a glass delivery trough having an outlet, severing means operating periodically below the outlet of said trough, a plurality of forming units arranged in an arc substantially about an axis passing through the axis of the outlet of the feeder, an inclined chute with its end below the severing means in position to receive the severed charges and designed to successively deliver such charges to said forming units, and means for starting said forming units to work automatically and successively as the charges are delivered to them in overlapping relation.

9. The combination of a glass delivery trough having an outlet, severing means operating periodically below the outlet of said trough, a plurality of stationary forming units arranged in an arc substantially about an axis passing through the axis of the outlet of the feeder, and an inclined chute with its upper end below the severing means in position to receive the severed charges and designed to successively deliver such charges to said forming units.

10. In combination with means for automatically distributing charges of glass to receiving stations, a plurality of forming units, one at each station, and means automatically operative by said distributing means for automatically starting said forming units.

11. In combination with means for automatically distributing charges of glass to receiving stations, a plurality of forming units, one at each station, and means automatically operative by said distributing means for automatically starting said forming units successively.

12. In combination with means for automatically distributing charges of glass to receiving stations, a plurality of forming units, one at each station, and means automatically operative by said distributing means for automatically starting said forming units successively in overlapping relation.

13. Marvering apparatus comprising a roller, means for automatically moving said roller bodily in an arcuate path while marvering.

14. Marvering apparatus comprising a roller and means for automatically moving said roller bodily while maintaining its axis in unchanging relation to the blank being marvered.

15. Marvering apparatus comprising a roller and automatic means for simultaneously moving said roller bodily and changing the position of its axis.

16. The method of producing glassware which comprises depositing a charge in a mold comprising a retaining head and a sleeve, the sleeve shaping the sides of the charge, forcing the charge down in the sleeve and against said head and the inner walls of said sleeve by a plunger having a saucer-shaped cavity in its end which contacts with the charge, and lifting the sleeve first and then the plunger.

17. In apparatus for making glassware, a blank forming mechanism comprising a mold open at both ends, a blank holding head designed to close one end of said mold, means operating at the other end of said mold for forcing the charge against the blank holding head, and means for withdrawing the mold before said last named means ceases to be effective.

18. In apparatus for making glassware, a blank forming mechanism comprising a mold open at both ends, a blank holding head movable against the lower end of said mold to close the same, a plunger movable into the upper end of said mold to force the charge downwardly against the blank holding head, and means for sliding the mold upwardly away from the charge while such charge is still held down by said plunger.

19. The method of forming glassware which comprises depositing a charge of glass in a blank mold whose base is a separable blowing head, forcing the charge into adhering relation to said blowing head and removing the walls of the blank mold from the blowing head while the forcing means is still effective.

20. The method of forming glassware which comprises depositing a charge of glass in a blank mold whose base is a separable blowing head, forcing the charge into adhering relation to said blowing head by a plunger and removing the walls of the blank mold from the blowing head before raising the plunger.

21. A machine for forming glassware comprising a blank retaining head, means for moving said retaining head into proper relation to a blow mold and blowing the blank in said blow mold, automatic means for separating the retaining head and the blow mold during the blowing operation and means for causing the necessary relative movement between the retaining head and the blow mold to break the blow-over.

22. In combination with a glass feeder having an outlet therein and severing means operating automatically beneath said outlet, a plurality of vertically movable receptacles which are otherwise stationary and which are arranged about a central axis, and a trough having its receiving end beneath the outlet of said feeder and beneath the shears and having its delivery end movable successively into delivering relation to said receptacles.

23. Glass forming apparatus comprising a blank retaining means, means for conducting air under pressure into the interior of said blank, and means for controlling the introduction of air to said blank comprising members with a plurality of contact surfaces which are of different length and arranged radially in series, and radially adjustable elements adapted to be positioned selectively to operate upon any surface.

24. In glass forming apparatus, the combination of means for holding a glass blank, means for intermittently introducing puffs of constant pressure air from a main source into said blank, and means for varying the relative volumes of puffs of air comprising members with a plurality of contact surfaces which are of different length and arranged radially in series, and radially adjustable elements adapted to be positioned selectively to operate upon any surface.

25. Glass forming apparatus comprising a blowing head, a blow mold and means for reciprocating said mold from and towards said blowing head during the blowing operation.

26. Glass forming apparatus comprising a blank manipulating means, a mold and means for automatically tilting the mold when making blow-over ware and means for rendering said tilting means inoperative in the making of ordinary ware.

27. In combination with glass forming apparatus, comprising a plurality of forming means arranged in a circle, a circular conveyer traveling about the axis about which the forming means are arranged for collecting the formed articles from each forming means and a single conveyer to which said circular conveyer delivers said collected articles.

28. Glass forming apparatus comprising a glass holding head, for holding the glass blank or article, a means for forcing said blank or article off said head, and automatic means for moving said last named means positively at a predetermined time.

In testimony whereof I hereby affix my signature.

ORIN A. HANFORD.